United States Patent
Takahashi et al.

(10) Patent No.: US 7,151,596 B2
(45) Date of Patent: Dec. 19, 2006

(54) DEFLECTION ANGLE DETECTING DEVICE

(75) Inventors: Koichi Takahashi, Hachioji (JP); Junko Takahashi, Atsugi (JP)

(73) Assignee: Olympus Optical Co., Ltd., Tokyo (JP)

( * ) Notice: Subject to any disclaimer, the term of this patent is extended or adjusted under 35 U.S.C. 154(b) by 322 days.

(21) Appl. No.: 10/609,635

(22) Filed: Jul. 1, 2003

(65) Prior Publication Data

US 2004/0027561 A1 Feb. 12, 2004

(30) Foreign Application Priority Data

Jul. 5, 2002 (JP) .............................. 2002-197602
Jul. 23, 2002 (JP) .............................. 2002-213551
Jul. 24, 2002 (JP) .............................. 2002-215598

(51) Int. Cl.
  *G01B 11/26* (2006.01)
(52) U.S. Cl. ........................................ 356/138; 385/18
(58) Field of Classification Search ..................... None
  See application file for complete search history.

(56) References Cited

U.S. PATENT DOCUMENTS

| | | | |
|---|---|---|---|
| 4,984,892 A * | 1/1991 | Hofmann ..................... 356/625 |
| 5,185,676 A * | 2/1993 | Nishiberi .................. 356/141.3 |
| 5,705,810 A * | 1/1998 | Wang et al. .............. 356/152.3 |
| 5,784,168 A * | 7/1998 | Ophey et al. ................ 356/615 |
| 5,815,255 A * | 9/1998 | Van Ochten et al. ....... 356/138 |
| 6,333,910 B1 * | 12/2001 | Nishikawa et al. ......... 369/119 |
| 6,404,485 B1 * | 6/2002 | Kubo et al. ................. 356/138 |
| 6,480,289 B1 * | 11/2002 | Shimomura et al. ........ 356/614 |
| 6,975,389 B1 * | 12/2005 | Takahashi .................... 356/139 |
| 2003/0053742 A1 * | 3/2003 | Maruyama ................... 385/18 |

FOREIGN PATENT DOCUMENTS

| JP | 07-066554 | 7/1995 |
|---|---|---|
| JP | 08-227552 | 9/1996 |
| JP | 11-144273 | 5/1999 |
| JP | 11-144274 | 5/1999 |

\* cited by examiner

*Primary Examiner*—Layla G. Lauchman
*Assistant Examiner*—Juan D. Valentin, II
(74) *Attorney, Agent, or Firm*—Kenyon & Kenyon LLP

(57) ABSTRACT

A deflection angle detecting device includes a light source, a path switching plane switching the optical path of part of light radiated from the light source, a detecting reflection surface placed on the optical path switched by the path switching plane and provided to the light-deflecting element, and a photodetector receiving light reflected by the detecting reflection surface to detect the deflection angle of the light-deflecting element in accordance with the position where the light is received. In this case, a transmission surface with positive power is interposed between the detecting reflection surface and the photodetector.

38 Claims, 30 Drawing Sheets

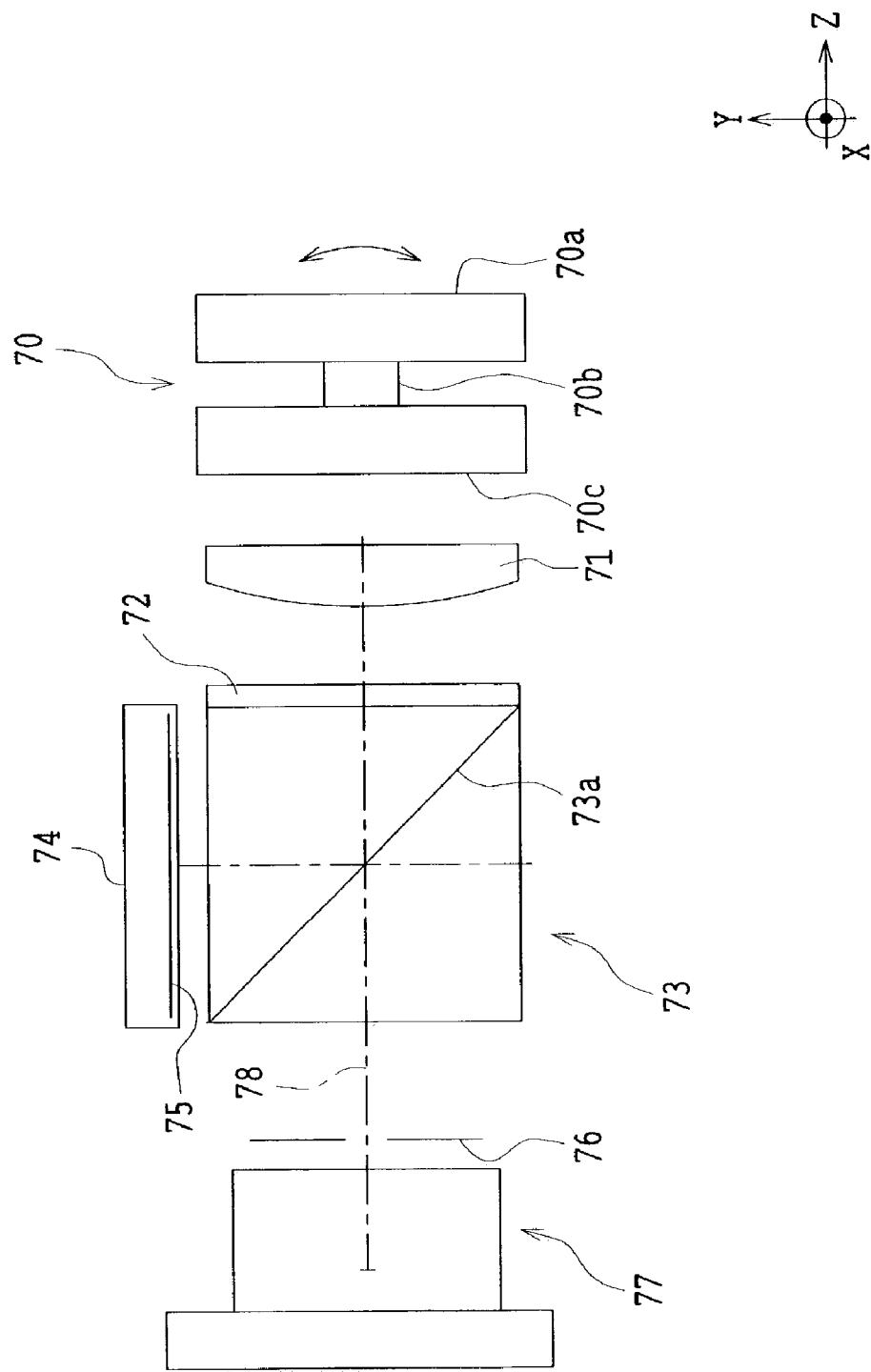

COVER GLASS

COVER GLASS

COVER GLASS

COVER GLASS

COVER GLASS

COVER GLASS

Fig.19A
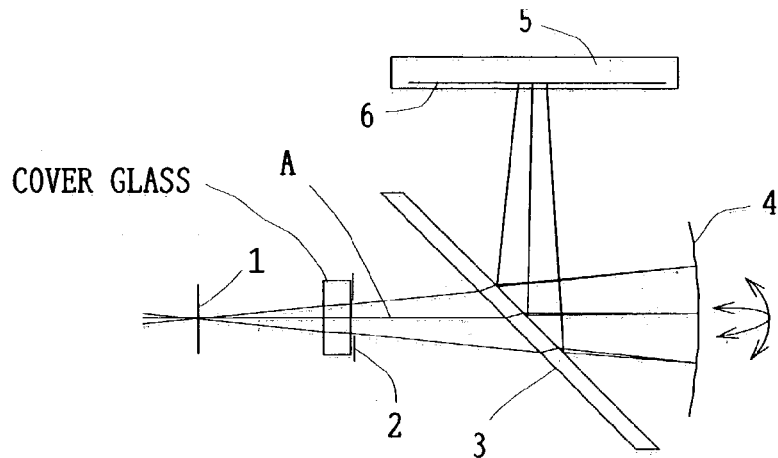
Fig.19B
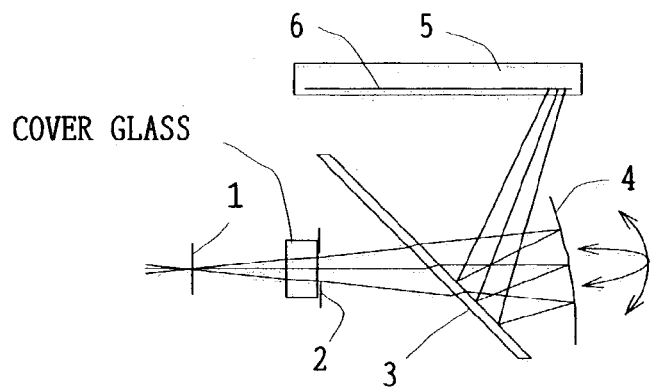
Fig.19C
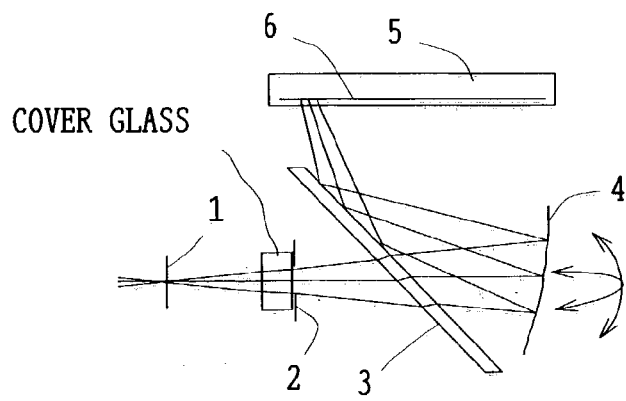
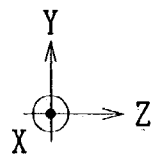

COVER GLASS

COVER GLASS

COVER GLASS

COVER GLASS

COVER GLASS

COVER GLASS

Fig. 35A
Fig. 35B
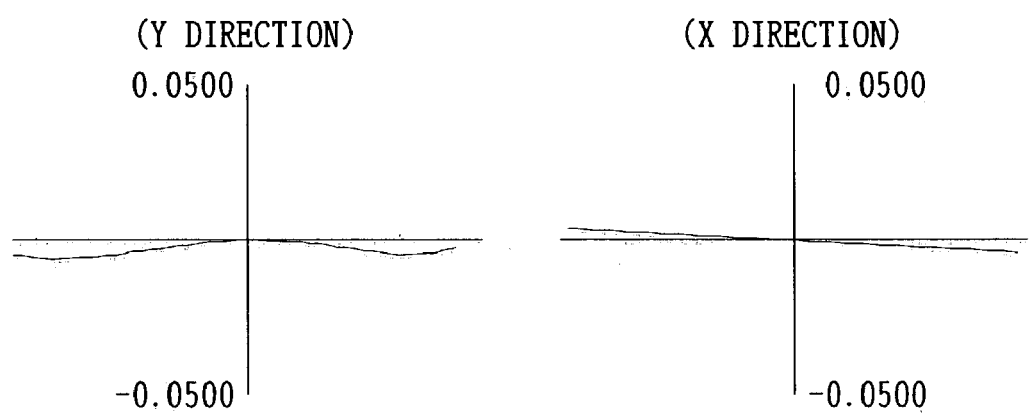
Fig. 36A
Fig. 36B
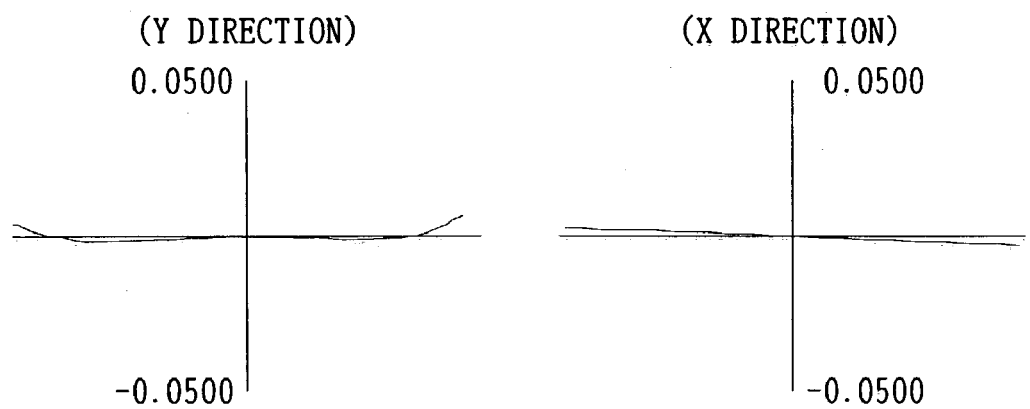

DEFLECTION ANGLE DETECTING DEVICE

BACKGROUND OF THE INVENTION

1. Field of the Invention

This invention relates to a deflection angle detecting device and a system provided with the deflection angle detecting device, and in particular, to a deflection angle detecting device constructed as a tracking detecting means used for light pickup or a light-switching means of an optical fiber used for optical communication and a system provided with this deflection angle detecting device.

2. Description of Related Art

Recently, the techniques of optical information communication and record have been conspicuously developed and the densities of information transfer and record have been significantly improved. In these fields, it is essential to improve the technique that a deflection state of a light-deflecting mirror element, such as an optical signal switch optically switching an optical fiber circuit at a relay station or the tracking control of light pickup of an optical information record reproducing system, is detected with a high degree of accuracy to control its behavior. As such, various deflection angle detecting devices have been proposed.

Deflection angle detecting devices of this type are disclosed, for example, in Japanese Patent Publication No. Hei 7-66554 and Japanese Patent Kokai Nos. Hei 8-227552, Hei 11-144273, Hei 11-144274, and Hei 11-195236.

A deflection angle detecting device set forth in Hei 7-66554 is designed to detect a relative angle made by the optical axis of a light beam emerging toward the recording medium of light pickup with the recording surface of the recording medium. This device includes a light-emitting element for irradiating the recording surface with diffused light and two light-receiving elements arranged on both sides of the light-emitting element to detect reflected light from the recording surface. The device uses a difference between the amounts of reflected light detected by the two light-receiving elements to thereby detect the amount of deflection where deflection is caused to the recording medium.

A deflection angle detecting device disclosed in Hei 8-227552 is similarly designed to detect a relative angle made by the optical axis of a light beam emerging toward the recording medium of light pickup with the recording surface of the recording medium. This device receives reflected light from the recording medium on the light-receiving surface which is divided into four, and uses a difference between the amounts of received light to thereby detect the amounts of defection in two directions.

A deflection angle detecting device set forth in each of Hei 11-144273 and Hei 11-144274 is such that reflected light from a deflecting mirror is passed through a beam splitter in which the reflectance is changed in accordance with an angle of incidence and the amount of light is detected by a photodetector to thereby detect the amount of deflection.

A deflection angle detecting device described in Hei 11-195236 is designed to detect the position of rotation of a deflecting mirror in an optical information reproducing apparatus. A light beam from a laser source is condensed into a linear beam on the deflecting mirror, and thereby measurement accuracy in one direction is improved to detect the deflection angle.

SUMMARY OF THE INVENTION

The deflection angle detecting device according to the present invention is designed to detect the deflection angle of a light-deflecting element, and comprises a light source for radiating light to the light-deflecting element; a detecting reflection surface with positive power provided to the light-deflecting element, placed on the optical axis of light radiated form the light source; and a photodetector receiving light reflected by the detecting reflection surface to detect the deflection angle of the light-deflecting element in accordance with the position where the light is received.

Also, in this specification, the deflection angle of the light-deflecting element refers to the inclination angle of the reflection surface of the light-deflecting element.

In the deflection angle detecting device of the present invention, it is desirable that the detecting reflection surface is decentered with respect to the optical axis of light radiated from the light source.

In the deflection angle detecting device of the present invention, it is desirable that a path switching element switching the optical path of part of the light radiated from the light source is placed on the optical axis.

When optical power is imparted to the detecting reflection surface provided to the light-deflecting element as in the present invention, the deflection angle detecting device which shows a wide detection range, allows one- or two-dimensional detection, and has a high degree of accuracy and a compact design, can be realized.

The deflection angle detecting device according to the present invention is designed to detect the deflection angle of a light-deflecting element, and comprises a light source for radiating light to the light-deflecting element; a detecting reflection surface inclined by a preset angle with respect to the optical axis of light radiated form the light source and provided to the light-deflecting element; a reflected-light condensing optical element with positive power for condensing light reflected by the detecting reflection surface; and a photodetector receiving light from the reflected-light condensing optical element to detect the deflection angle of the light-deflecting element in accordance with the position where the light is received.

In the deflection angle detecting device according to the present invention, when an angle of incidence of a ray traveling along the optical axis of light radiated from the light source on the detecting reflection surface is represented by θ, it is desirable to satisfy the following condition:

$$10°<\theta<70°$$

In the deflection angle detecting device according to the present invention, it is desirable that, of optical working surfaces of the reflected-light condensing optical element, at least one surface is configured as a rotationally symmetrical surface.

When the detecting reflection surface is inclined by a preset angle with respect to the optical axis of light radiated from the light source, there is no need to provide a path switching means such as a half mirror, a beam splitter, or a polarization beam splitter. Consequently, the number of parts is lessened, and cost and assembly man-hour can be reduced. Furthermore, the number of degrees of freedom of mechanical layout is increased. Since the path switching means is not required, there is no loss of the amount of light received by the photodetector, and thus detection accuracy is higher than in the case where the half mirror, the beam splitter, or the polarization beam splitter is provided.

The deflection angle detecting device according to the present invention is designed to detect the deflection angle of the light-deflecting element, and comprises a light source for radiating light; a path switching plane switching the optical path of part of light radiated from the light source; a detecting reflection surface placed on an optical path switched by the path switching plane and provided to the light-deflecting element; and a photodetector receiving light reflected by the detecting reflection surface to detect the deflection angle of the light-deflecting element in accordance with the position where the light is received. In this case, a transmission surface with positive power is interposed between the detecting reflection surface and the photodetector.

The deflection angle detecting device according to the present invention is designed to detect the deflection angle of the light-deflecting element, and comprises a light source for radiating light; a prism constructed with at least three surfaces; a decentered lens constructed with two surfaces; a detecting reflection surface placed on the optical path of light from the light source, switched through the prism, and provided to the light-deflecting element; and a photodetector receiving light reflected by the detecting reflection surface to detect the deflection angle of the light-deflecting element in accordance with the position where the light is received. The prism includes a first surface having a function of transmitting incident light from the light source through the prism; a second surface having a function of reflecting light transmitted through the first surface, a function of transmitting light reflected by another optical working surface of the prism so that the light leaves the prism toward the detecting reflection surface, and a function of transmitting incident light from the detecting reflection surface through the prism; and a third surface having a function of reflecting light reflected by the second surface toward the detecting reflection surface and a function of transmitting light transmitted through the second surface toward the photodetector. The decentered lens includes a fourth surface provided opposite to the third surface and a fifth surface which is a transmission surface situated between the fourth surface and the photodetector, having positive power.

The deflection angle detecting device according to the present invention is designed to detect the deflection angle of the light-deflecting element, and comprises a light source radiating light; a prism constructed with at least four surfaces; a detecting reflection surface placed on the optical path of light from the light source, switched through the prism, and provided to the light-deflecting element; and a photodetector receiving light reflected by the detecting reflection surface to detect the deflection angle of the light-deflecting element in accordance with the position where the light is received. The prism includes a first surface having a function of transmitting incident light from the light source through the prism; a second surface having a function of reflecting light transmitted through the first surface toward the detecting reflection surface and a function of transmitting light transmitted through another optical working surface of the prism so that the light leaves the prism toward the photodetector; a third surface having a function of transmitting light reflected by the second surface so that the light leaves the prism toward the detecting reflection surface; and a fourth surface having a function of transmitting incident light from the detecting reflection surface through the prism. At least one of the first surface and the second surface has positive power.

When the present invention is constructed as mentioned above, the deflection angle detecting device which shows a wide detection range, allows one- or two-dimensional detection, and has a high degree of accuracy and a compact design, can be realized.

These and other features and advantages of the present invention will become apparent from the following detailed description of the preferred embodiments when taken in conjunction with the accompanying drawings.

BRIEF DESCRIPTION OF THE DRAWINGS

FIG. 1 is a view showing schematically the construction of a deflection angle detecting device in which a beam splitter is used as prior art which affords the basis of the present invention and a position detector is used a photodetector;

FIGS. 19A, 19B, and 19C are views showing schematically constructions where the mirror of the deflection angle detecting device is variously rotated in a twelfth embodiment of the present invention;

FIGS. 35A and 35B are diagrams showing transverse aberrations in a state of the optical path of FIG. 28 (where the rotation angle of the mirror around the X axis is −10°);

FIGS. 36A and 36B are diagrams showing transverse aberrations in a state of the optical path of FIG. 29 (where the rotation angle of the mirror around the X axis is 10°);

DETAILED DESCRIPTION OF THE PREFERRED EMBODIMENTS

Figure 2A:
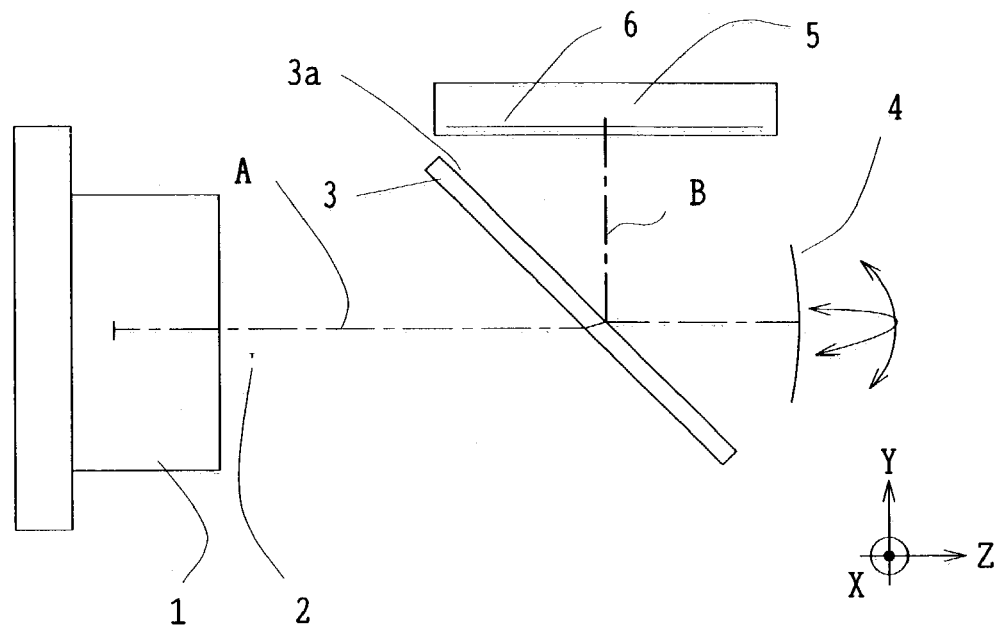
FIGS. 2A and 2B are views showing schematically an example of the deflection angle detecting device and a modified example, respectively, in a first embodiment of the present invention.

The embodiments of the present invention will be explained below with reference to the drawings.

The deflection angle detecting device according to the present invention is designed to detect the deflection angle by radiating the light-deflecting element deflecting light with different light. The present invention, therefore, can be applied to various systems provided with such light-deflecting elements.

In distinction from light deflected by the light-deflecting element, light radiated to detect the deflection angle is hereinafter referred to as detection light.

As examples of such light-deflecting elements, there are galvanomirrors in which a mirror for deflecting light is retained to be rotatable by a rotating means such as an electromagnetic coil, rotating polyhedral mirrors in which a plurality of mirror surfaces for deflecting light are mounted to a motor shaft, movable mirrors in which a mirror for deflecting light is retained by an actuator to change a setting angle, and elements in which a prism or hologram is provided to be rotatable in order to deflect light.

As systems provided with such light-deflecting elements, for example, there are an optical signal switch system and an information record reproducing system (an optical information record reproducing system).

The deflection angle detecting device of prior art is first explained as a typical example. After that, a description will be given of the embodiments of the deflection angle detecting device of the present invention and the construction examples of the optical signal switch system and the information record reproducing system, each using the deflection angle detecting device of the present invention.

First, reference is made to the deflection angle detecting device, as a typical example of prior art which affords the basis of the present invention, in which a beam splitter is used and a position detector is used as a photodetector.

FIG. 1 shows its schematic construction. An XYZ coordinate system shown in the figure is a rectangular coordinate system in which X refers to a direction perpendicular to the plane of the paper, and Y and Z refer to directions parallel to the plane of the paper is and take positive directions with respect to the upper side and the right side, respectively, of the figure.

The deflection angle detecting device of this typical example is provided with a semiconductor laser 77 as a light source for radiating light, on the optical axis of which are arranged a stop 76, a polarization beam splitter 73, a quarter-wave plate 72, and a condenser lens 71 in this order along the direction in which light travels. The condenser lens 71 is placed opposite to a detecting reflection surface 70c provided to a part of a rotating mirror 70. A position sensitive detector 74 is placed in the direction in which light is split by the polarization beam splitter 73.

The rotating mirror 70 is the light-deflecting element, such as the galvanomirror, for example, used in an optical signal switch or an optical information record reproducing apparatus. The rotating mirror 70 is provided with the detecting reflection surface 70c on the back side of a deflection mirror surface 70a used for light deflection through a fixed member 70b so that an angle of inclination is changed in cooperation with variation of the deflection angle of the deflection mirror surface 70a.

The stop 76 has a circular aperture which reforms the shape of a laser beam radiated from the semiconductor laser 77.

The polarization beam splitter 73 has a polarization beam splitter plane 73a through which a p-polarized component of the laser beam is transmitted about 100% along an optical axis 78 and an S polarizes component is reflected about 100% in the Y direction perpendicular to the optical axis 78.

The condenser lens 71 is constructed with a lens having positive power.

The position sensitive detector 74 is provided with a light-receiving surface 75 including a photoelectric element, which is directed toward the polarization beam splitter 73. The light-receiving surface 75 is a one-dimensional position sensitive detector (the position sensitive detector 5 is commonly abbreviated to PSD) that when a light spot is radiated, a voltage corresponding to the position of the center of the light intensity of the spot is produced to detect the position of the spot.

In the deflection angle detecting device of the typical example constructed as mentioned above, when the detection light for detecting the deflection angle is radiated as the laser beam from the semiconductor laser 77, the shape of the beam is first reformed through the stop 76. The laser beam is incident on the polarization beam splitter 73, and the p-polarized component of the laser beam is transmitted through the polarized beam splitter plane, travels in straight lines, and is converted into circularly polarized light by the quarter-wave plate 72. The laser beam is condensed by the condenser lens 71 to radiate the detecting reflection surface. The laser beam, after being reflected back by the detecting reflection surface 70c, is transmitted through the condenser lens 71 and is further condensed. The laser beam is transmitted through the quarter-wave plate 72 and thereby is converted into linearly polarized light of only the s-polarized component from the circularly polarized light. The laser beam is further reflected in a positive Y direction by the polarization beam splitter plane to form a spot of preset size on the position sensitive detector 74.

In this way, the position of the spot is sensed from the output of the position sensitive detector 74. The position of the spot and the deflection angle of the detecting reflection surface 70c have a relationship corresponding to optical layout so that the deflection angle can be detected.

Subsequently, the embodiments of the deflection angle detecting device in the present invention are described.

First Embodiment

Figure 2B:
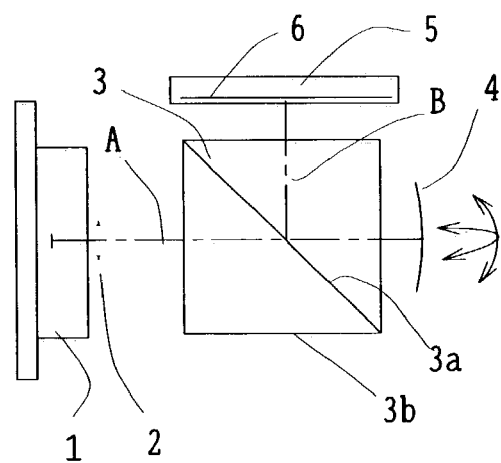

FIGS. 2A and 2B show an example of the deflection angle detecting device and a modified example, respectively, in the first embodiment of the present invention. The XYZ coordinate system shown in each of the figures is a rectangular coordinate system in which X refers to a direction perpendicular to the plane of the paper, and Y and Z refer to directions parallel to the plane of the paper and take positive directions with respect to the upper side and the right side, respectively, of each figure. Arrows in the figure indicate the directions of inclination of the detecting reflection surface. Also, this coordinate system is also used for embodiments to be described later.

The deflection angle detecting device of this embodiment has a light source, a detecting reflection surface 4, a beam splitter 3, and photodetector 5.

The light source is a semiconductor laser 1 (a semiconductor laser element) emitting a laser beam (detection light) toward the detecting reflection surface 4 provided to a light-deflecting element. Reference symbol A denotes an optical axis which coincides with the optical axis of the semiconductor laser 1. The semiconductor laser 1 is placed opposite to the detecting reflection surface 4 so that the optical axis A is nearly perpendicular to the detecting reflection surface 4.

On the optical axis A is placed the stop 2 which restricts the transmission range of the laser beam to reform the laser beam into a preset shape such as a circle. Optically, the same state that a stop is provided, depending on the size of the laser beam, is brought about, and thus the stop 2 need not necessarily be used.

The beam splitter 3 which reflects part of the laser beam to switch the optical path to the direction of an optical axis B is placed on the optical axis A between the stop 2 and the detecting reflection surface 4. The beam splitter 3 is constructed of a coating with a transmittance of about 50% and a reflectance of about 50%, deposited on a surface 3a of a flat plate, with OHARA S-BSL7, glass such as a white plate, or plastic such as ZEONEX as a material. There is no limit to the angle of the beam splitter surface 3a, but in each figure, the surface 3a is inclined by 45° with respect to the optical axis A. The beam splitter surface 3a is placed parallel with the X axis over the entire length of the flat plate extending in the X direction.

The photodetector 5 is placed on the optical axis B split by the beam splitter 3. Reference numeral 6 represents a sensor light-receiving surface of the photodetector 5.

The detecting reflection surface 4 has positive power. The detecting reflection surface 4 may be constructed with a back-surface mirror configured into a concave shape, having a medium with a refractive index of 1 or more, or a front surface mirror.

Also, although any semiconductor laser may be used as the semiconductor laser 1, it is natural to select a laser provided with a proper wavelength in the relationship with the detection sensitivity of the photodetector 5. Since any well-known means may be used, it is needless to say that the semiconductor laser 1 is connected to a driving means including a power supply and a modulation driving circuit, not shown, for properly emitting light.

Figure 3:
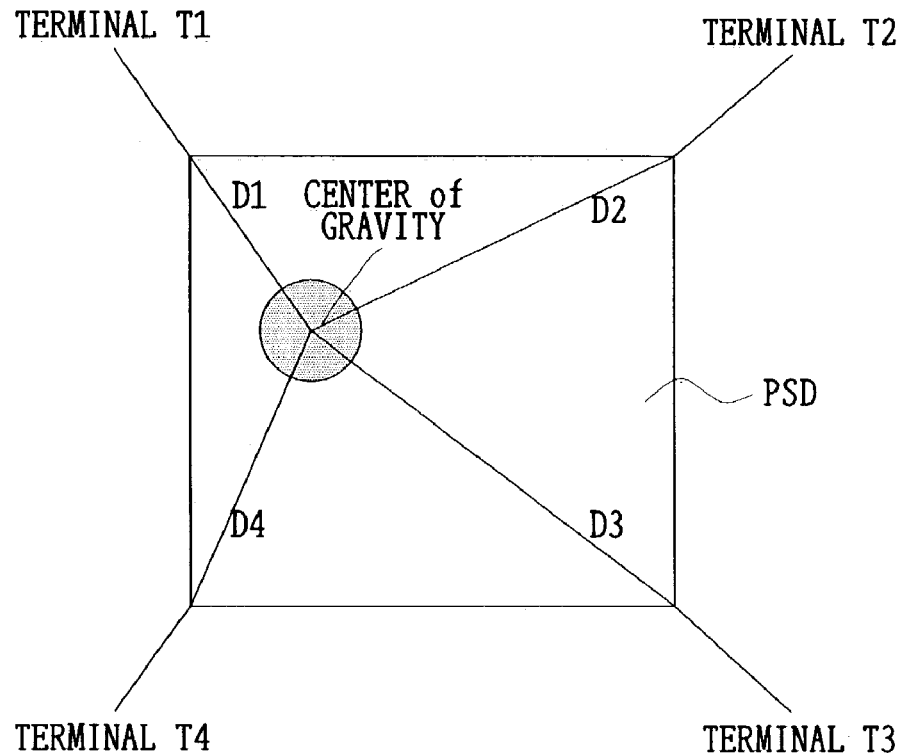
FIG. 3 is a conceptual view showing a position sensitive detector which is applicable to the photodetector in the deflection angle detecting device of the present invention.

As the photodetector 5, the position sensitive detector (the so-called PSD) can be adopted in which when the sensor light-receiving surface 6 is radiated with the spot of the laser beam, a voltage corresponding to the center position of the light intensity of the spot is output to sense the position of the spot. The PSD is constructed with an array of many photodiodes, for example, as shown in FIG. 3, so that when a preset part is radiated with the light beam, voltages corresponding to distances D1, D2, D3, and D4 from the corners of the PSD to the center of the light beam are output from four terminals T1, T2, T3, and T4, and the position (the inclination in X and Y directions) can be detected by calculating these output values.

As the photodetector 5, a detector is adopted in which a one- or two-dimensional position is detected in accordance with whether the inclination of the detecting reflection surface 4 is one-dimensional (in the X or Y direction) or two-dimensional (in the X and Y directions). Also, it is needless to say that the photodetector 5, because of its operation, is provided with a proper driving means, not to speak of the power supply, but this is well known and thus its explanation is omitted.

In the deflection angle detecting device of the first embodiment constructed as mentioned above, laser light emitted from the semiconductor laser 1 which is the light source, as shown in FIG. 2A, is restricted in its beam size by the stop 2 and is incident on the flat-plate-shaped beam splitter 3. About 50% of the laser light is transmitted through the beam splitter surface 3a and is reflected by the detecting reflection surface 4. In this case, reflected laser light is condensed by receiving optical positive power by the detecting reflection surface. The laser light is incident again on the beam splitter 3 and is split into transmitted light and reflected light by the beam splitter surface 3a. The reflected light is switched to an optical path bent nearly perpendicular to the optical path of incidence and enters the photodetector 5 to form a light spot.

When the detecting reflection surface 4 is inclined in the X and Y directions, the photodetector 5 detects the amount of inclination by detecting the position of the spot on the sensor light-receiving surface 6.

Figure 4:
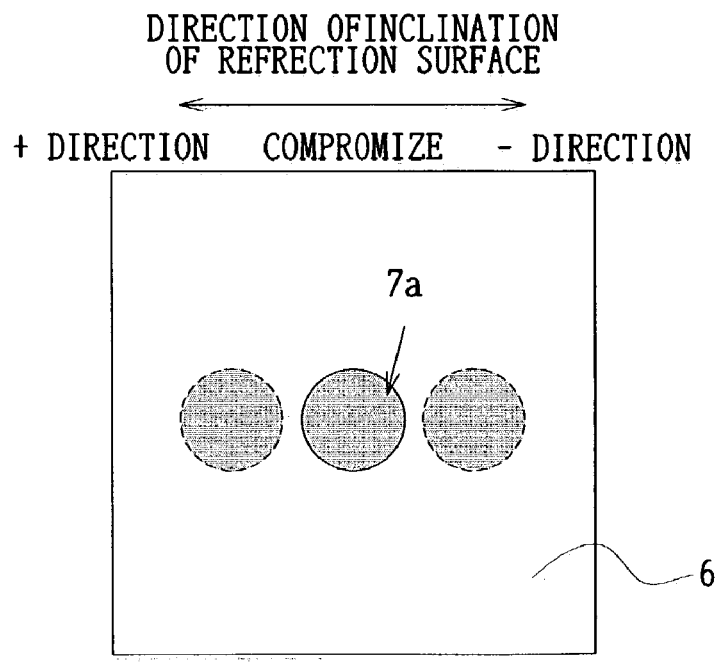
FIG. 4 is an explanatory view showing a state where a detecting reflection surface is inclined in a one-dimensional direction (the X direction or the Y direction) and a spot is formed on a sensor light-receiving surface of the photodetector.
Figure 5:
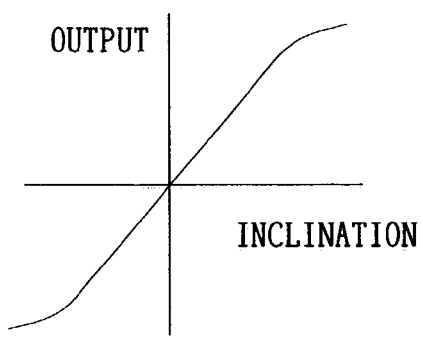
FIG. 5 is a graph showing the relation between the amount of inclination of the detecting reflection surface and the output of the photodetector.

FIG. 4 shows a state where the detecting reflection surface 4 is inclined in the one-dimensional direction (the X or Y direction) and a spot 7a is formed on the sensor light-receiving surface 6 of the photodetector 5. FIG. 5 shows the relationship between the amount of inclination of the detecting reflection surface 4 and the output of the photodetector 5.

Figure 6:
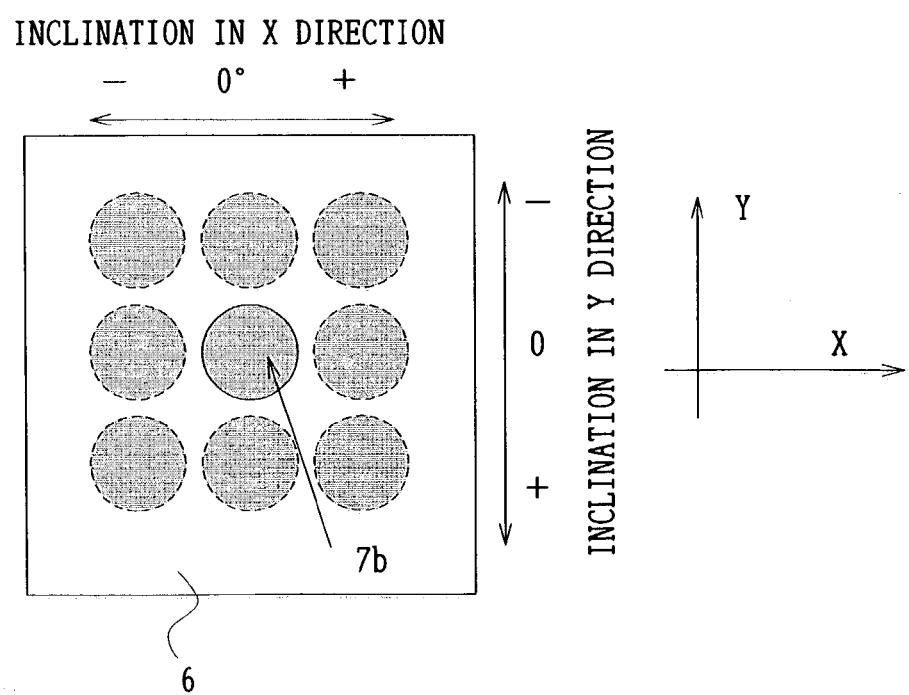
FIG. 6 is an explanatory view showing a state where the detecting reflection surface is inclined in a two-dimensional direction and a spot is formed on the sensor light-receiving surface of the photodetector.

When the detecting reflection surface 4 is inclined one-dimensionally, the position of the spot 7a on the light-receiving surface 6 of the photodetector 5 is shifted. In this case, the output of the photodetector 5, as shown in the graph of FIG. 5, is almost linearly changed. FIG. 6 shows a state where the detecting reflection surface 4 is inclined in the two-dimensional direction and a spot 7b is formed on the sensor light-receiving surface 6 of the photodetector 5. When the detecting reflection surface 4 is inclined in the X and Y directions, the spot 7b on the light-receiving surface 6 is moved in the two-dimensional direction. In this case, an output in each direction likewise is as shown in 15 the graph of FIG. 5, and the relationship between the amount of inclination (angle) of the detecting reflection surface and the output becomes favorable in linearity. In the first embodiment, the inclination of the detecting reflection surface 4 can be detected within around ±10°.

In the construction of the first embodiment, therefore, it becomes possible to use path switching of light pickup, the tracking means, and a light switching means of optical communication which require detection in a wide range of the inclination of the detecting reflection surface.

Also, in the embodiment of the present invention, a four-divided light-receiver (a four-divided position detector) is used as the photodetector, instead of the position sensitive detector (PSD), and thereby the deflection angle can also be detected.

Figure 7:
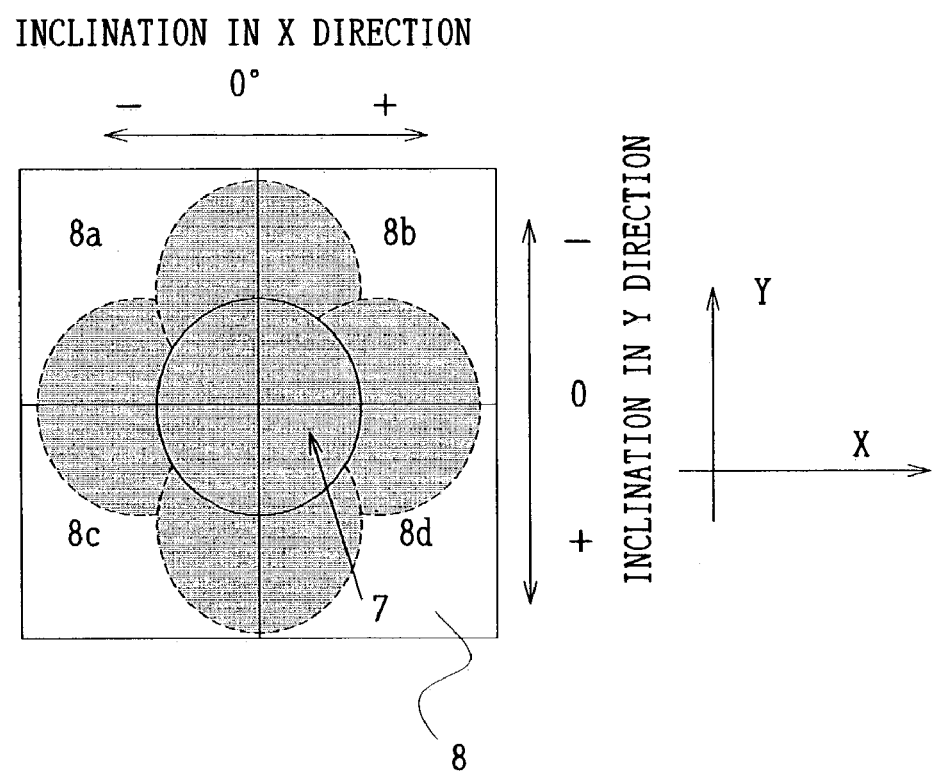
FIG. 7 is an explanatory view showing a state where a spot s formed on the sensor light-receiving surface of the photodetector using a divided light-receiver (a four-divided position detector)

FIG. 7 shows a state where a spot 7 is formed on the sensor light-receiving surface 6 of the photodetector 5 using the divided light-receiver (the four-divided position detector).

The spot diameter of the laser light A condensed on the photodetector 5 using the four-divided light-receiver (the four-divided position detector) is such as to be larger than that of the laser light condensed on the photodetector using the PSD. A light-receiving surface 8 of the photodetector 5 is divided into four light-receiving subsurfaces (represented by 8a, 8b, 8c, and 8d). When the detecting reflection surface 4 is two-dimensionally inclined in the X and Y directions, the spot 7 on the light-receiving surface 8 is moved in a two-dimensional direction. In this case, when outputs corresponding to the areas of the light-receiving subsurfaces 8a, 8b, 8c, and 8d, radiated with the laser light are represented by A, B, C, and D, the output corresponding to the position in the X direction is obtained by calculating (A+D−B−C)/(A+B+C+D) and the output corresponding to the position in the Y direction by calculating (A+B−C−D)/(A+B+C+D). The calculated output in each direction is almost linearly changed as far as the spot is uniform in shape.

According to the deflection angle detecting device of the first embodiment constructed as mentioned above, the following advantages are obtained.

Where the laser light from the light source is condensed by a positive lens alone, considerable curvature of field is produced in order to form the spot, and the spot changes markedly in size at the center and the end of the photodetector 5. According to the deflection angle detecting device of the first embodiment, however, major power for condensing light is imparted to the concave mirror which is the detecting reflection surface, so that the surface of the mirror can be made smaller in curvature than that of a convex lens, such as the condenser lens 71 of the conventional deflection angle detecting device shown in FIG. 1, and the production of curvature of field can be lessened. Hence, the spot is formed with little change in size at the center and the end of the photodetector 5, and read accuracy at the photodetector 5 can be improved.

In the deflection angle detecting device of the first embodiment, the detecting reflection surface 4 is configured as a curved surface (the concave mirror) having a function of condensing light. Consequently, the spot can be formed on the photodetector, the condenser lens is not required, the number of parts is reduced, cost and fabrication are advantageous, and lightweight and compact design can be achieved.

According to the deflection angle detecting device of the first embodiment, a major condensing function is performed by the concave mirror of the detecting reflection surface, and thus a loss in the amount of laser light is reduced so that the laser light can be effectively used. Even when the layout is mechanically limited, the diameter of the spot formed on the photodetector 5 and the amount of movement of the spot can be optimized by changing the focal length of the concave mirror, and a wide range of detection becomes possible with respect to the inclination of the detecting reflection surface 4.

The present applicant has considered the construction that a concave mirror is used as the condenser lens and a beam splitter is used for the path switching element, as a deflection angle detecting device. Specifically, the light source and the detecting reflection surface are arranged opposite to each other, with the beam splitter between them, and the concave mirror and the photodetector are arranged opposite to each other, with the beam splitter between them, so as to intersect with the optical path connecting the light source and the detecting reflection surface.

In this construction, however, the light beam from the light source is transmitted through the beam splitter with a transmittance of about 50%, and after being reflected by the detecting reflection surface, is reflected by the beam splitter with a reflectance of about 50% to switch the optical path and by the concave mirror which is the condenser lens, and is again transmitted through the beam splitter with a transmittance of about 50% to reach the photodetector. That is, the light beam from the light source passes three times through the beam splitter, and thus the amount of laser light is reduced to ⅛ when the laser light reaches the photodetector.

According to the deflection angle detecting device of the first embodiment, by contrast, the detecting reflection surface 4 is constructed with the concave mirror whose back side has a function of condensing light. The light beam from the light source is transmitted through the beam splitter, and after being reflected by the detecting reflection surface 4 having the function of condensing light, is reflected by the beam splitter to switch the optical path and reach the photodetector 5. Consequently, the laser beam passes only twice through the beam splitter, and ¼ of the amount of laser light can be used in the photodetector so that read accuracy can be improved.

The present applicant has considered the construction that a concave mirror is used as the condenser lens and a polarization beam splitter is used for the path switching element, as another deflection angle detecting device. Specifically, the light source and the detecting reflection surface are arranged opposite to each other, with the polarization beam splitter between them, and the concave mirror and the photodetector are arranged opposite to each other, with the polarization beam splitter between them, so as to intersect with the optical path connecting the light source and the detecting reflection surface. In this construction, the use of the concave mirror as the condenser lens and the polarization beam splitter as the path switching element allows a loss in the amount of light to be lessened.

In the case of the above construction, however, quarter-wave plates must be placed, for example, between the polarization beam splitter and the detecting reflection surface and between the concave mirror and the polarization beam splitter, and a plurality of quarter-wave plates are required, with a resulting increase in cost.

According to the deflection angle detecting device of the first embodiment, by contrast, neither the polarization beam splitter nor the quarter-wave plate is required, and a large amount of light can be introduced into the photodetector.

Also, in the deflection angle detecting device of the first embodiment, the path switching element or the path switching plane may be constructed with a half mirror, a holographic surface, or a total reflection surface. When the light source and the detecting reflection surface provided with the concave side are arranged opposite to each other as the deflection angle detecting device of the first embodiment, the number of quarter-wave plates can be reduced by one, compared with the example before the above description, even though the path switching element or the path switching plane is constructed with the polarization beam splitter. When the polarization beam splitter is used, a loss in the amount of light is halved even though a source beam is very faint, and hence it becomes possible to make measurement with a high degree of accuracy through the photodetector.

According to the deflection angle detecting device of the first embodiment, reflected light from the detecting reflection surface 4 is bent through the beam splitter 3 and is introduced into the photodetector 5. Since the optical path is bent in this way, compact mechanical layout can be achieved.

The beam splitter which is the path switching element in the deflection angle detecting device of the first embodiment, as shown in FIG. 2A, may be constructed so that the beam splitter surface 3a is configured on one surface of a triangular prism and is sandwiched between two triangular prisms. In this case, the beam splitter can be assembled on the basis of a flat surface 3b which is not the optical working surface, and thus the efficiency and accuracy of assembly are improved. Even in each of remaining three surfaces, a positioning means can be set outside an effective area which has no optical work.

Second Embodiment

Figure 8:
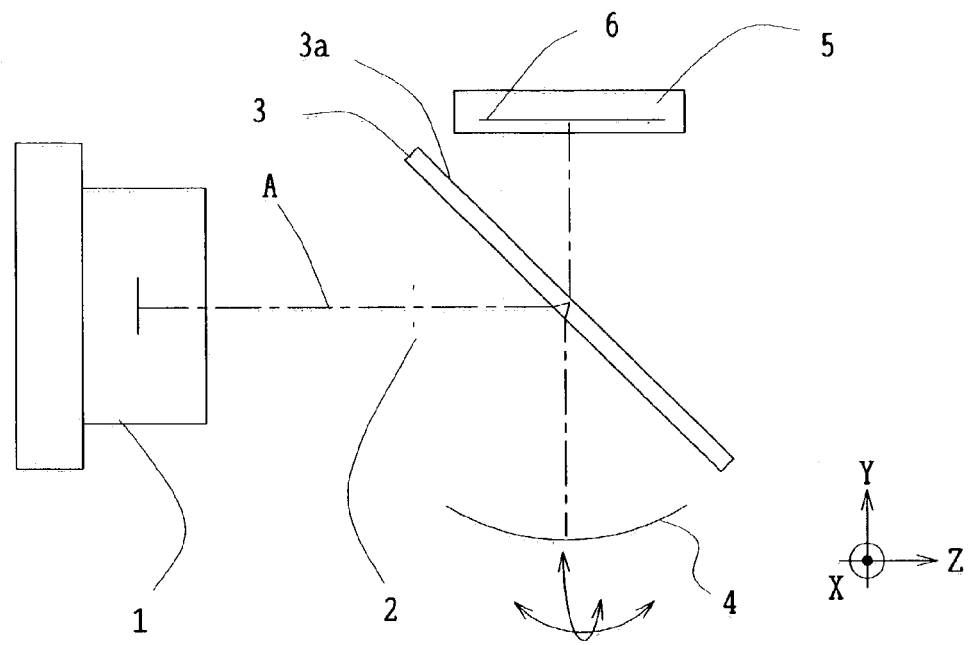
FIG. 8 is a view showing schematically the deflection angle detecting device in a second embodiment of the present invention.

FIG. 8 shows the deflection angle detecting device of the second embodiment in the present invention. The deflection angle detecting device of this embodiment is the same as that of the first embodiment with the exception that the photodetector and the detecting reflection surface are arranged opposite to each other through the beam splitter. Reference is made to only a construction different from the first embodiment.

In the deflection angle detecting device of the second embodiment, as shown in FIG. 8, laser light emitted from the semiconductor laser 1 which is the light source and after its beam diameter is stopped down by the stop 2, is incident on the flat-plate-shaped beam splitter 3. The laser light is reflected by the beam splitter surface 3a with a reflectance of about 50% and is incident on the detecting reflection surface 4 after the optical path is bent at nearly right angles. The detecting reflection surface 4 has optical power, and the laser light reflected thereby is split again into transmitted light and reflected light by the beam splitter surface 3a, and after passing through the beam splitter 3 as 50% transmitted light to enter the photodetector 5, forms a light spot on the light-receiving surface 6. The photodetector 5, like the first embodiment, is the PSD.

In FIG. 8, since the concave mirror of the detecting reflection surface 4 is inclined, with the X and Z axes as centers, and thus when the mirror has a rotationally symmetrical surface profile, a load due to the rotation angle is the same, it becomes easy to control the mirror mechanically and electrically. In the second embodiment, the concave mirror is configured into a spherical shape. Moreover, when the surface of the concave mirror is configured as a rotationally symmetrical aspherical surface, aberration can be further suppressed. Where much account of aberration is made, it is also possible to configure the detecting reflection surface 4 as a free-formed surface which has a rotationally asymmetric surface profile. In this case, it is desirable that the difference of the amounts of SAG (the amounts of change at the Z axis) of the mirror at four corners of the effective diameter is small.

Figure 9:
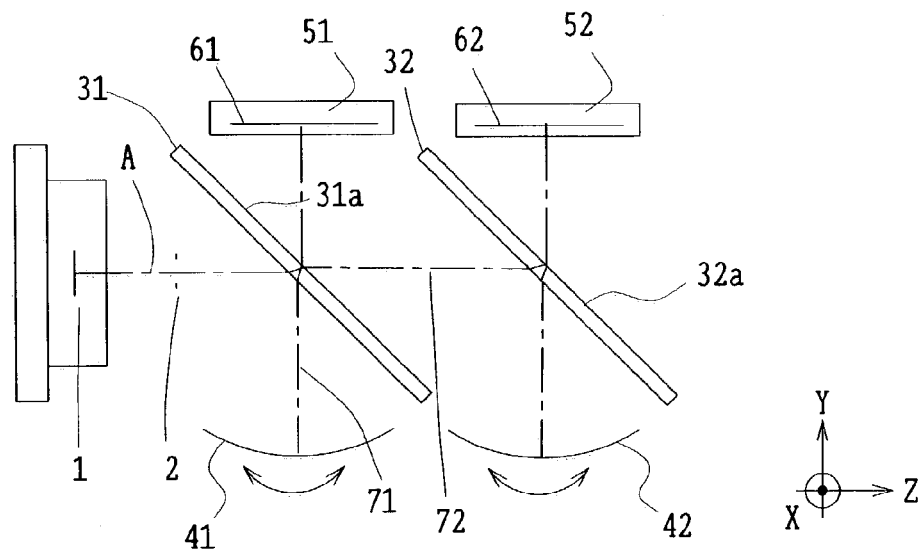
FIG. 9 is a view showing schematically the deflection angle detecting device in a modified example of the second embodiment.

As a modified example of the deflection angle detecting device of a type such as that of the second embodiment, as shown in FIG. 9, it is also possible to arrange, in parallel, first and second flat-plate-shaped beam splitters 31 and 32 having beam splitter surfaces 31a and 32a, respectively, as well as first and second detecting reflection surfaces 41 and 42. In this case, laser light emitted from the single light source 1 is incident on the first beam splitter 31 and is split into 50% reflected light 71 and 50% transmitted light 72. The reflected light 71 follows the same optical path as in the description of FIG. 8, and after being reflected by the detecting reflection surface 41 to enter the first beam splitter 31, is split into transmitted light and reflected light. The light transmitted through the first beam splitter 31 reaches a first photodetector 51. The 50% transmitted light 72 transmitted through the first beam splitter 31 is incident on the second beam splitter 32 having the beam splitter surface 32a, placed adjacent thereto. The light reflected by the detecting reflection surface 42 is incident on the second beam splitter 32 and is split into transmitted light and reflected light, and the light transmitted through the second beam splitter 32 is incident on a second photodetector 52 to form a light spot. Whereby, the angles of the two detecting reflection surfaces can be measured simultaneously by providing only a single light source which is the semiconductor laser, and a sensor which is low in cost and small in size can be obtained. Also, by changing the curvatures of the detecting reflection surfaces 41 and 42, identically constructed PSDs may be used instead of the PSDs 51 and 52. Alternatively, different PSDs may be used without changing the curvatures of the detecting reflection surfaces 41 and 42. It is only necessary that such matter is properly selected in view of the mechanical factor and the factor of cost of the device.

Third Embodiment

Figure 10:
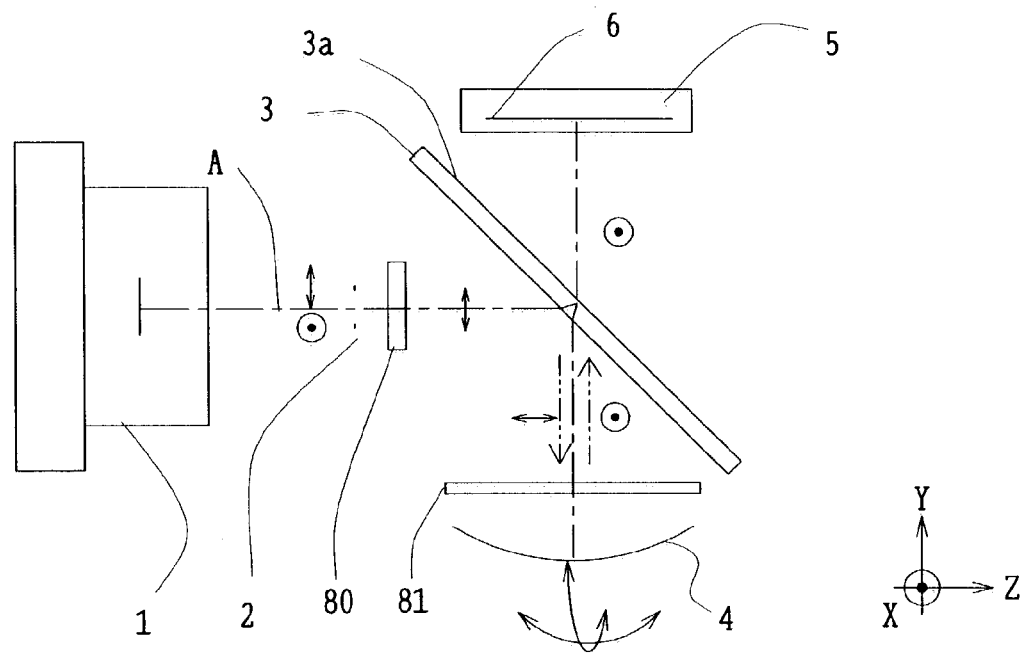
FIG. 10 is a view showing schematically the deflection angle detecting device in a third embodiment of the present invention.

FIG. 10 shows the deflection angle detecting device of the third embodiment in the present invention. In this embodiment, instead of the beam splitter in the deflection angle detecting device of the second embodiment, a polarization beam splitter is placed as the path switching element.

The deflection angle detecting device of the third embodiment, as shown in FIG. 10, is such that laser light emitted from the semiconductor laser 1 which s the light source is restricted in its beam diameter by the stop 2 and is incident on a polarizing plate 80 having the property of transmitting a p-polarized component alone. The laser light passing through the polarizing plate 80 becomes light of the p-polarized component alone and is incident on the flat-plate-shaped polarization beam splitter 3 coated with a polarization beam splitter film. The polarization beam splitter 3 has a reflectance of about 100% for the p-polarized light and a reflectance of about 0% for the s-polarized light, and exhibits the properties that the transmittance of the s-polarized light is about 100% and that of the p-polarized light is about 0%. The laser light, which is the p-polarized light, incident on the flat plate 3 is reflected by the beam splitter surface 3a with a reflectance of about 100%, and enters a quarter-wave plate 81 after the optical path is bent at nearly right angles. The laser light passing through the quarter-wave plate 81 becomes circularly polarized light and is reflected by the detecting reflection surface 4. The detecting reflection surface 4 has optical power, and the function of condensing light is imparted to the laser light. The laser light reflected by the detecting reflection surface 4 passes again through the quarter-wave plate 81, but in this case, it is changed to polarized light that is rotated by 90° from the phase angle of incident light, that is, the so-called s-polarized light. Subsequently, the laser light changed to the s-polarization light is incident on the polarization beam splitter 3. Here, since the polarization beam splitter surface 3a of the polarization beam splitter 3 has a transmittance of about 100% for the s-polarized light, approximately 100% of the laser light changed to the s-polarized light is transmitted through the polarization beam splitter 3 and is incident on the photodetector 5 to form a light spot on the light-receiving surface 6.

Also, in FIG. 10, the detecting reflection surface 4 and the photodetector 5 are arranged opposite to each other through the polarization beam splitter 3, but as in the first embodiment of FIGS. 2A and 2B, even when the light source 1 and the detecting reflection surface 4 are arranged opposite to each other through the polarization beam splitter 3, the same effect is brought about.

Fourth Embodiment

The deflection angle detecting device of this embodiment, like the deflection angle detecting device shown in FIG. 9, is of a type that the single light source is used to measure the inclinations of two detecting reflection surfaces and is constructed so that, by arranging, in parallel, the first and second flat-plate-shaped polarization beam splitters 31 and 32 having the polarization beam splitter surfaces 31a and 32a, respectively, as well as the first and second detecting reflection surfaces 41 and 42, a loss in the amount of light is lessened, accuracy is favorable, and measurements can be made simultaneously.

Figure 11:
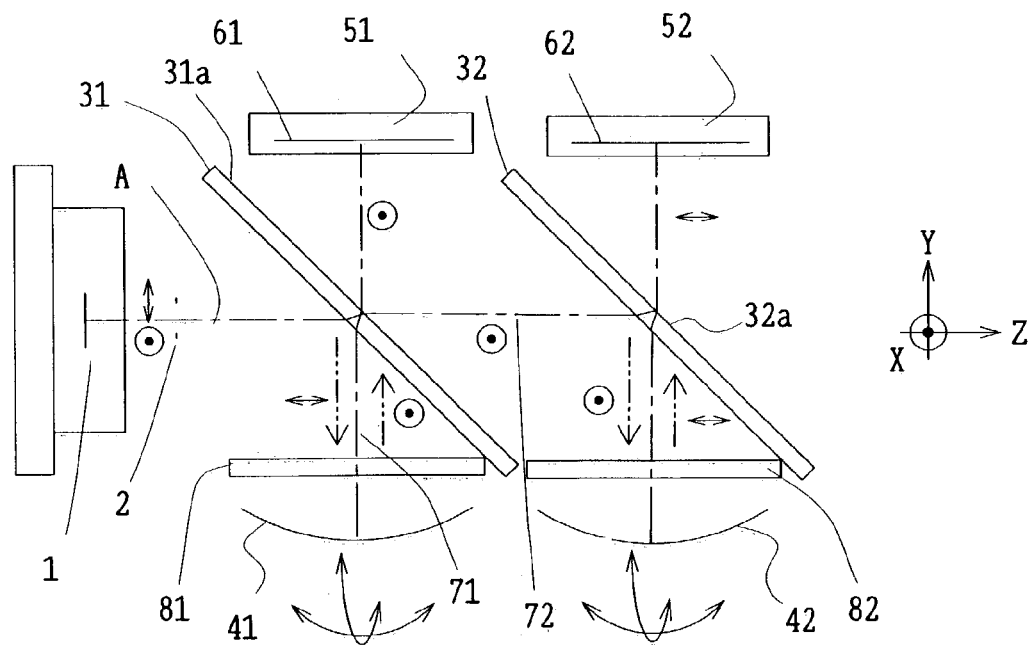
FIG. 11 is a view showing schematically the deflection angle detecting device in a fourth embodiment of the present invention.

FIG. 11 shows the deflection angle detecting device of the fourth embodiment in the present invention. Here, for convenience of explanation, the first polarization beam splitter 31, the first detecting reflection surface 41, and the first photodetector 51 are together called a first optical element unit, and the second polarization beam splitter 32, the second detecting reflection surface 42, and the second photodetector 52 are together called a second optical element unit.

In the deflection angle detecting device of the fourth embodiment, as shown in FIG. 11, the first optical element unit is such that laser light emitted from the semiconductor laser 1 which is the light source is restricted in its beam diameter by the stop 2 and is incident on the first flat plate 31 coated with the polarization beam splitter film. The polarization beam splitter has the same characteristic as in the third embodiment, and the laser light of random polarization is such that an approximately 50% p-polarized component is reflected by the first beam splitter 31 and an approximately 50% s-polarized component is transmitted therethrough. The laser beam from the light source 1 is such that p-polarized light is reflected by the beam splitter surface 31a of the first beam splitter 31 and is incident on a first quarter-wave plate 81 after the optical path is bent at nearly right angles. The laser light is changed to circularly polarized light though the first quarter-wave plate 81 and is reflected by the first detecting reflection surface 41. The first detecting reflection surface 41 has optical power, and the function of condensing light is imparted to the laser light. The laser light reflected by the detecting reflection surface 41 passes again through the first quarter-wave plate 81, but at this time, it is changed to polarized light that is rotated by 90° from the phase angle of incident light, that is, the so-called s-polarized light. The laser light changed to the s-polarized light is incident on the first polarization beam splitter 31. Here, since the first beam splitter 31 has the polarization beam splitter characteristic that the transmittance of the s-polarized component is about 100%, the laser light changed to the s-polarized light is transmitted therethrough about 100% and is incident on the first photodetector 51 to form light spot on a light-receiving surface 61.

Subsequently, in the second optical element unit, of random polarized light from the light source, the 50% s-polarized light transmitted through the first polarization beam splitter 31 is incident on the second beam splitter 32.

Here, the characteristics of the polarization beam splitter imparted to the flat plate of the second polarization beam splitter 32 are opposite to those of the first polarization beam splitter 31. The second polarization beam splitter 32 is constructed to have a reflectance of about 100% for the s-polarized component and a reflectance of about 0% for the p-polarized component and to exhibit the characteristics that the transmittance of the p-polarized component is about 100% and the transmittance of the s-polarized component is about 0%. The laser beam of the s-polarized light incident on the second polarization beam splitter 32 is reflected about 100% by the beam splitter surface 32a of the second polarization beam splitter 32 and is incident on a second quarter-wave plate 82 after the optical path is bent at nearly right angles. The laser light is changed to circularly polarized light through the second quarter-wave plate 82 and is reflected by the second detecting reflection surface 42. The second detecting reflection surface 42 has optical power, and the function of condensing light, as in the first optical element unit, is imparted to the laser light. The laser light reflected by the detecting reflection surface 42 passes again through the second quarter-wave plate 82, but at this time, it is changed to polarized light that is rotated by 90° from the phase angle of incident light, that is, the so-called p-polarized light. The laser light changed to the s-polarized light is incident on the second polarization beam splitter 32. Here, since the second polarization beam splitter 32 has the polarization beam splitter characteristic that the transmittance of the p-polarized component is about 100%, the laser light changed to the p-polarized light is transmitted therethrough about 100% and is incident on the second photodetector 52 to form light spot on a light-receiving surface 62.

According to the deflection angle detecting device of the fourth embodiment, the characteristics of the first and second polarization beam splitters are made different from each other (reverse), and thereby, of the light beam from the light source, 50% light which is the p-polarized light and 50% light which is s-polarized light can be conducted to the photodetectors by the first optical element unit and the second optical element unit, respectively, without loss of the amount of light. Consequently, it becomes possible to make measurements with a high degree of accuracy.

Since only the single semiconductor laser is required for the light source, the number of parts is reduced, space saving and the simplification of assembly can be afforded, and a cost reduction in parts and a power reduction on operation can be achieved.

Other effects of optical performance are almost the same as in the third embodiment.

Fifth Embodiment

Figure 12A:
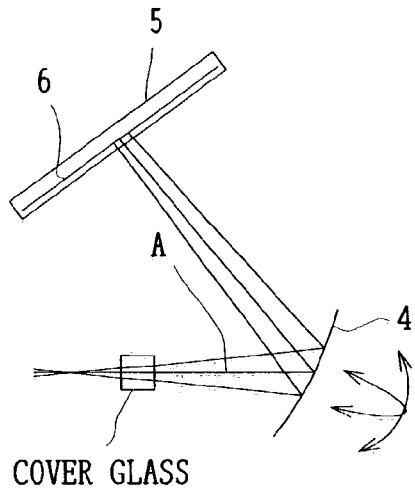
FIGS. 12A, 12B, and 12C are views showing schematically constructions where the mirror of the deflection angle detecting device is variously rotated in a fifth embodiment of the present invention.
Figure 12B:
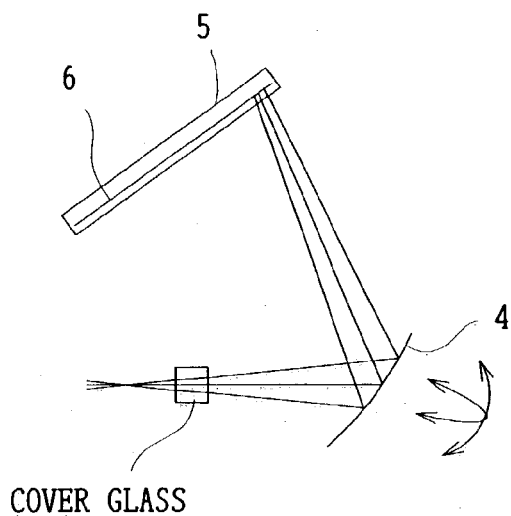
Figure 12C:
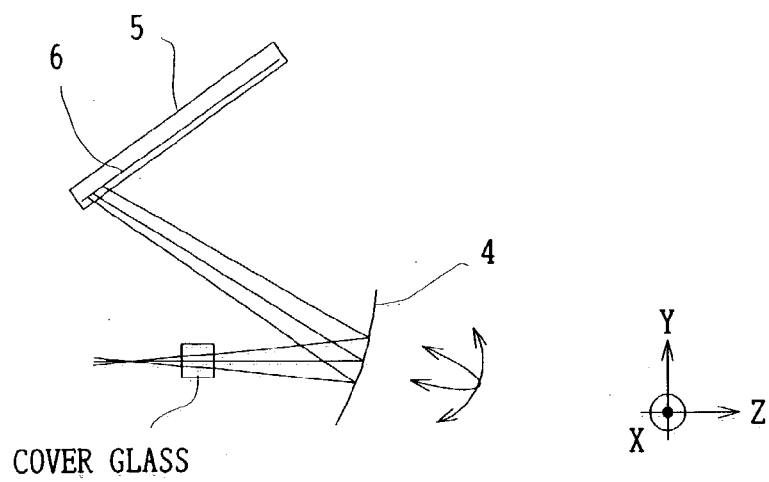

FIGS. 12A, 12B, and 12C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the fifth embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface of a rotationally asymmetric surface profile which combines a function of switching the optical path with a function of condensing light, and the beam splitter or the polarization beam splitter in the first to fourth embodiments is not used.

In the deflection angle detecting device of the fifth embodiment, as shown in the figures, laser light emitted from the semiconductor laser 1 which is the light source is restricted in its beam diameter by the stop 2 and is reflected by the detecting reflection surface 4. The detecting reflection surface 4 is decentered with respect to the optical axis so that reflected light does not interfere with the light source or the stop. When the optical path is switched, the reflected light reflected by the detecting reflection surface 4 undergoes at the same time the function of condensing light by the optical power of the rotationally asymmetric surface profile configured on the detecting reflection surface 4 and is incident on the photodetector 5 to form a light spot on the light-receiving surface 6.

According to the deflection angle detecting device of the fifth embodiment, the surface of the function of condensing light and the surface of the function of switching the optical path are combined, and thus the path switching means of the path switching element, such as the beam splitter or the polarization beam splitter, is not required. Consequently, the number of parts is reduced, cost is considerably lowered, and the man-hour of assembly can also be reduced. The number of degrees of layout freedom is mechanically increased, and compactness can be achieved. Since the detecting reflection surface 4 can be configured as the surface with a reflectance of 100% and the source beam is conducted to the photodetector with little loss of the amount of light, it becomes possible to make measurements with a high degree of accuracy.

However, a decentered surface suffers from special aberration caused by decentration. For example, astigmatism or coma is produced and distortion (image distortion) assumes the shape of a trapezoid or an arc, peculiar to decentering aberration. In the deflection angle detecting device of the fifth embodiment, the detecting reflection surface 4 is decentered and placed to switch the optical path and suffers from special aberration caused by decentration. Thus, in the deflection angle detecting device of the fifth embodiment, the detecting reflection surface 4 is configured as an rotationally asymmetric surface. As such, by making a difference of curvature or inclination between the upper and lower portions of the effective diameter, decentering aberration can be favorably corrected.

Also, if the influence of the decentering aberration is slight, the detecting reflection surface 4 may be configured as a rotational symmetrical surface.

Sixth Embodiment

Figure 13A:
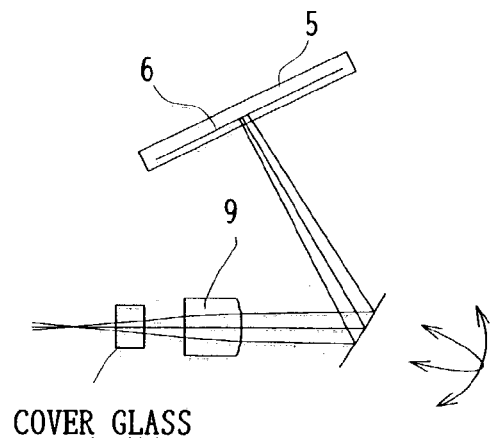
FIGS. 13A, 13B, and 13C are views showing schematically constructions where the mirror of the deflection angle detecting device is variously rotated in a sixth embodiment of the present invention.
Figure 13B:
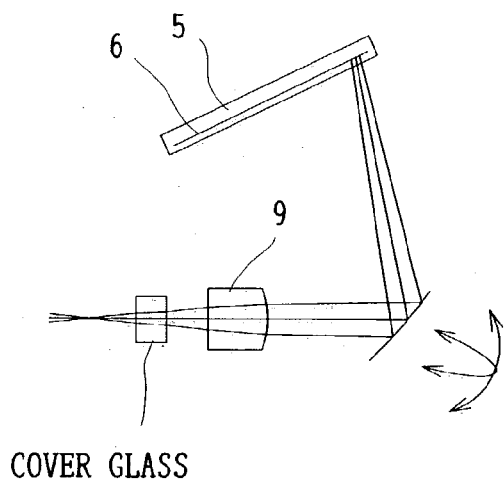
Figure 13C:
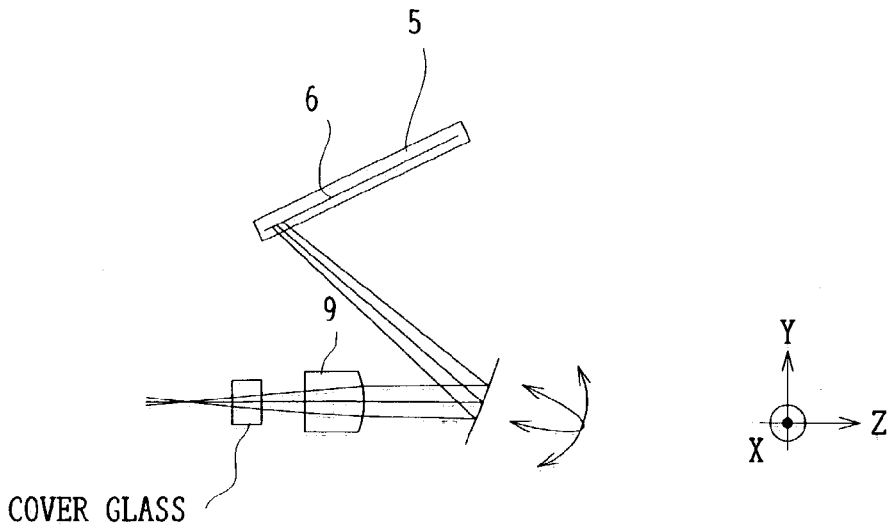

FIGS. 13A, 13B, and 13C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the sixth embodiment of the present invention. Here, in the rotation angle of the mirror, it is assumed that counterclockwise rotation around the X axis takes a positive sign.

The deflection angle detecting device of this embodiment is constructed so that an optical element 9 is interposed between the light source and the detecting reflection surface 4, which is configured as the reflection surface of an irrotational symmetrical surface profile which combines a function of switching the optical path with a function of condensing light. Reference is made to only a construction different from the fifth embodiment.

In the deflection angle detecting device of the fifth embodiment, as shown in the figures, laser light emitted from the semiconductor laser 1 which is the light source is restricted in its beam diameter by the stop 2 and passes through the optical element 9 interposed between the light source and the detecting reflection surface 4. Divergent light from the light source, when passing through the optical element 9, is subjected to a function of condensing light. The light subjected to the function of condensing light is reflected by the detecting reflection surface 4. The detecting reflection surface 4 is decentered with respect to the optical axis so that reflected light does not interfere with the light source or the stop. When the optical path is switched, the reflected light reflected by the detecting reflection surface 4 undergoes at the same time the function of condensing light by the optical power of the irrotational symmetrical surface profile configured on the detecting reflection surface 4 and is incident on the photodetector 5 to form a light spot on the light-receiving surface 6.

According to the deflection angle detecting device of the sixth embodiment, the optical element 9 is provided between the light source and the detecting reflection surface 4, and thus the function of condensing light can be distributed to the optical element 9 and the detecting reflection surface 4 to lessen the optical power of the detecting reflection surface 4. Since the detecting reflection surface 4 is decentered and placed and combines the function of switching the optical path, special aberration is produced by decentration. However, by lessening the optical power of the detecting reflection surface 4, the curvature can be made small and the number of degrees of freedom of the surface profile is increased so that it becomes easy to set the irrotational symmetrical surface profile which suppresses the production of the decentering aberration.

Seventh Embodiment

Figure 14A:
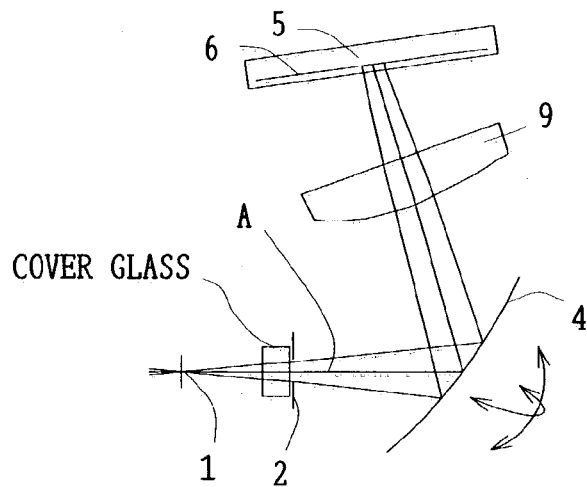
FIGS. 14A, 14B, and 14C are views showing schematically constructions where the mirror of the deflection angle detecting device is variously rotated in a seventh embodiment of the present invention.
Figure 14B:
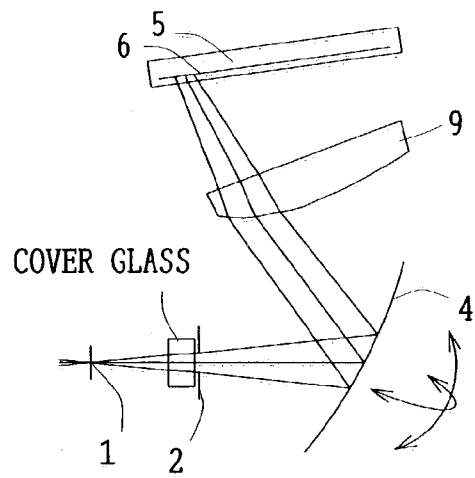
Figure 14C:
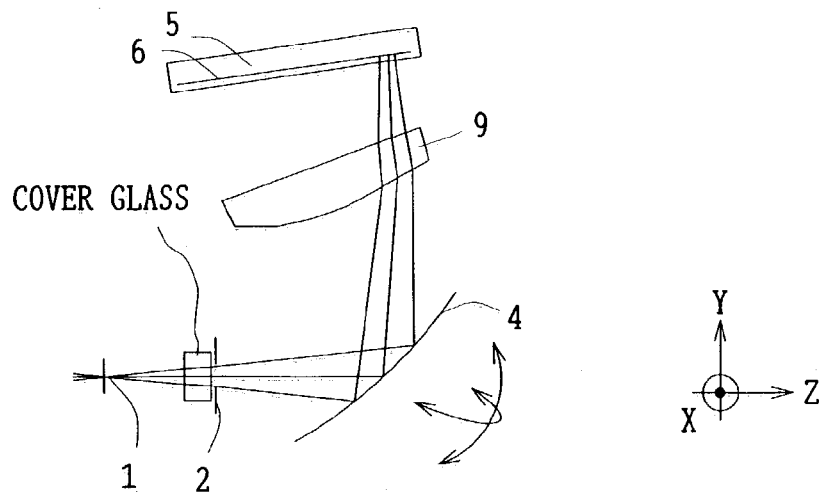

FIGS. 14A, 14B, and 14C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the seventh embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface which combines a function of switching the optical path with a function of condensing light, and the beam splitter or the polarization beam splitter in the first to fourth embodiments is not used. Moreover, the optical element 9 correcting decentering aberration is interposed between the detecting reflection surface 4 and the photodetector 5. Reference is made to only a construction different from the fifth embodiment.

In the deflection angle detecting device of the seventh embodiment, as shown in the figures, laser light emitted from the semiconductor laser 1 which is the light source is restricted in its beam diameter by the stop 2 and is reflected by the detecting reflection surface 4. The detecting reflection surface 4 is decentered with respect to the optical axis so that reflected light does not interfere with the light source or the stop. When the optical path is switched, the reflected light reflected by the detecting reflection surface 4 undergoes at the same time the function of condensing light by the optical power provided to the detecting reflection surface 4 and is incident on the optical element 9. The incident light beam is refracted through and emerges from the optical element 9, and is incident on the photodetector 5 to form a light spot on the light-receiving surface 6.

The deflection angle detecting device of the seventh embodiment is such that the detecting reflection surface 4 is rotated by ±10° around the X and Y axes. Here, in the control of the detecting reflection surface 4, when the profile of the detecting reflection surface 4 is not symmetrical, it is necessary to control the inclination angle, including the physical weight of the detecting reflection angle 4. This complicates the circuit. Furthermore, a heavy load is imposed in a certain direction, and therefore the possibility of failure is increased.

Thus, in the deflection angle detecting device of the seventh embodiment, the detecting reflection surface 4 is configured as a rotational symmetrical surface. Consequently, the control of the inclination angle is facilitated and mechanical strength can be increased.

However, since the detecting reflection surface 4 is decentered, special aberration is produced by decentration. Thus, in the deflection angle detecting device of the seventh embodiment, the optical element 9 for correction for aberration is interposed between the detecting reflection surface 4 and the photodetector 5, and hence an optical system of the least aberration can be achieved. Since the optical element 9 for correction for aberration is adapted to compensate the difference of curvature or inclination between the upper and lower portions, caused by decentration, the reflection surface is set to an irrotational symmetrical surface profile in which the curvature or inclination is different in the upper and lower portions of the effective diameter, and thereby aberration can be favorably corrected.

Eighth Embodiment

Figure 15A:
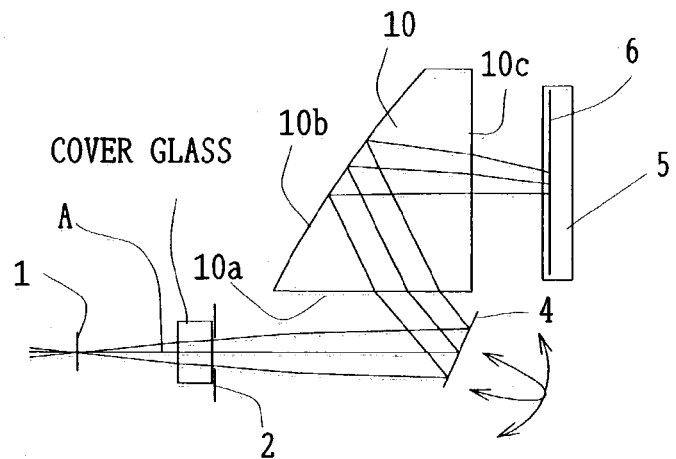
FIGS. 15A, 15B, and 15C are views showing schematically constructions where the mirror of the deflection angle detecting device is variously rotated in an eighth embodiment of the present invention.
Figure 15B:
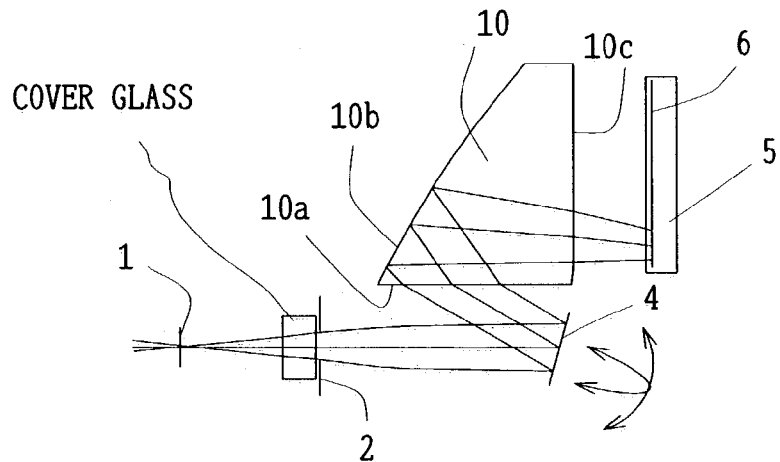
Figure 15C:
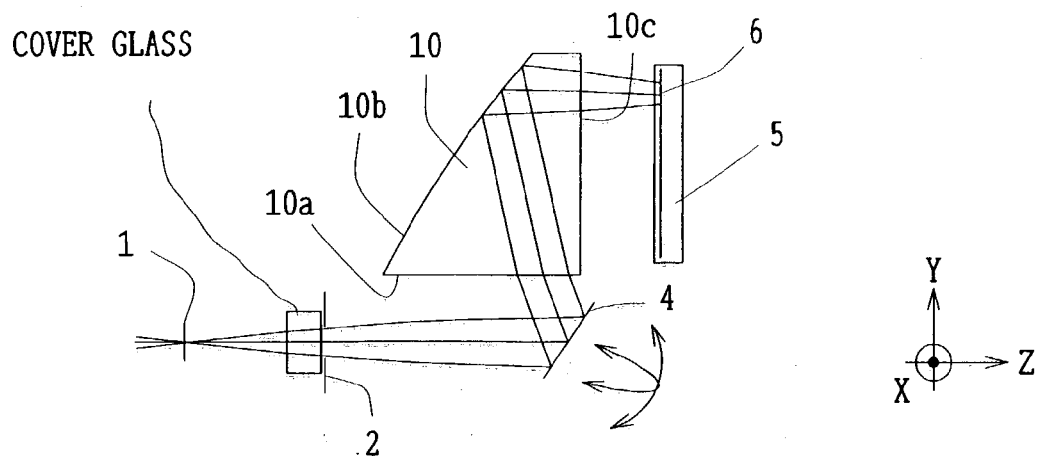

FIGS. 15A, 15B, and 15C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the eighth embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface which combines a function of switching the optical path with a function of condensing light, and the beam splitter or the polarization beam splitter in the first to fourth embodiments is not used. Moreover, an optical element, at least one optical surface of which is a reflection surface, is interposed between the detecting reflection surface 4 and the photodetector 5. Reference is made to only a construction different from the seventh embodiment.

In the deflection angle detecting device of the eighth embodiment, as shown in the figures, laser light emitted from the semiconductor laser 1 which is the light source is restricted in its beam diameter by the stop 2 and is reflected by the detecting reflection surface 4 decentered with respect to the optical axis. When the optical path is switched, the reflected light reflected by the detecting reflection surface 4 undergoes at the same time the function of condensing light by the optical power of a rotational symmetrical surface provided to the detecting reflection surface 4 and is incident on an optical element 10. The source beam, refracted through and incident on an entrance surface 10a, is reflected through a reflection surface 10b. Whereby, the light beam is subjected to the function of condensing light while changing its optical path and is refracted and transmitted through an exit surface 10c. The light beam emerging from the optical element 10 is incident on the photodetector 5 and forms a light spot on the light-receiving surface 6.

According to the deflection angle detecting device of the eighth embodiment, the optical element 10 correcting special aberration caused by decentration is constructed to include at least one reflection surface 10b. Hence, the reflection surface 10b, in contrast with a convex lens provided for correction for aberration, can be configured with small curvature to correct aberration. The reflection surface 10b of the optical element 10 not only corrects aberration produced by the detecting reflection surface 4, but also is capable of having light-condensing power of the source beam. This light-condensing power can be obtained by smaller curvature than in a convex lens or a front surface mirror. As such, according to the deflection angle detecting device of the eighth embodiment, the function of condensing light can be distributed to the detecting reflection surface 4 and the reflection surface of the optical element 10 and the detecting reflection surface 4 can be configured as the surface of small curvature. Consequently, the special aberration caused by decentration can be minimized.

The deflection angle detecting device of the eighth embodiment is constructed so that the detecting reflection surface 4 is a spherical surface rotated by ±10° around the X and Y axes, and the reflection surface 10b of the optical element 10 for correction for aberration is an irrotational symmetrical free-formed surface. Whereby, each of the entrance surface 10a and the exit surface 10c can be configured as a flat surface, and it can be used as a reference for assembly.

In addition to the construction of the eighth embodiment, when an optical element, such as a lens, is interposed between the detecting reflection surface 4 and the light source 1, the distribution of the optical power becomes possible, and the production of the special aberration by decentration can be suppressed.

Ninth Embodiment

Figure 16A:
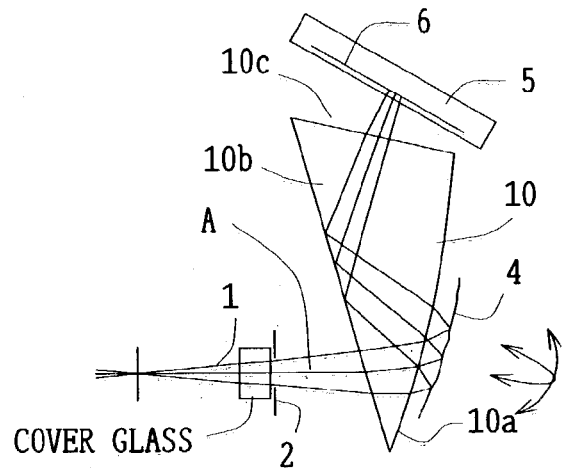
FIGS. 16A, 16B, and 16C are views showing schematically constructions where the mirror of the deflection angle detecting device is variously rotated in a ninth embodiment of the present invention.
Figure 16B:
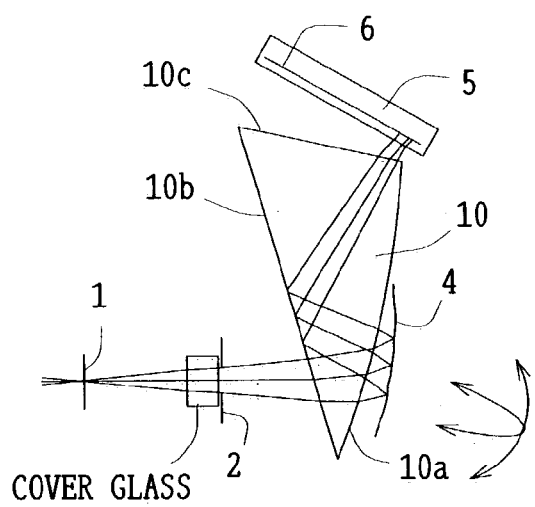
Figure 16C:
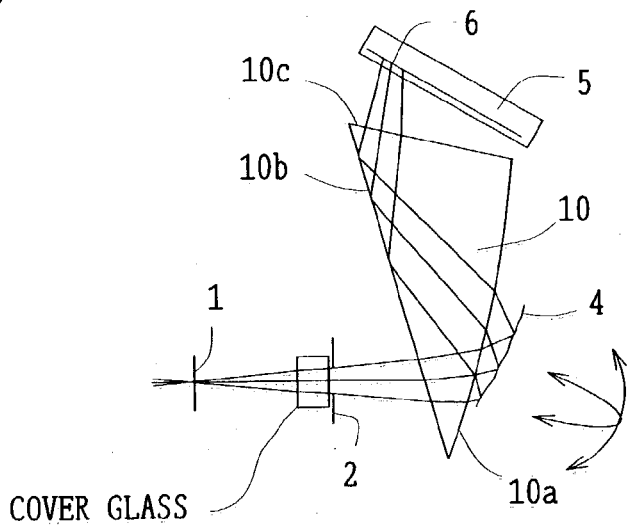

FIGS. 16A, 16B, and 16C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the ninth embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface which combines a function of switching the optical path with a function of condensing light, and the beam splitter or the polarization beam splitter in the first to fourth embodiments is not used. Moreover, the common optical element 10 is interposed between the light source 1 and the detecting reflection surface 4 and between the detecting reflection surface 4 and the photodetector 5. Reference is made to only a construction different from the eighth embodiment.

In the deflection angle detecting device of the ninth embodiment, as shown in the figures, laser light emitted from the semiconductor laser 1 which is the light source is restricted in its beam diameter by the stop 2 and is incident on the optical element 10. The light is refracted through the surfaces 10a and 10b and is subjected to the function of condensing light to emerge from the optical element 10. An emergent ray is reflected by the detecting reflection surface 4 decentered with respect to the optical axis. When the optical path is switched, the reflected light reflected by the detecting reflection surface 4 undergoes at the same time the function of condensing light by the optical power of a concave surface provided to the detecting reflection surface 4 and is incident on the optical element 10. The source beam, refracted through and incident on the entrance surface 10a, is reflected through the reflection surface 10b. Whereby, the light beam is subjected to the function of condensing light while changing its optical path and is refracted and transmitted through the exit surface 10c. The light beam emerging from the optical element 10 is incident on the photodetector 5 and forms a light spot on the light-receiving surface 6.

According to the deflection angle detecting device of the ninth embodiment, the laser beam from the light source is transmitted through the optical element 10 and thereby a refracting function can be exerted on the light beam to impose a part of a path change for preventing the interfere of mechanical layout of the detecting reflection surface 4, the light source, and the photodetector 5. As a result, the amount of decentration of the detecting reflection surface 4 can be set to a minimum, and the production of decentering aberration is lessened.

In general, the amount of production of aberration increases with increasing image height. However, according to the deflection angle detecting device of the ninth embodiment, the optical element 10 is placed ahead of the detecting reflection surface 4 and thus the light beam from the light source is subjected to the function of condensing light by the surfaces 10a and 10b and is reduced in its diameter. Consequently, the effective diameter of the detecting reflection surface 4 is reduced and the production of aberration can be suppressed.

According to the deflection angle detecting device of the ninth embodiment, the optical element 10 correcting special aberration by decentration includes the reflection surface, and hence aberration can be corrected by smaller curvature than in the convex lens. The reflection surface of the optical element 10 not only corrects aberration produced by the detecting reflection surface 4, but also is capable of having the optical power for condensing the light beam from the light source. The function of condensing light can thus be distributed to the detecting refraction surface 4 and the reflection surface of the optical element 10, and it is possible that the curvature of the detecting reflection surface 4 is made small. In this way, the special aberration by decentration can be reduced.

Also, since two reflection surfaces, the detecting reflection surface 4 and the reflection surface of the optical element 10, are provided, the number of degrees of freedom of mechanical layout by bending the optical path is increased.

If at least one surface of the optical element 10 is constructed with an irrotational symmetrical surface, decentering aberration can be efficiently corrected.

In the deflection angle detecting device of the ninth embodiment, the surface 10a of the optical element 10 is configured as the irrotational symmetrical surface, and the surface 10b and the exit surface 10c are configured as flat surfaces so that assembly and productivity are improved.

Tenth Embodiment

Figure 17A:
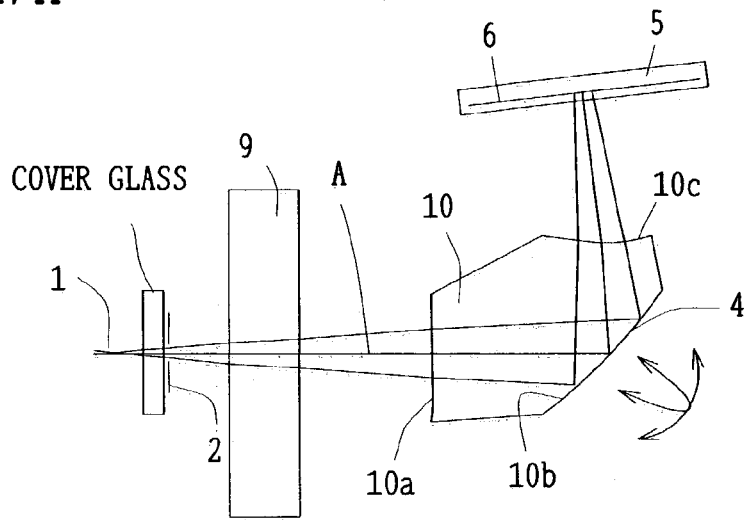
FIGS. 17A, 17B, and 17C are views showing schematically constructions where the mirror of the deflection angle detecting device is variously rotated in a tenth embodiment of the present invention.
Figure 17B:
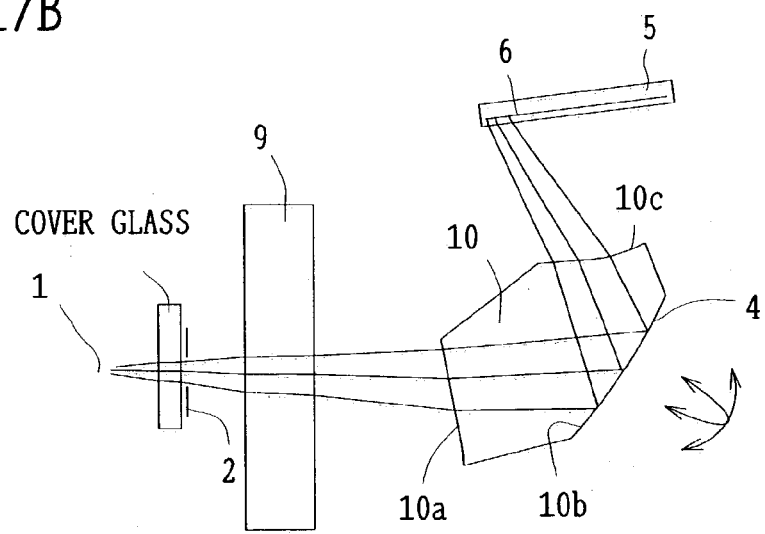
Figure 17C:
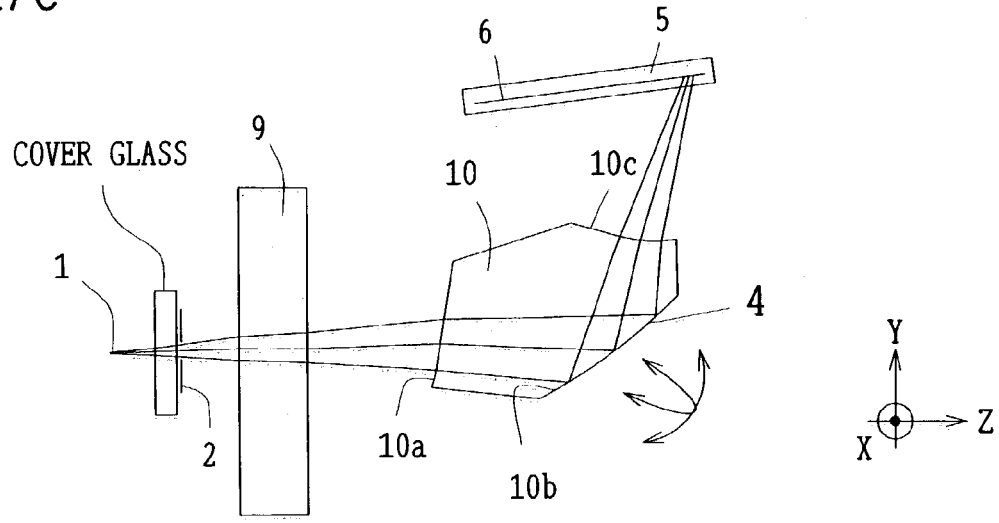

FIGS. 17A, 17B, and 17C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the tenth embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface which combines a function of switching the optical path with a function of condensing light, and at the same time, is also used as the back surface 10*b* of the optical system 10 for correction for aberration.

In the deflection angle detecting device of the tenth embodiment, as shown in the figures, laser light emitted from the semiconductor laser 1 which is the light source is restricted in its beam diameter by the stop 2, and after being transmitted through the optical element 9 which is a positive lens, is refracted through and incident on the entrance surface 10*a* of the optical element 10. The light beam incident on the entrance surface 10*a* is reflected by the surface 10*b* which is the back surface of the optical element 10 and is also the detecting reflection surface 4. The surface 10*b* is decentered with respect to the optical axis, and when the optical path is switched, the reflected light reflected by the detecting reflection surface 4 undergoes at the same time the function of condensing light by a curved surface configured on the surface 10*b* and is refracted through and emerges from the exit surface 10*c* of the optical element 10. The light beam emerging from the optical element 10 is incident on the photodetector 5 and forms a light spot on the light-receiving surface 6.

In the deflection angle detecting device of the tenth embodiment, the detecting reflection surface 4 suffers from decentering aberration due to the decentered reflection surface, but this aberration is corrected by using the optical element 10. The optical element 10 is such that the surface 10*b* combines the reflection surface having the function of condensing light with the detecting reflection surface 4. Thus, according to the deflection angle detecting device of the tenth embodiment, the number of parts can be reduced, a position adjustment with the detecting reflection surface 4 becomes unnecessary, the accuracy of assembly is improved, and a cost reduction can be achieved.

Where the detecting reflection surface 4 is constructed to be independent of the optical element 10, the light passes through a common area, extending from the light source to the detecting reflection surface 4, irrespective of the rotation angle of the detecting reflection surface 4, while in the optical path after reflection by the detecting reflection surface 4, the light passes through different areas, from the surface of the optical element. Therefore, aberration produced by the difference of the rotation angle is corrected by only the surfaces of the optical element 10 situated behind the detecting reflection surface 4.

In the deflection angle detecting device of the tenth embodiment, by contrast, the detecting reflection surface 4 is constructed integrally with the optical element 10, and thus when the optical element is rotated, an effect equivalent to the rotation of the detecting reflection surface 4 is brought about, and the light beam passes through different areas with respect to both the source-side surface 10*a* from the detecting reflection surface 4 and the surface 10*c* of the optical element 10 in the optical path behind the detecting reflection surface 4 so that the number of degrees of freedom of correction is increased. Thus, according to the deflection angle detecting device of the tenth embodiment, correction for decentering aberration produced by the reflection surface of the surface 10*b* is distributed to the surfaces 10*a* and 10*c* so that favorable correction can be made, and read accuracy at the photodetector 5 can be improved.

Eleventh Embodiment

Figure 18A:
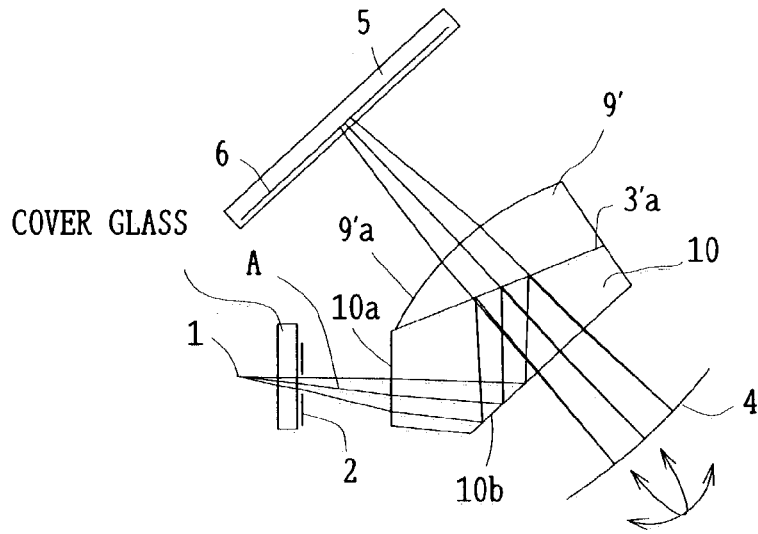
FIGS. 18A, 18B, and 18C are views showing schematically constructions where the mirror of the deflection angle detecting device is variously rotated in an eleventh embodiment of the present invention.
Figure 18B:
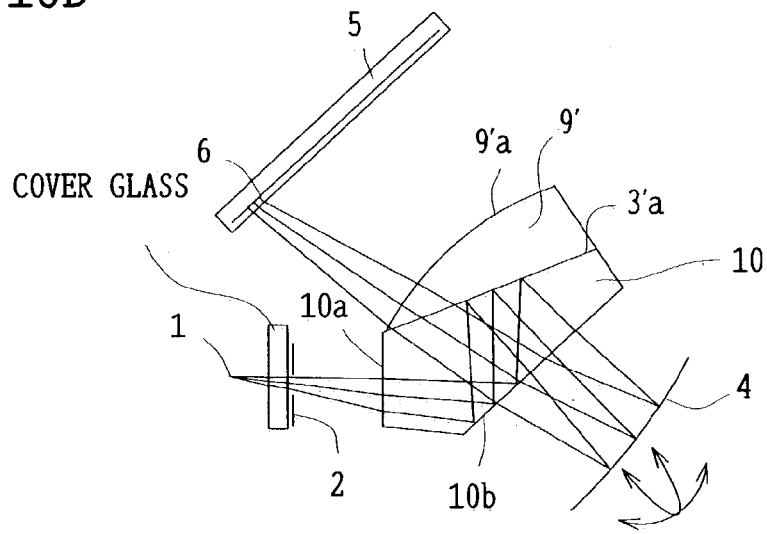
Figure 18C:
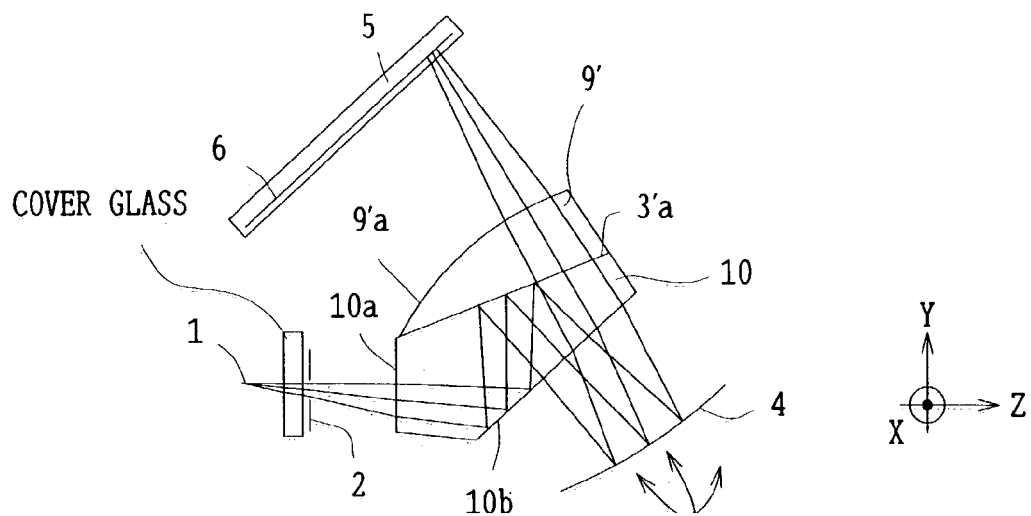

FIGS. 18A, 18B, and 18C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the eleventh embodiment of the present invention. Here, in the rotation angle of the mirror, it is assumed that counterclockwise rotation around the X axis takes a positive sign.

The deflection angle detecting device of this embodiment is constructed so that the detecting reflection surface 4 is configured as the reflection surface which combines a function of switching the optical path with a function of condensing light, and so that the optical element 10 having a path switching function surface 3'*a* is interposed between the light source and the detecting reflection surface 4 and an optical element 9' for correction for aberration is interposed between the detecting reflection surface 4 and the photodetector 5.

In the deflection angle detecting device of the eleventh embodiment, as shown in the figures, laser light emitted from the semiconductor laser 1 which is the light source is restricted in its beam diameter by the stop 2, and is refracted through and incident on the entrance surface 10*a* of the optical element 10. The light beam incident on the entrance surface 10*a* enters the surface 10*b* at an angle larger than the critical angle and thereby is totally reflected to change the optical path so that the light beam travels away from the detecting reflection surface 4 and is reflected by the path switching function surface 3'*a* provided in the optical element 10 to change the optical path toward the detecting reflection surface 4. The light beam is incident almost normally on the surface 10*b* and thereby is refracted and transmitted through the surface 10*b* to enter the detecting reflection surface 4.

Subsequently, the light beam, after being reflected by the detecting reflection surface 4, is transmitted through the path switching function surface 3'*a* and is refracted and transmitted through a surface 9'*a* of the optical element 9' cemented to the optical element 10 to emerge from the optical element 9'. The light beam leaving the optical element 9' is incident on the photodetector 5 and forms a light spot on the light-receiving surface 6.

In the deflection angle detecting device of the eleventh embodiment, the detecting reflection surface 4 is decentered and placed so that the light beam reflected by the detecting reflection surface 4 is prevented from interfering with the light source. As such, the light beam emitted from the light source is reflected by the surface 10*b* and the path switching function surface 3'*a* of the optical element 10 to change the optical path and is incident almost normally on the detecting reflection surface 4. Since the detecting reflection surface 4 takes charge of the function of condensing light and has great optical power, decentering aberration is considerably produced when this surface is decentered.

Thus, the deflection angle detecting device of the eleventh embodiment is constructed so that the light beam can be incident normally on the detecting reflection surface 4 by switching the optical path of the optical axis. Consequently, it becomes possible to suppress the production of the decentering aberration, and a favorable spot with little distortion can be formed on the light-receiving surface 6.

The light beam passes through a constant area, extending from the light source to the detecting reflection surface 4, irrespective of the rotation angle of the detecting reflection surface 4, and thus when a rotational symmetrical surface, for example, a spherical surface or an aspherical surface is set, aberration is favorably corrected. On the other hand, the light beam after being reflected by the detecting reflection surface 4 passes through different areas in accordance with the rotation angles with respect to individual surfaces of the optical member placed on the optical path behind the detecting reflection surface 4. It is thus necessary to correct aberration in accordance with the rotation angles. In particular, special aberration caused by decentration is favorably corrected by defining an irrotational symmetrical surface. Here, the irrotational symmetrical surface refers to a decentered rotational symmetrical surface, an anamorphic surface, a toric surface, or a free-formed surface.

Thus, in the deflection angle detecting device of the eleventh embodiment, the surface 9'a of the optical member 9' is configured as the irrotational symmetrical surface to make correction for aberration.

Twelfth Embodiment

The twelfth embodiment is an example where the construction of the first embodiment is actually designed by numerical parameters.

FIGS. 19A, 19B, and 19C show states where the mirror is not rotated, the mirror is rotated by −10° around the X axis in the Y-Z plane, and the mirror is rotated by 10° around the X axis in the Y-Z plane, respectively, in the optical system of the deflection angle detecting device of the twelfth embodiment of the present invention. Here, in the rotation angle of the mirror, it is assumed that counterclockwise rotation around the X axis takes a positive sign.

The function and effect of this embodiment are almost the same as those of the first embodiment.

Thirteenth Embodiment

The thirteenth embodiment is an example where an optical element 9a is interposed between the flat plate 3 for splitting the optical path and the light source in the second embodiment, the detecting reflection surface 4 is configured as a back reflection surface of an optical element 9b, the reflection surface 4 is configured with small curvature, and the function of condensing light is distributed to the optical elements 9a and 9b so that this construction is actually designed by numerical parameters.

Figure 20A:
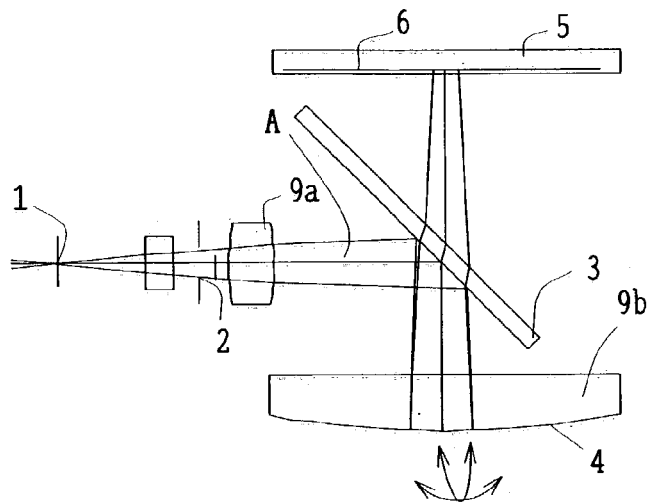
FIGS. 20A, 20B, and 20C are views showing schematically constructions where the mirror of the deflection angle detecting device is variously rotated in a thirteenth embodiment of the present invention.
Figure 20B:
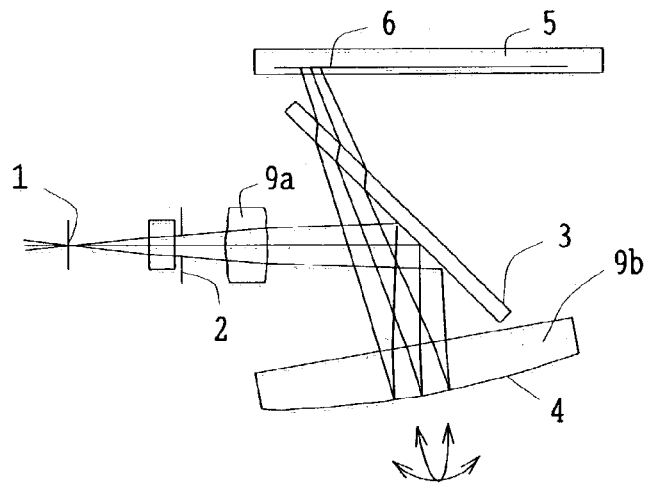
Figure 20C:
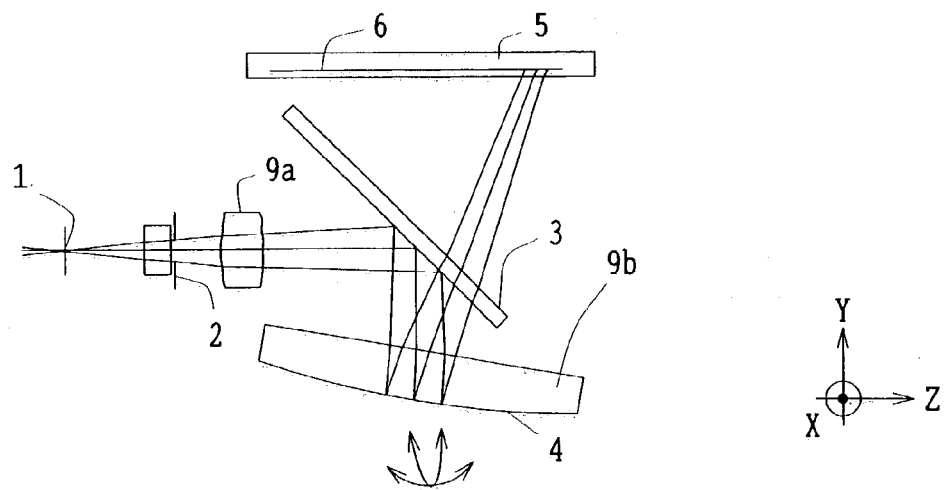

FIGS. 20A, 20B, and 20C show states where the mirror is not rotated, the mirror is rotated by −10° around the X axis in the Y-Z plane, and the mirror is rotated by 10° around the X axis in the Y-Z plane, respectively, in the optical system of the deflection angle detecting device of the thirteenth embodiment of the present invention.

The function and effect of this embodiment are almost the same as those of the second embodiment.

Fourteenth Embodiment

The fourteenth embodiment is an example where the flat plate in the second embodiment is replaced with a prism and this construction is actually designed by numerical parameter.

Figure 21A:
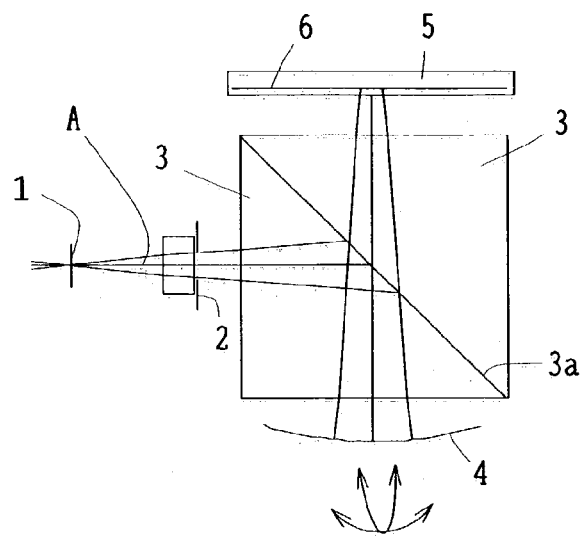
FIGS. 21A, 21B, and 21C are views showing schematically constructions where the mirror of the deflection angle detecting device is variously rotated in a fourteenth embodiment of the present invention.
Figure 21B:
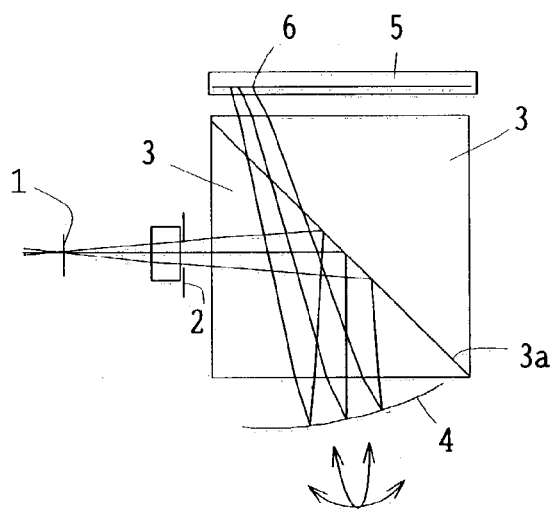
Figure 21C:
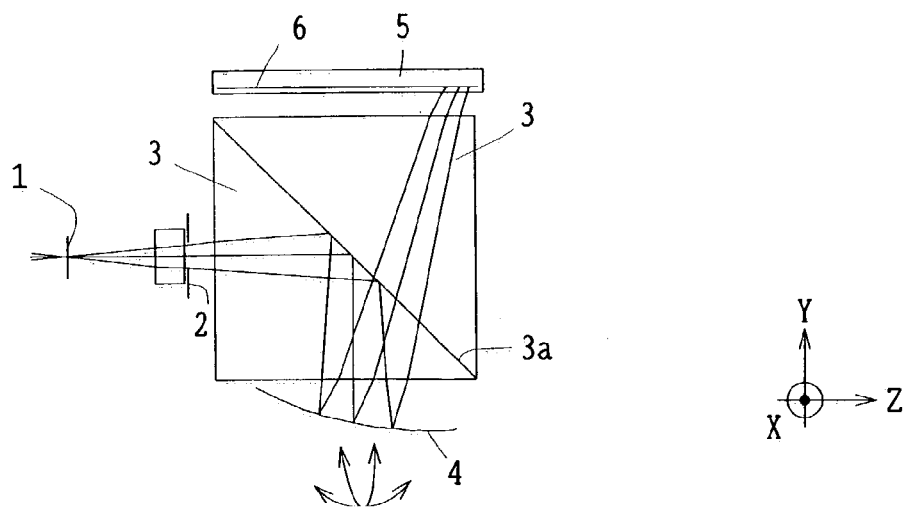

FIGS. 21A, 21B, and 21C show states where the mirror is not rotated, the mirror is rotated by −10° around the X axis in the Y-Z plane, and the mirror is rotated by 10° around the X axis in the Y-Z plane, respectively, in the optical system of the deflection angle detecting device of the fourteenth embodiment of the present invention.

The function and effect of this embodiment are almost the same as those of the second embodiment.

Fifteenth Embodiment

Figure 22A:
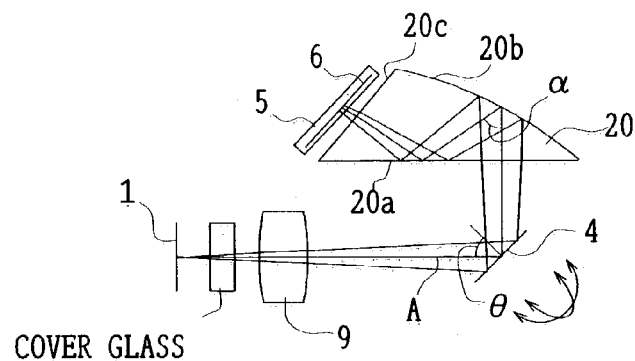
FIGS. 22A, 22B, and 22C are views showing schematically constructions where the mirror of the deflection angle detecting device is variously rotated in a fifteenth embodiment of the present invention.
Figure 22B:
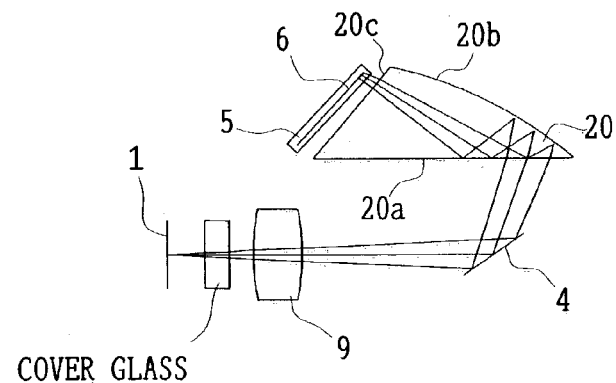
Figure 22C:
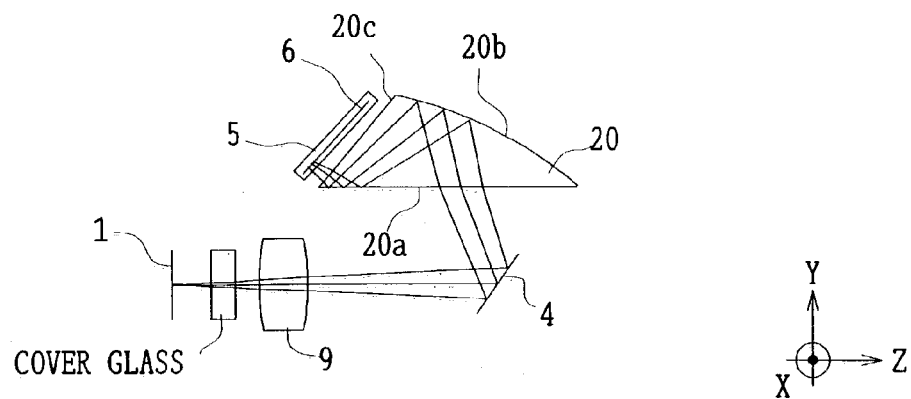

FIGS. 22A, 22B, and 22C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the fifteenth embodiment of the present invention.

The deflection angle detecting device of this embodiment includes the light source 1, a cover glass, the optical element 9, the detecting reflection surface 4, an optical element 20, and the photodetector 5.

The light source is a semiconductor laser 1 (a semiconductor laser element) emitting a laser beam (detection light) toward the detecting reflection surface 4 provided to the light-reflecting element.

On the optical axis A is placed the stop (not shown) which restricts the transmission range of the laser beam to reform the laser beam into a preset shape such as a circle. Optically, the same state that a stop is provided, depending on the size of the laser beam, is brought about, and thus the stop need not necessarily be used.

The optical element 9 has positive power and suppresses the spread of the light beam from the light source.

The detecting reflection surface 4 is provided to a rotating mirror, not shown, and is inclined with respect to the optical axis A within the limit of $10°<\theta<70°$, where $\theta$ is the incident angle of an axial chief ray from the light source. In the detecting reflection surface 4, it is favorable that the incident angle $\theta$ is set within the limit of $25°<\theta<70°$, preferably $35°<\theta<60°$.

The optical element 20 has a surface 20a, a reflection surface 20b, and an exit surface 20c. The surface 20a and the exit surface 20c are configured as flat surfaces. The is surface 20a has functions of an entrance surface and a reflection surface in different areas. The reflection surface 20b is configured into an irrotational symmetrical surface profile. The reflection surface 20b is configured as a back reflection surface coated with a reflection film. The reflection surface 20b is inclined and placed so that the axial chief ray reflected by the detecting reflection surface 4 is reflected back toward the light source 1.

The deflection angle detecting device of the fifteenth embodiment is constructed so that an angle $\alpha$ made by the axial chief ray incident on the reflection surface 20b with the axial chief ray reflected by the reflection surface 20b is set within the limit of $20°<\alpha<110°$.

The photodetector 5 is placed close to the light source 1. The sensor light-receiving surface 6 is directed toward the emission side of the light source 1.

Also, although any semiconductor laser may be used as the semiconductor laser 1, it is natural to select a laser provided with a proper wavelength in the relationship with the detection sensitivity of the photodetector 5. Since any well-known means may be used, it is needless to say that the semiconductor laser 1 is connected to a driving means including a power supply and a modulation driving circuit, not shown, for properly emitting light.

As the photodetector 5, the position sensitive detector (the so-called PSD) can be adopted in which when the sensor light-receiving surface 6 is radiated with the spot of the laser beam, a voltage corresponding to the center position of the light intensity of the spot is output to sense the position of the spot. The PSD is constructed with an array of many photodiodes, for example, as shown in FIG. 3, so that when a preset part is radiated with the light beam, voltages corresponding to distances D1, D2, D3, and D4 from the corners of the PSD to the center of the light beam are output from four terminals T1, T2, T3, and T4, and the position (the inclination in X and Y directions) can be detected by calculating these output values.

As the photodetector 5 is adopted a detector in which a one- or two-dimensional position is detected in accordance with whether the inclination of the detecting reflection surface 4 is one-dimensional (in the X or Y direction) or two-dimensional (in the X and Y directions). Also, it is needless to say that the photodetector 5, because of its operation, is provided with a proper driving means, not to speak of the power supply, but this is well known and thus its explanation is omitted.

In the deflection angle detecting device of the fifteenth embodiment constructed as mentioned above, as shown in FIG. 22A, laser light emitted from the semiconductor laser 1 which is the light source, after passing through the cover glass, is suppressed in spread of the light beam through the optical element 9 and is incident on and reflected by the detecting reflection surface 4. The light reflected by the detecting reflection surface 4 is incident on the surface 20a of the optical element 20, and after being refracted and transmitted through the surface 20a, is reflected by the surface 20b. The light reflected by the surface 20b is condensed by the function of positive power. After being incident again on and totally reflected by the surface 20a, the light is refracted and transmitted through the exit surface 20c to emerge from the optical element 20. The light is then incident on the photodetector 5 and forms a light spot on the sensor light-receiving surface 6.

When the detecting reflection surface 4 is inclined in the X and Y directions, the photodetector 5 detects the amount of inclination by detecting the position of the spot on the sensor light-receiving surface 6.

When the detecting reflection surface 4 is inclined one-dimensionally, the position of the spot 7a on the light-receiving surface 6 of the photodetector 5 is shifted. In this case, the output of the photodetector 5, as shown in the graph of FIG. 5, is almost linearly changed. When the detecting reflection surface 4 is inclined in the X and Y directions, the spot 7b on the light-receiving surface 6 is moved in the two-dimensional direction. In this case, an output in each direction likewise is as shown in the graph of FIG. 5, and the relationship between the amount of inclination (angle) of the detecting reflection surface and the output becomes favorable in linearity. In the fifteenth embodiment, the inclination of the detecting reflection surface 4 can be detected within around ±10°.

In the construction of the fifteenth embodiment, therefore, it becomes possible to use path switching of light pickup, the tracking means, and a light switching means of optical communication which require detection in a wide range of the inclination of the detecting reflection surface.

Also, in the embodiment of the present invention, a four-divided light-receiver (a four-divided position detector) is used as the photodetector, instead of the position sensitive detector (PSD), and thereby the deflection angle can also be detected.

The spot diameter of the laser light A condensed on the photodetector 5 using the four-divided light-receiver (the four-divided position detector) is such as to be larger than that of the laser light condensed on the photodetector using the PSD. As shown in FIG. 7, the light-receiving surface 8 of the photodetector 5 is divided into four light-receiving subsurfaces (represented by 8a, 8b, 8c, and 8d). When the detecting reflection surface 4 is two-dimensionally inclined in the X and Y directions, the spot 7 on the light-receiving surface 8 is moved in a two-dimensional direction. In this case, when outputs corresponding to the areas of the light-receiving subsurfaces 8a, 8b, 8c, and 8d, radiated with the laser light are represented by A, B, C, and D, the output corresponding to the position in the X direction is obtained by calculating (A+D−B−C)/(A+B+C+D) and the output corresponding to the position in the Y direction by calculating (A+B−C−D)/(A+B+C+D). The calculated output in each direction is almost linearly changed as far as the spot is uniform in shape.

According to the deflection angle detecting device of the fifteenth embodiment constructed as mentioned above, the following advantages are obtained.

According to the deflection angle detecting device of the fifteenth embodiment, the detecting reflection surface 4 is inclined by a preset angle with respect to the optical axis of light radiated from the light source, and hence there is no need to provide the path switching means such as the beam splitter or the polarization beam splitter. Consequently, the number of parts is lessened, and cost and assembly man-hour can be reduced. Furthermore, the number of degrees of freedom of mechanical layout is increased.

Since the path switching means is not required, there is no loss of the amount of light received by the photodetector, and thus detection accuracy is higher than in the case where the beam splitter or the polarization beam splitter is provided.

In the deflection angle detecting device of the fifteenth embodiment, the light beam is entirely reflected by the reflection surface 20b and is totally reflected by the surface 20a, with the result that there is no loss of the amount of light. Consequently, a detection error by the photodetector is minimized, and detection accuracy is improved.

Where the laser light from the light source is condensed by a positive lens whose transmission surface has condensing power, considerable curvature of field is caused by spot formation, and there is a large difference in spot size between the center and the end of the photodetector. In contrast to this, according to the deflection angle detecting device of the fifteenth embodiment, the reflection surface 20b of the optical element 20 is configured as a surface with positive power, and power for chiefly condensing light is imparted to this surface. As such, compared with the case where the transmission surface, like the positive lens, has positive power, the curvature of the surface with power can be moderated and aberration can be suppressed. Therefore, the spot is formed with little change in size at the center and the end of the photodetector 5, and read accuracy at the photodetector 5 can be improved.

According to the deflection angle detecting device of the fifteenth embodiment, the detecting reflection surface 4 is inclined by a preset angle with respect to the optical axis of light radiated from the light source, and in addition to this, the optical element 20 is provided with two reflection surfaces (20a and 20b). Consequently, the number of degrees of freedom in the direction in which the optical path is bent is increased, and compact mechanical layout becomes possible.

Like the deflection angle detecting device of the fifteenth embodiment, when the reflection surface 20b with positive power in the optical element 20 is inclined and placed, special aberration is produced by decentration. For example, axial astigmatism or coma is produced and distortion (image distortion) assumes the shape of a trapezoid or an arc, peculiar to decentering aberration.

Thus, in the deflection angle detecting device of the fifteenth embodiment, the reflection surface 20b of the optical element 20 is configured as an irrotational symmetrical surface. As such, by making a difference of curvature or inclination in the effective diameter, decentering aberration can be favorably corrected.

Again, the irrotational symmetrical surface refers to a decentered rotational symmetrical surface, an anamorphic surface, a toric surface, or a free-formed surface.

When the irrotational symmetrical surface provided to the optical element 20 is configured as the free-formed surface, the decentering aberration can be more favorably corrected.

In a decentering optical system including the irrotational symmetrical surface, assembly and position adjustment are extremely difficult to pose a serious problem. However, in the deflection angle detecting device of the fifteenth embodiment, two surfaces (20a and 20c), of the optical working surfaces of the optical element 20, are configured as flat surfaces. As a result, since each of the flat surfaces 20a and 20c can be used as a reference for assembly, the position adjustment on assembly is facilitated, and the efficiency and accuracy of assembly are improved. In the optical element 20, it is only necessary to handle one surface (20b), and thus a handling process can be simplified.

In the deflection angle detecting device of the fifteenth embodiment, the optical element 9 is interposed between the light source and the detecting reflection surface 4, and hence the light beam from the light source having a constant NA function is subjected to the function of condensing light so that beam diameters on the detecting reflection surface 4 and the optical working surfaces of the optical element 20 are reduced. The optical system can thus be constructed to be compact.

Generally, in optical aberration, the amount of correction for aberration increases with increasing image height, and thus, like the deflection angle detecting device of the fifteenth embodiment, when the light beam is made incident on the detecting reflection surface 4 after the beam diameter is reduced through the optical element 9, the production of aberration can be suppressed.

Furthermore, the function of condensing light is imparted to the optical elements 9 and 20 to lessen the power of the optical element 20, and thereby the amount of production of optical aberration, notably decentering aberration, can be reduced.

Since the placement of the optical element 9 enables the NA of the light source to be increased without increasing the size of the optical system and the production of aberration, the amount of light reaching the photodetector 5 is increased and measuring accuracy can be improved.

According to the deflection angle detecting device of the fifteenth embodiment, the photodetector 5 is placed close to the light source 1 so that the sensor light-receiving surface 6 is directed toward the exit side of the light source 1. Consequently, space is provided behind the photodetector 5 and electronic and mechanical mechanisms are placed in this space, with a result that further compactness can be achieved.

The photodetector 5 is placed close to the light source, and the sensor light-receiving surface 6 of the photodetector 5 and the exit side of the light source are directed in almost the same direction. Whereby, the electric and mechanical mechanisms of both can be together placed closely, the mechanical layout is simplified, and the work efficiency of assembly is improved. Moreover, mechanical and electric parts or mechanisms can also be used in common or integrally constructed, and the number of parts can be lessened for a cost reduction. Additionally, in the layout of the device, the electric mechanism, the mechanical mechanism, and optical mechanism can be independently placed. It is possible to shield the optical mechanism sensitive to dust, and productivity can be improved.

Also, when the mechanical mechanism and the electric mechanism are placed integrally as far as possible, productivity is improved, but a complete shield of the photodetector and the light source or the optical mechanism is not necessarily required.

Sixteenth Embodiment

Figure 23A:
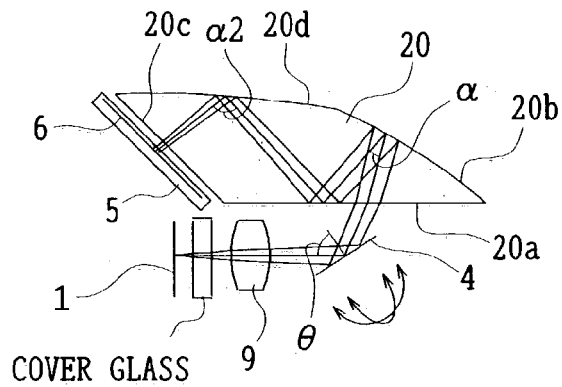
FIGS. 23A, 23B, and 23C are views showing schematically constructions where the mirror of the deflection angle detecting device is variously rotated in a sixteenth embodiment of the present invention.
Figure 23B:
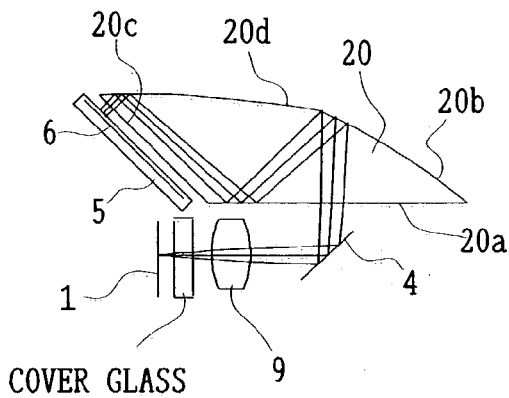
Figure 23C:
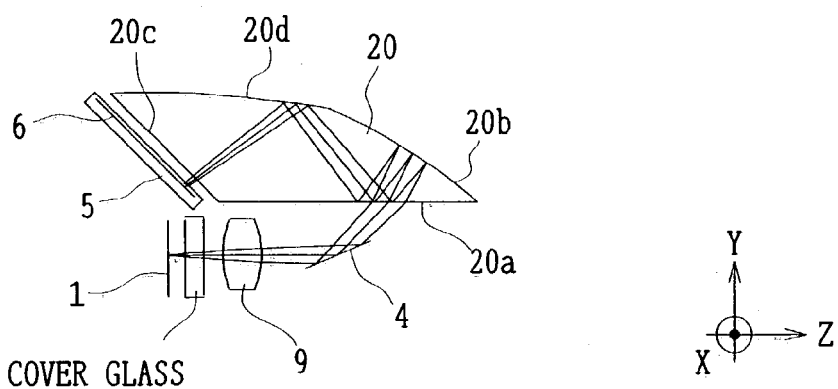

FIGS. 23A, 23B, and 23C show states where the rotation angle of the mirror is 0°, the mirror is rotated by 109 around the X axis in the Y-Z plane, and the mirror is rotated by −10° around the X axis in the Y-Z plane, respectively, in the deflection angle detecting device of the sixteenth embodiment of the present invention.

The deflection angle detecting device of this embodiment has almost the same construction as that of the fifteenth embodiment with the exception that the optical element 20 has two flat surfaces 20a and 20c and two reflection surfaces 20b and 20d, each having positive power and an irrotational symmetrical surface profile, and the sensor light-receiving surface 6 of the photodetector 5 is not directed toward the exit side of the light source 1.

In the deflection angle detecting device of the sixteenth embodiment constructed as mentioned above, as shown in FIG. 23A, laser light emitted form the semiconductor laser 1 which is the light source passes through the cover glass, and after being suppressed in spread of the light beam through the optical element 9 to enter the detecting reflection surface 4, is reflected by the detecting reflection surface 4. The light reflected by the detecting reflection surface 4 is incident on the entrance surface 20a of the optical element 20, is refracted and transmitted through the surface 20a, and is reflected by the reflection surface 20b. The light reflected by the reflection surface 20b is condensed by the function of the positive power. The light is incident again on the surface 20a and is totally reflected by the surface 20a. The light is then incident on, and totally reflected by, the surface 20d, and after being refracted and transmitted through the exit surface 20c and emerging from the optical element 20, is incident on the photodetector 5 to form a light spot on the sensor light-receiving surface 6. Also, the photodetector 5, like the fifteenth embodiment, is constructed with the PSD.

According to the deflection angle detecting device of the sixteenth embodiment, the detecting reflection surface 4 is inclined by a preset angle with respect to the optical axis of light radiated from the light source, and in addition to this, the optical element 20 is provided with three reflection surfaces (20a, 20b, and 20d). Consequently, the number of degrees of freedom in the direction in which the optical path is bent is further increased, and further compact mechanical layout becomes possible.

However, in the deflection angle detecting device of the sixteenth embodiment, in which the sensor light-receiving surface 6 of the photodetector 5 is not directed toward the exit side of the light source 1, sufficient space cannot be provided behind the photo-detector and it is difficult to place the electric and mechanical mechanisms.

Other functions and effects are about the same as in the fifteenth embodiment.

Seventeenth Embodiment

Figure 24A:
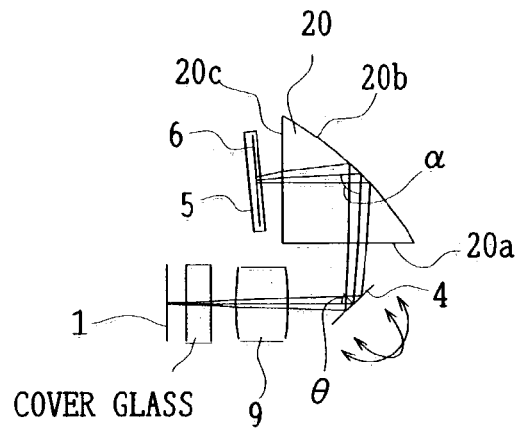
FIGS. 24A, 24B, and 24C are views showing schematically constructions where the mirror of the deflection angle detecting device is variously rotated in a seventeenth embodiment of the present invention.
Figure 24B:
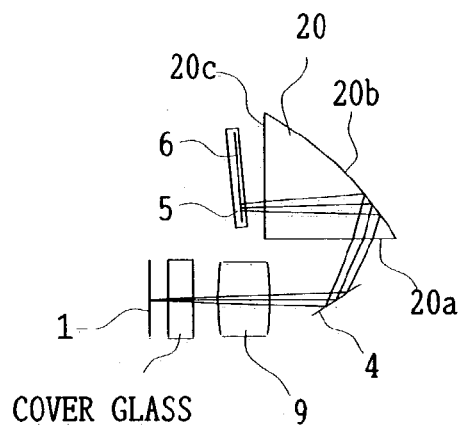
Figure 24C:
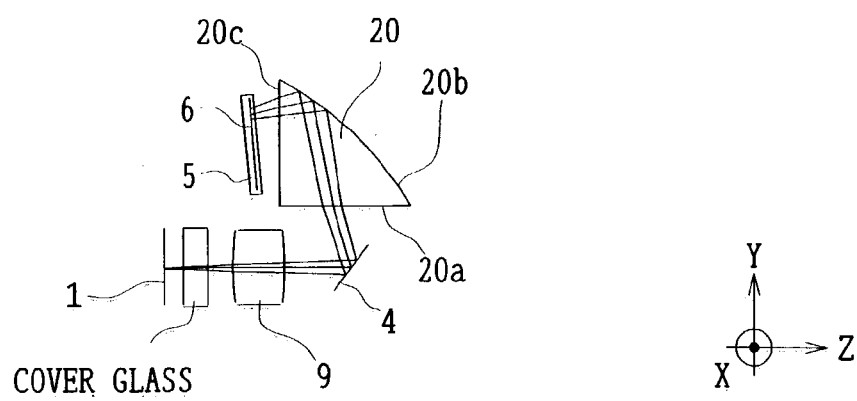

FIGS. 24A, 24B, and 24C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the seventeenth embodiment of the present invention.

In the deflection angle detecting device of this embodiment, like the fifteenth embodiment, the optical element 20 has two flat surfaces 20a and 20c and one reflection surface 20b of irrotational symmetrical surface profile, having positive power. However, in the seventeenth embodiment, the surface 20a functions as the entrance surface alone and fails to function as the reflection surface. The seventeenth embodiment is in this respect different from the fifteenth embodiment. Other structures are about the same as in the fifteenth embodiment.

In the deflection angle detecting device of the seventeenth embodiment constructed as described above, as shown in FIG. 24A, laser light emitted form the semiconductor laser 1 which is the light source passes through the cover glass, and after being suppressed in spread of the light beam through the optical element 9 to enter the detecting reflection surface 4, is reflected by the detecting reflection surface 4. The light reflected by the detecting reflection surface 4 is incident on the entrance surface 20a of the optical element 20, is refracted and transmitted through the surface 20a, and is reflected by the reflection surface 20b. The light reflected by the reflection surface 20b is condensed by the function of the positive power. The light is then refracted and transmitted through the exit surface 20c, and after emerging from the optical element 20, is incident on the photodetector 5 to form a light spot on the sensor light-receiving surface 6.

According to the deflection angle detecting device of the seventeenth embodiment, the surface 20a of the optical element 20 is configured to function as an entrance surface alone. Consequently, the surface 20a can be made smaller than in the fifteenth embodiment, and the optical element 20 can be designed to be compact so that further compactness of the entire device is achieved.

Other effects and functions are almost the same as in the fifteenth embodiment.

Eighteenth Embodiment

Figure 25A:
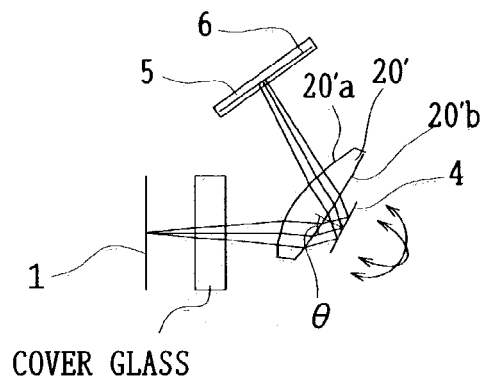
FIGS. 25A, 25B, and 25C are views showing schematically constructions where the mirror of the deflection angle detecting device is variously rotated in an eighteenth embodiment of the present invention.
Figure 25B:
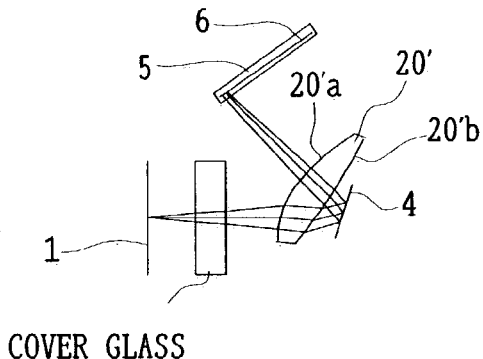
Figure 25C:
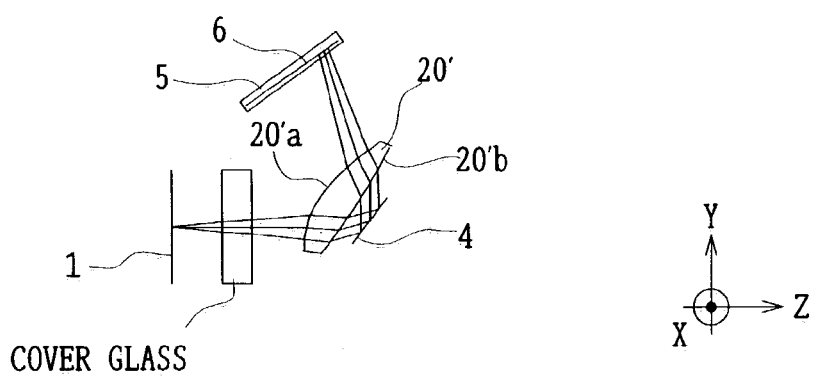

FIGS. 25A, 25B, and 25C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the eighteenth embodiment of the present invention.

In the deflection angle detecting device of this embodiment, an optical element 20' combining the function of suppressing the spread of a light beam with the function of condensing light is placed to replace the optical element 9 suppressing the spread of the light beam and the optical element 20 having the function of condensing light in the fifteenth to seventeenth embodiments.

The optical element 20' has optical working surfaces constructed with two surfaces 20'a and 20'b. Each of the surfaces 20'a and 20'b has functions of the entrance surface and the exit surface in its different areas. The surface 20'a is configured into an irrotational symmetrical surface profile, having positive power. The area of the entrance surface of the surface 20'a functions so that the light beam from the light source does not spread, while the area of the exit surface is such that the function of condensing light is exerted. The surface 20'b is configured as a flat surface.

Other structures are almost the same as in the fifteenth embodiment.

In the deflection angle detecting device of the eighteenth embodiment constructed as mentioned above, as shown in FIG. 25A, laser light emitted from the semiconductor laser 1 which is the light source, after passing through the cover glass, is incident on, and is refracted and transmitted through, the surface 20'a of the optical element 20' and is suppressed in the spread of the light beam by the function of positive power. Subsequently, the light is refracted and transmitted through the surface 20'b to emerge from the optical element 20' and is incident on, and is reflected by, the detecting reflection surface 4. The light reflected by the detecting reflection surface 4 is incident on, and is refracted and transmitted through, the surface 20'b of the optical element 20' and is refracted and transmitted through the surface 20'a to emerge from the optical element 20'. The light transmitted through the surface 20'a is condensed by the function of positive power. The light beam emerging from the optical element 20' is incident on the photodetector 5 to form a light spot on the sensor light-receiving surface 6.

According to the deflection angle detecting device of the eighteenth embodiment, the single optical element 20' combines the function of the optical element 9 of suppressing the spread of the light beam and the function of the optical element 20 of condensing light in the fifteenth to seventeenth embodiments, and thus the number of parts can be reduced. Consequently, cost can be reduced and assembly efficiency can be improved.

Since the optical working surfaces of the optical element 20' are configured as two surfaces, each combining the functions of the entrance surface and the exit surface, the optical work can be imparted four times to the light beam by the two surfaces. As a result, the power can be effectively imparted. Moreover, since the power can be distributed, the curvature of the corresponding surface can be kept to a minimum, and aberration can be suppressed.

In the deflection angle detecting device of the eighteenth embodiment, the detecting reflection surface 4 is inclined by a preset angle with respect to the optical axis of light radiated from the light source. Hence, the number of degrees of freedom in the direction in which the optical path is bent is increased, and compact mechanical layout becomes possible.

According to the deflection angle detecting device of the eighteenth embodiment, the surface 20'a of the optical element 20' is configured as the irrotational symmetrical surface. As such, by making a difference of curvature or inclination in the effective diameter, the detecting reflection surface 4 is inclined by a preset angle with respect to the optical axis of light radiated from the light source and decentering aberration produced thereby can be favorably corrected.

Also, the irrotational symmetrical surface of the optical element 20' is replaced by a free-formed surface, decentering aberration can be more favorably corrected.

In the deflection angle detecting device of the eighteenth embodiment, the optical element 20' is interposed between the light source and the detecting reflection surface 4, and hence the light beam from the light source having a constant NA function is subjected to the function of condensing light so that beam diameters on the detecting reflection surface 4 and the optical working surfaces of the optical element 20' of light reflected by the detecting reflection surface 4 are reduced. The optical system can thus be constructed to be compact.

Generally, in optical aberration, the amount of correction for aberration increases with increasing image height, and thus, like the deflection angle detecting device of the eighteenth embodiment, when the light beam is made incident on the detecting reflection surface 4 after the beam diameter is reduced through the optical element 20', the production of aberration can be suppressed.

Furthermore, the function of condensing light is imparted to the surfaces 20'a and 20'b of the optical element 20' so that the function is exerted twice with respect to each surface, to lessen the power of the optical element 20', and thereby the amount of production of optical aberration, notably decentering aberration, can be reduced.

Since the placement of the optical element 20' enables the NA of the light source to be increased without increasing the size of the optical system and the production of aberration, the amount of light reaching the photodetector 5 is increased and measuring accuracy can be improved.

According to the deflection angle detecting device of the eighteenth embodiment, as in the fifteenth and seventeenth embodiments, the photodetector 5 is placed close to the light source 1 so that the sensor light-receiving surface 6 is directed toward the exit side of the light source 1. Consequently, space is provided behind the photodetector 5 and electronic and mechanical mechanisms are placed in this space, with a result that further compactness can be achieved.

Nineteenth Embodiment

Figure 26A:
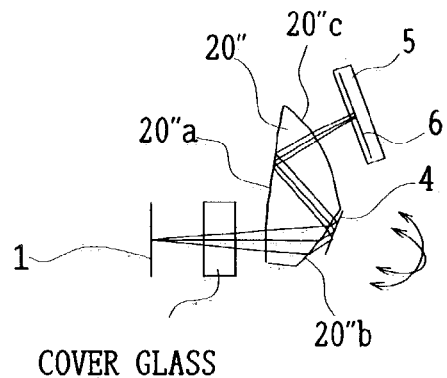
FIGS. 26A, 26B, and 26C are views showing schematically constructions where the mirror of the deflection angle detecting device is variously rotated in a nineteenth embodiment of the present invention.
Figure 26B:
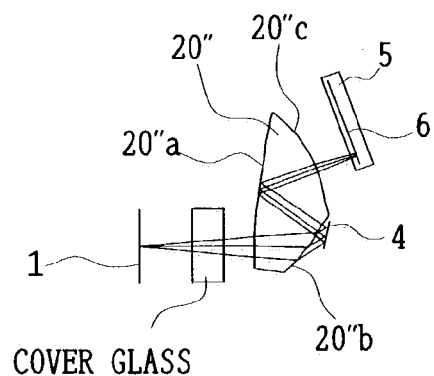
Figure 26C:
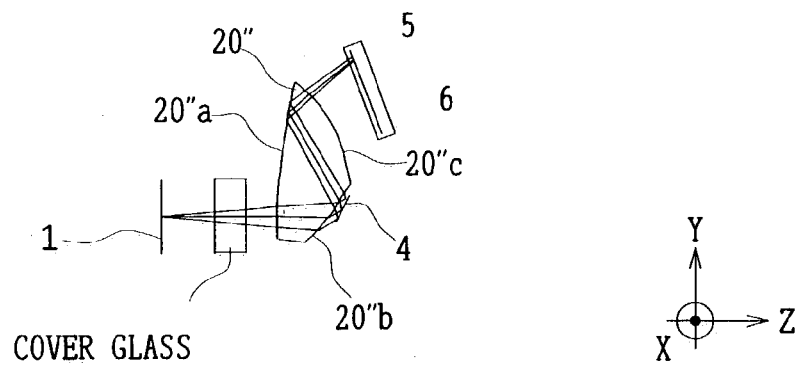

FIGS. 26A, 26B, and 26C show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the nineteenth embodiment of the present invention.

In the deflection angle detecting device of this embodiment, an optical element 20" combining the function of suppressing the spread of a light beam with the function of condensing light is placed to replace the optical element 9 suppressing the spread of the light beam and the optical element 20 having the function of condensing light in the fifteenth to seventeenth embodiments.

The optical element 20" is constructed with three surfaces 20"a, 20"b, and 20"c. Each of the surfaces 20"a, 20"b is configured into an irrotational symmetrical surface profile. The surface 20"a has functions of the entrance surface and the reflection surface in its different areas. The surface 20"a also has positive power, and the area of the entrance surface of the surface 20"a functions so that the light beam from the light source does not spread, while the area of the reflection surface is such that the function of condensing light is exerted. The surface 20"b has functions of the exit surface and the entrance surface in its different areas. The surface 20"b also has positive power, and the area of the exit surface of the surface 20"b shares the function exerted so that the light beam from the light source does not spread in the area of the entrance surface of the surface 20"a, while the area of the entrance surface shares the function of condensing light in the area of the reflection surface of the surface 20"a. The surface 20"c has the function of the exit surface. The surface 20"c also has positive power and shares the function of condensing light in the areas of the reflection surface of the surface 20"a and the entrance surface of the surface 20"b.

In the deflection angle detecting device of the nineteenth embodiment, the reflection surface 20"a of the optical element 20" is inclined and placed so that an axial chief ray reflected by the detecting reflection surface 4 is reflected in a direction opposite to the light source. The sensor light-receiving surface 6 of the photodetector 5 is directed in a direction opposite to the exit side of the light source 1 and is places away from the light source 1.

In the deflection angle detecting device of the nineteenth embodiment constructed as described above, as shown in FIG. 26A, laser light emitted from the semiconductor laser 1 which is the light source passes through the cover glass, is incident on the surface 20"a of the optical element 20", is refracted and transmitted through the surfaces 20"a and 20"b, and is suppressed in the spread of the light beam by the functions of positive power of individual surfaces to emerge form the optical element 20". The light beam emerging therefrom is incident on, and is reflected by, the detecting reflection surface 4. The light reflected by the detecting reflection surface 4 is incident on, and is refracted and transmitted through, the surface 20"b of the optical element 20", is reflected by the surface 20"a, is transmitted through the surface 20"c, and is condensed by the functions of positive power of individual surfaces to emerge from the optical element 20". The light beam emerging from the optical element 20" is incident on the photodetector 5 and forms a light spot on the sensor light-receiving surface 6.

According to the deflection angle detecting device of the nineteenth embodiment, the single optical element 20" combines the function of the optical element 9 of suppressing the spread of the light beam and the function of the optical element 20 of condensing light in the fifteenth to seventeenth embodiments, and thus the number of parts can be reduced. Consequently, cost can be reduced and assembly efficiency can be improved.

Since the optical working surfaces of the optical element 20" are configured as three surfaces so that the surface 20"a combines the functions of the entrance surface and the reflection surface and the surface 20"b combines the functions of the exit surface and the entrance surface, the optical work can be imparted four times to the light beam by the two surfaces 20"a and 20"b. As a result, the power can be effectively imparted. Moreover, since the power can be distributed, the curvature of the corresponding surface can be kept to a minimum, and aberration can be suppressed.

Even in the deflection angle detecting device of the nineteenth embodiment, the detecting reflection surface 4 is inclined by a preset angle with respect to the optical axis of light radiated from the light source. Hence, the number of degrees of freedom in the direction in which the optical path is bent is increased, and compact mechanical layout becomes possible.

According to the deflection angle detecting device of the nineteenth embodiment, each of the surfaces 20"a, 20"b, and 20"c of the optical element 20" is configured as the irrotational symmetrical surface. As such, by making a difference of curvature or inclination in the effective diameter, the detecting reflection surface 4 is inclined by a preset angle with respect to the optical axis of light radiated from the light source and decentering aberration produced thereby can be favorably corrected.

Also, the irrotational symmetrical surface of the optical element 20' is replaced by a free-formed surface, decentering aberration can be more favorably corrected.

In the deflection angle detecting device of the nineteenth embodiment, the surface 20"a of the optical element 20" combines the entrance surface with the reflection surface, and thus the light incident at an angle larger than the critical angle is totally reflected by the reflection surface 20"a. Hence, there is no need to coat the surface 20"a with a reflection film.

In the deflection angle detecting device of the nineteenth embodiment, the optical element 20" is interposed between the light source and the detecting reflection surface 4, and hence the light beam from the light source having a constant NA function is subjected to the function of condensing light so that beam diameters on the detecting reflection surface 4 and the optical working surfaces of the optical element 20"

of light reflected by the detecting reflection surface 4 are reduced. The optical system can thus be constructed to be compact.

Generally, in optical aberration, the amount of correction for aberration increases with increasing image height, and thus, like the deflection angle detecting device of the eighteenth embodiment, when the light beam is made incident on the detecting reflection surface 4 after the beam diameter is reduced through the optical element 20'', the production of aberration can be suppressed.

Furthermore, the function of condensing light is imparted to the surfaces 20''a, 20''b, and 20''c of the optical element 20'' so that the function is exerted twice by the surfaces 20''a and 20''b, to lessen the power of the optical element 20'', and thereby the amount of production of optical aberration, notably decentering aberration, can be reduced.

Since the placement of the optical element 20'' enables the NA of the light source to be increased without increasing the size of the optical system and the production of aberration, the amount of light reaching the photodetector 5 is increased and measuring accuracy can be improved.

Twentieth Embodiment

Figure 27:
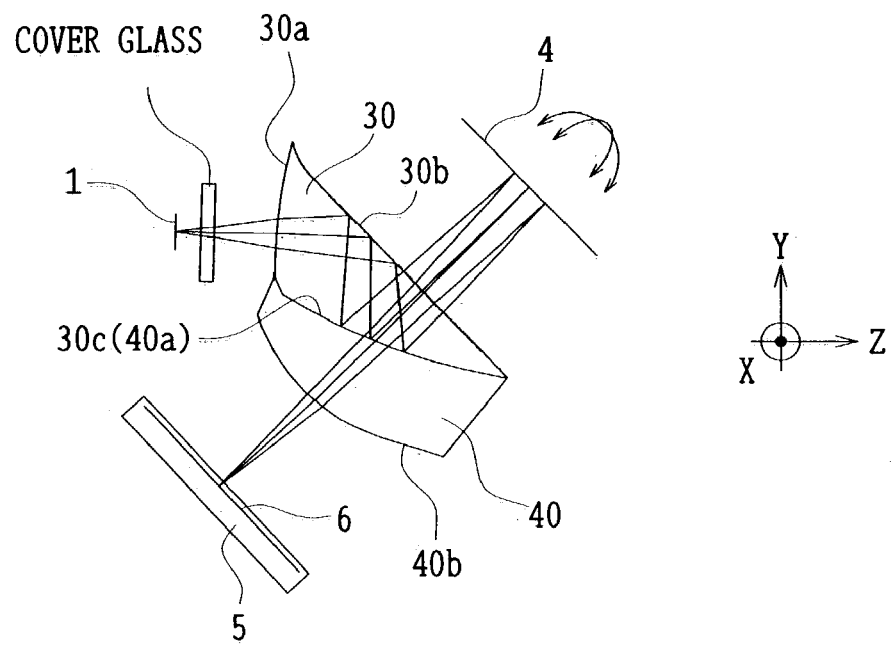
FIG. 27 is a view showing schematically the deflection angle detecting device in a state where the rotation angle of the mirror is 0° in a twentieth embodiment of the present invention.
Figure 28:
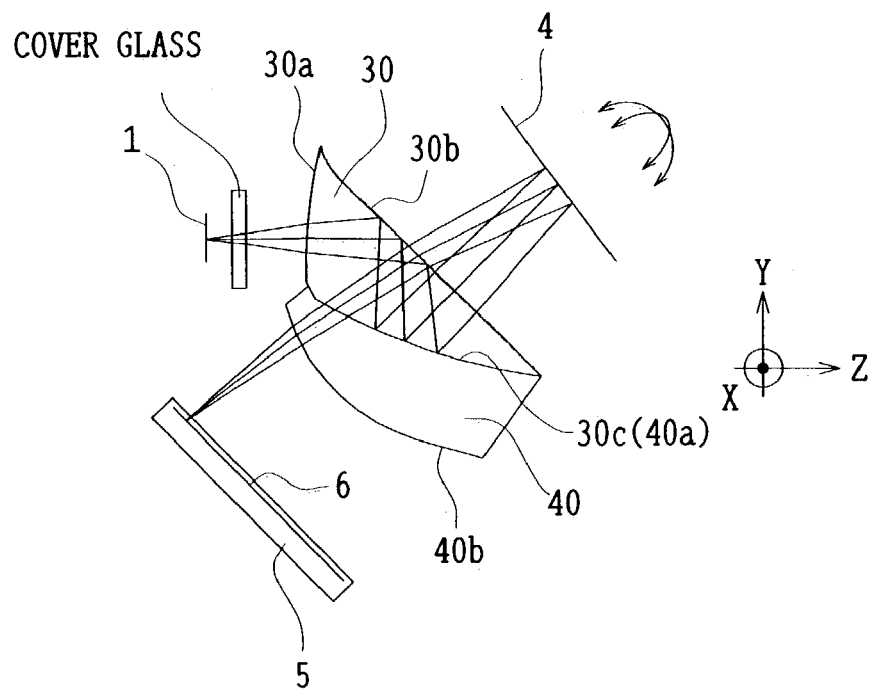
FIG. 28 is a view showing schematically the deflection angle detecting device in a state where the mirror is rotated by −10° around the X axis in a Y-Z plane in the twentieth embodiment.
Figure 29:
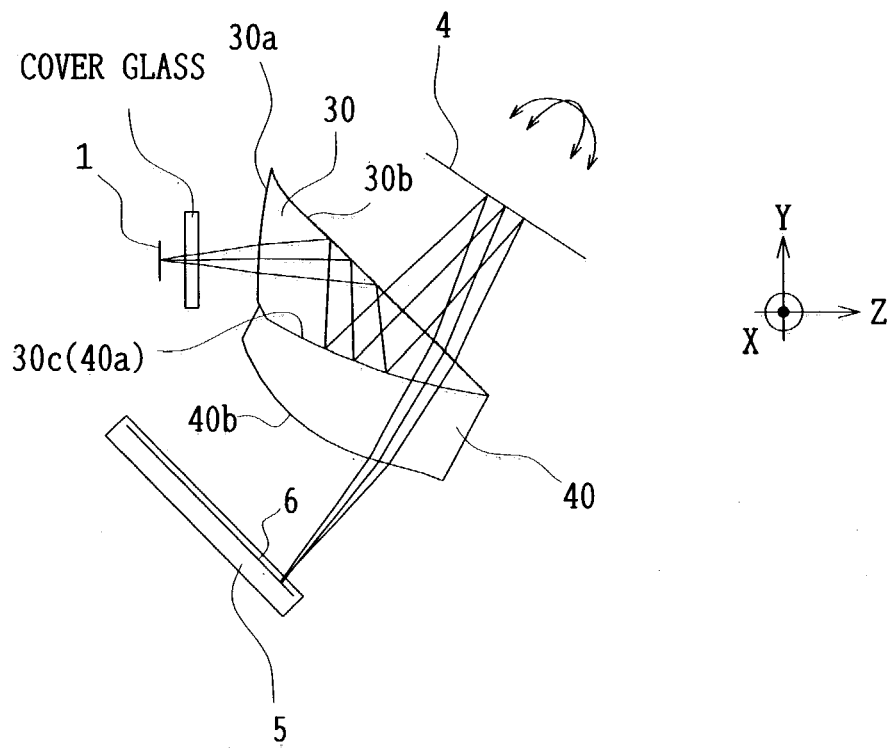
FIG. 29 is a view showing schematically the deflection angle detecting device in a state where the mirror is rotated by 10° around the X axis in a Y-Z plane in the twentieth embodiment.

FIGS. 27, 28, and 29 show states where the rotation angle of the mirror is 0°, the mirror is rotated by 10° around the X axis in the Y-Z plane, and the mirror is rotated by −10° around the X axis in the Y-Z plane, respectively, in the deflection angle detecting device of the twentieth embodiment of the present invention.

The deflection angle detecting device of this embodiment includes the light source, the cover glass, a prism 30, the detecting reflection surface 4, a decentered lens 40, and the photodetector 5.

The light source is the semiconductor laser 1 (a semiconductor laser element) emitting a laser beam (detection light) toward the detecting reflection surface 4 provided to a light-deflecting element.

Also, although any semiconductor laser may be used as the semiconductor laser 1, it is natural to select a laser provided with a proper wavelength in the relationship with the detection sensitivity of the photodetector 5. Since any well-known means may be used, it is needless to say that the semiconductor laser 1 is connected to a driving means including a power supply and a modulation driving circuit, not shown, for properly emitting light.

The prism 30 and the decentered lens 40 are interposed between the detecting reflection surface 4 and the photodetector 5. The prism 30 has three optical working surfaces: a first surface 30a, a second surface 30b, and a third surface 30c.

The first surface 30a is an entrance surface having the function of transmitting a laser beam from the light source through the prism. The first surface has positive power. The second surface 30b is configured as an aspherical surface with positive power and is opposite to the detecting reflection surface 4. The second surface 30b combines, according to its areas, a reflection surface having the function of totally reflecting the light transmitted through the first surface 30a toward the third surface 30c, an exit surface having the function of transmitting the light reflected by the third surface 30c toward the detecting reflection surface 4, and an entrance surface having the function of transmitting the light reflected by the detecting reflection surface 4 through the prism. The third surface 30c combines, according to its areas, a path switching surface reflecting a part of the light beam from the light source totally reflected by the second surface 30b to switch the optical path toward the detecting reflection surface 4 and an exit surface having the function of transmitting the light beam from the detecting reflection surface 4 transmitted through the second surface 30b, toward the photodetector 5. The third surface 30c is configured as a free-formed surface with positive power.

The decentered lens 40 is situated between the prism 30 and the photodetector 5 and is cemented to the prism 30. The decentered lens 40 has two optical working surface: a first surface 40a (corresponding to a fourth surface in the present invention) and a second surface 40b (corresponding to a fifth surface in the present invention).

The first surface 40a is configured as a free-formed surface and is cemented to the surface 30c of the prism 30 by means of UV hardening resin, constituting an entrance surface having the function of transmitting the light emerging from the surface 30c of the prism 30. The second surface 40b is configured as a free-formed surface with positive power, constituting an exit surface having the function of transmitting the light beam transmitted through the surface 40a.

Each of the prism 30 and the decentered lens 40 is constructed of a medium with a refractive index of 1 or more, as glass material, for example, glass such as OHARA S-BSL7 or optical plastic such as amorphous polyolefin.

It is only necessary that each of the prism 30 and the decentered lens 40 is constructed of a medium with a refractive index of 1 or more, and a medium constructed so that the interior of the glass material is hollow or is filled with a liquid is also applicable.

The surface 30c is a polarization beam splitter surface coated with a polarization film that, of polarized components perpendicular to each other, one linearly polarized component (here, p-polarized light) is transmitted and the other linearly polarized component (here, s-polarized light) is reflected. The prism 30 and the decentered lens 40 constitute a single polarization beam splitter.

A quarter-wave plate, although not shown in the figure, is interposed between the surface 30b and the detecting reflection surface 4.

The photodetector 5 is placed on the optical axis of the light transmitted through the polarization beam splitter surface 30c.

As the photodetector 5, the position sensitive detector (the so-called PSD) can be adopted in which when the sensor light-receiving surface 6 is radiated with the spot of the laser beam, a voltage corresponding to the center position of the light intensity of the spot is output to sense the position of the spot. The PSD is constructed with an array of many photodiodes, for example, as shown in FIG. 3, so that when a preset part is radiated with the light beam, voltages corresponding to distances D1, D2, D3, and D4 from the corners of the PSD to the center of the light beam are output from four terminals T1, T2, T3, and T4, and the position (the inclination in X and Y directions) can be detected by calculating these output values.

As the photodetector 5 is adopted a detector in which a one- or two-dimensional position is detected in accordance with whether the inclination of the detecting reflection surface 4 is one-dimensional (in the X or Y direction) or two-dimensional (in the X and Y directions). Also, it is needless to say that the photodetector 5, because of its operation, is provided with a proper driving means, not to speak of the power supply, but this is well known and thus its explanation is omitted.

In the deflection angle detecting device of the twentieth embodiment constructed as mentioned above, as shown in FIGS. 27–29, laser light emitted from the semiconductor laser 1 which is the light source passes through the cover glass and is transmitted through the first surface 30a with positive power of the prism 30 to enter the second surface 30b. The light beam is incident on the second surface 30b at an angle larger than the critical angle and thereby is totally reflected. Subsequently, the s-polarized light is reflected by the polarization beam splitter surface 30c and enters again the second surface 30b. Incident light is transmitted through the second surface 30b, and after being transmitted through the quarter-wave plate, not shown, to become circularly polarized light, is incident on, and is reflected by, the detecting reflection surface 4. The light reflected by the detecting reflection surface 4 is transmitted again through the quarter-wave plate, not shown, to become p-polarized light. Subsequently, the light is transmitted again through the second surface 30b of the prism 30 and is incident on the beam splitter surface 30c. The light is transmitted through the beam splitter surface 30c and the first surface 40a of the decentered lens 40 to enter the decentered lens 40 and is transmitted through the second surface 40b with positive power, thereby emerging from the decentered lens 40. The light leaving the decentered lens 40 is incident on the photodetector 5 and forms a light spot.

When the detecting reflection surface 4 is inclined in the X and Y directions, the photodetector 5 detects the amount of inclination by detecting the position of the spot on the sensor light-receiving surface 6.

When the detecting reflection surface 4 is inclined one-dimensionally, the position of the spot 7a on the light-receiving surface 6 of the photodetector 5 is shifted. In this case, the output of the photodetector 5, as shown in the graph of FIG. 5, is almost linearly changed. When the detecting reflection surface 4 is inclined in the X and Y directions, the spot 7b on the light-receiving surface 6 is moved in the two-dimensional direction. In this case, an output in each direction likewise is as shown in the graph of FIG. 5, and the relationship between the amount of inclination (angle) of the detecting reflection surface and the output becomes favorable in linearity. In the twentieth embodiment, the inclination of the detecting reflection surface 4 can be detected within around ±10°.

In the construction of the twentieth embodiment, therefore, it becomes possible to use path switching of light pickup, the tracking means, and a light switching means of optical communication which require detection in a wide range of the inclination of the detecting reflection surface.

Also, in the embodiment of the present invention, a four-divided light-receiver (a four-divided position detector) is used as the photodetector, instead of the position sensitive detector (PSD), and thereby the deflection angle can also be detected.

The spot diameter of the laser light A condensed on the photodetector 5 using the four-divided light-receiver (the four-divided position detector) is such as to be larger than that of the laser light condensed on the photodetector using the PSD. As shown in FIG. 7, the light-receiving surface 8 of the photodetector 5 is divided into four light-receiving subsurfaces (represented by 8a, 8b, 8c, and 8d). When the detecting reflection surface 4 is two-dimensionally inclined in the X and Y directions, the spot 7 on the light-receiving surface 8 is moved in a two-dimensional direction. In this case, when outputs corresponding to the areas of the light-receiving subsurfaces 8a, 8b, 8c, and 8d, radiated with the laser light are represented by A, B, C, and D, the output corresponding to the position in the X direction is obtained by calculating $(A+D-B-C)/(A+B+C+D)$ and the output corresponding to the position in the Y direction by calculating $(A+B-C-D)/(A+B+C+D)$. The calculated output in each direction is almost linearly changed as far as the spot is uniform in shape.

According to the deflection angle detecting device of the twentieth embodiment constructed as mentioned above, the following advantages are obtained.

In the deflection angle detecting device of the twentieth embodiment, since the first surface 30a of the prism 30 has positive power, the height of a marginal ray of light emitted from the light source is lowered and the light beam becomes small. Consequently, the F-number is reduced and the production of aberration can be suppressed. Moreover, the free-formed surfaces are provided in the optical paths before and behind the detecting reflection surface and thus aberration of an off-axis ray, such as curvature of field or distortion, produced by the rotation of the detecting reflection surface can be corrected. Whereby, a reduction in change of the spot diameter, at the center and the end of the photodetector, of a ray reaching the photodetector caused by the rotation of the detecting reflection surface, or the rotation angle of the detecting reflection surface and the linearity of the ray position on the photodetector can be further ensured, and the detection of the deflection angle with a high degree of accuracy becomes possible.

In the deflection angle detecting device of the twentieth embodiment, the reflection angle larger than the critical angle is obtained so that the light incident from the first surface 30a of the prism 30 on the interior is totally reflected by the second surface 30b of the prism 30, and hence a loss of the amount of light is kept to a minimum. Since the second surface 30b need not be coated with the reflection film, cost can be reduced accordingly.

Furthermore, the second surface 30b is a surface causing the light to emerge from the prism 30 toward the detecting reflection surface 4 and is also a surface rendering the light reflected by the detecting reflection surface 4 incident on the prism 30, so that it functions as a total reflection surface and a transmission surface by itself. Consequently, the optical working surfaces are effectively used and cost can be reduced accordingly.

In the deflection angle detecting device of the twentieth embodiment, the third surface 30c of the prism 30 is configured as a surface with positive power and has the function of rendering the light from the light source nearly parallel in the optical system to the detecting reflection surface. The surface 30c, which is coated with a film so as to function as a polarization beam splitter, reflects the s-polarized light from the light source and transmits the p-polarized light which is incident again on the prism 30 through the quarter-wave plate (not shown), the detecting reflection surface, and the quarter-wave plate (not shown). In so doing, the third surface 30c has two functions of reflection and transmission, but a loss in the amount of light of this surface can be kept to a minimum.

In the deflection angle detecting device of the twentieth embodiment, the first surface 40a of the decentered lens 40 is configured into almost the same profile as the third surface 30c of the prism 30, and both are cemented by means of UV hardening resin. As a result, the interface between the third surface 30c of the prism 30 and the first surface 40a of the decentered lend 40 ceases to exist theoretically, and a loss of the amount of light can be minimized. Also, when the light is incident on the decentered lens 40 from the prism 30, the power is practically lost.

In the deflection angle detecting device of the twentieth embodiment, the second surface 40b of the decentered lens 40 is configured as a transmission surface with positive power, and therefore the light can be condensed on the light-receiving surface of the photodetector 5 by the power of the surface 40b in the optical system after reflection by the detecting reflection surface 4.

Where the detecting reflection surface is rotated, its reflection point has a field angle twice the rotation angle as the entrance pupil. Hence, if the surface 40b is spherical, it becomes difficult to correct aberration of an off-axis ray. In the twentieth embodiment, the surface 40b is configured as a free-formed surface, and thus aberration of the off-axis ray is easily corrected.

In the deflection angle detecting device of the twentieth embodiment, the optical system of the prism 30 and the decentered lend 40 and the photodetector 5 are arranged opposite to the detecting reflection surface 4, and thus the electric system is integrally constructed so that the entire device can be designed to be compact.

Twenty-first Embodiment

Figure 30:
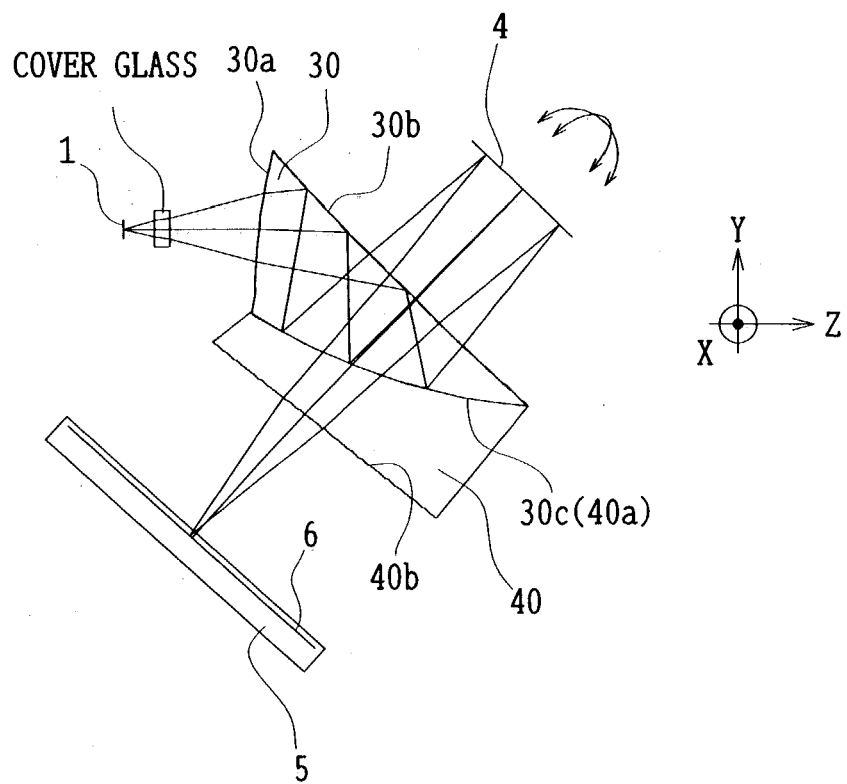
FIG. 30 is a view showing schematically the deflection angle detecting device in a twenty-first embodiment of the present invention.

FIG. 30 shows the deflection angle detecting device in the twenty-first embodiment of the present invention. The deflection angle detecting device of this embodiment has almost the same construction as that of the twentieth embodiment with the exception that the second surface 40b of the decentered lens 40 is configured as a Fresnel surface with positive power.

According to the deflection angle detecting device of the twenty-first embodiment, since the second surface 40b of the decentered lens 40 is configured as the Fresnel surface, this surface can be designed like a flat plate, and the layout of the entire device is facilitated in contrast with the deflection angle detecting device of the twentieth embodiment. Other functions and effects are about the same as in the twentieth embodiment.

Twenty-second Embodiment

Figure 31:
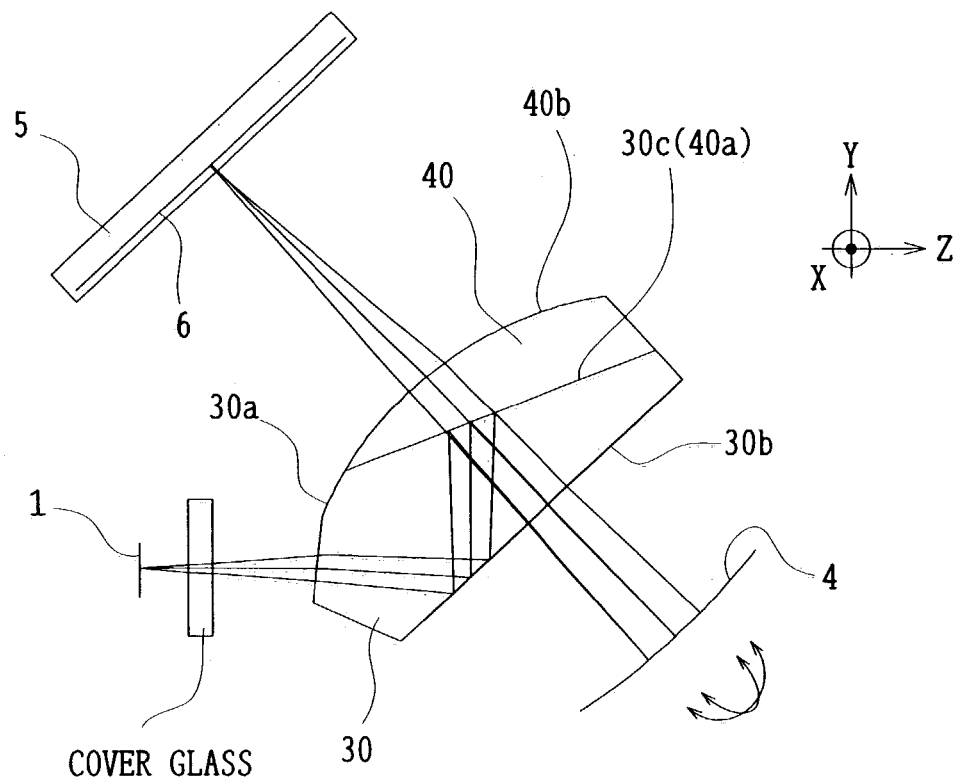
FIG. 31 is a view showing schematically the deflection angle detecting device in a twenty-second embodiment of the present invention.

FIG. 31 shows the deflection angle detecting device in the twenty-second embodiment of the present invention. In the deflection angle detecting device of this embodiment, the surface 30a of the prism 30 is configured as a Fresnel surface, and the second and third surfaces 30b and 30c and the first surface 40a of the decentered lens 40 are configured to be flat. The second surface 40b of the decentered lens 40 is configured to be spherical. The detecting reflection surface 4 is also configured to be spherical. Other structures are almost the same as in the twentieth embodiment.

According to the deflection angle detecting device of the twenty-second embodiment, the prism 30 is a triangle prism, only one surface of which is configured as the Fresnel surface, and the decentered lens 40 has a simple shape, including the flat surface and the spherical surface. Thus, production becomes easier than in the twentieth embodiment, and cost can be reduced accordingly.

Since the cemented surface between the prism 30 and the decentered lens 40 is flat, a cementation process is facilitated, which is advantageous for performance and cost.

The deflection angle detecting device of the twenty-second embodiment brings about the same function and effect as in the twentieth embodiment as described below.

In the deflection angle detecting device of the twenty-second embodiment, as in the twentieth embodiment, the first surface 30a of the prism 30 has positive power, and hence the height of a marginal ray of light emitted from the light source is lowered and the light beam becomes small. Consequently, the F-number is reduced and the production of aberration can be suppressed.

In the deflection angle detecting device of the twenty-second embodiment, as in the twentieth embodiment, the reflection angle larger than the critical angle is obtained so that the light incident from the first surface 30a of the prism 30 on the interior is totally reflected by the second surface 30b of the prism 30, and hence a loss of the amount of light is kept to a minimum. Since the second surface 30b need not be coated with the reflection film, cost can be reduced accordingly.

Furthermore, the second surface 30b is a surface causing the light to emerge from the prism 30 toward the detecting reflection surface 4 and is also a surface rendering the light reflected by the detecting reflection surface 4 incident on the prism 30, so that it functions as a total reflection surface and a transmission surface by itself. Consequently, the optical working surfaces are effectively used and cost can be reduced accordingly.

In the deflection angle detecting device of the twenty-second embodiment, as in the twentieth embodiment, the third surface 30c of the prism 30, which is coated with a film so as to function as a polarization beam splitter, reflects the s-polarized light from the light source and transmits the p-polarized light which is incident again on the prism 30 through the quarter-wave plate (not shown), the detecting reflection surface, and the quarter-wave plate (not shown). In so doing, the third surface 30c has two functions of reflection and transmission, but a loss in the amount of light of this surface can be kept to a minimum.

In the deflection angle detecting device of the twenty-second embodiment, as in the twentieth embodiment, the first surface 40a of the decentered lens 40 is configured into almost the same profile as the third surface 30c of the prism 30, and both are cemented by means of UV hardening resin. As a result, the interface between the third surface 30c of the prism 30 and the first surface 40a of the decentered lend 40 ceases to exist theoretically, and a loss of the amount of light can be minimized. Also, when the light is incident on the decentered lens 40 from the prism 30, the power is practically lost.

In the deflection angle detecting device of the twenty-second embodiment, as in the twentieth embodiment, the second surface 40b of the decentered lens 40 is configured as a transmission surface with positive power, and therefore the light can be condensed on the light-receiving surface of the photodetector 5 by the power of the surface 40b in the optical system after reflection by the detecting reflection surface 4.

In the deflection angle detecting device of the twenty-second embodiment, as in the twentieth embodiment, the optical system of the prism 30 and the decentered lend 40 and the photodetector 5 are arranged opposite to the detecting reflection surface 4, and thus the electric system is integrally constructed so that the entire device can be designed to be compact.

Twenty-third Embodiment

Figure 32:
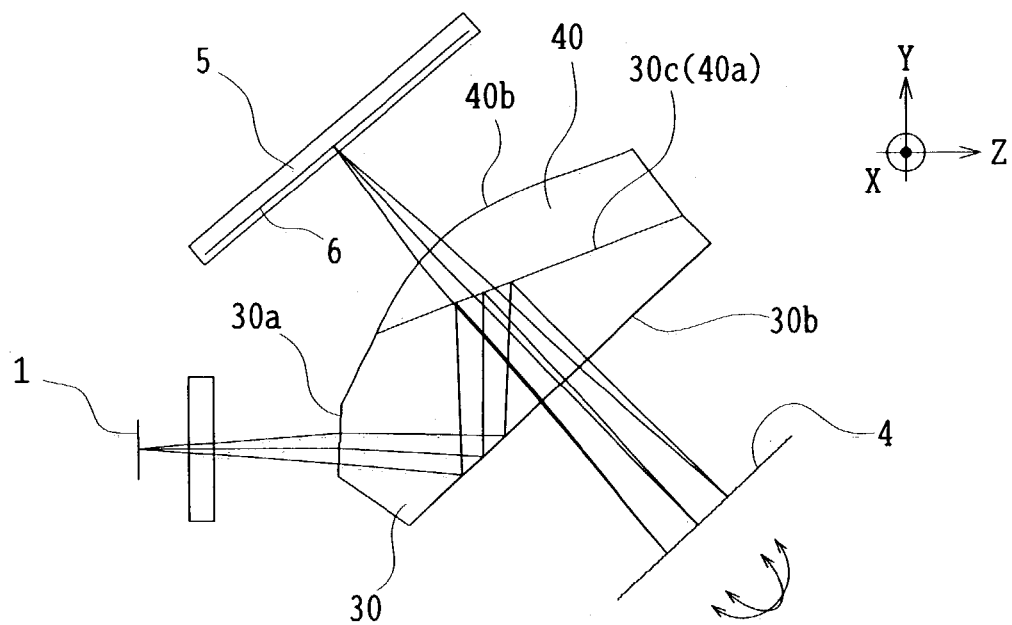
FIG. 32 is a view showing schematically the deflection angle detecting device in a twenty-third embodiment of the present invention.

FIG. 32 shows the deflection angle detecting device in the twenty-third embodiment of the present invention. The deflection angle detecting device of this embodiment has almost the same construction as that of the twenty-second embodiment with the exception that the detecting reflection surface 4 is configured as a Fresnel surface, and the second surface 40b of the decentered lens 40 is configured as a free-formed surface.

According to the deflection angle detecting device of the twenty-third embodiment, the detecting reflection surface can be designed like a flat plate, and the layout of the entire device is facilitated in contrast with the deflection angle detecting device of the twenty-second embodiment. Moreover, the free-formed surfaces are provided in the optical paths before and behind the detecting reflection surface, and therefore, as in the twentieth embodiment, the detection of the deflection angle with a high degree of accuracy becomes possible. Other functions and effects are about the same as in the twenty-second embodiment.

Twenty-fourth Embodiment

Figure 33:
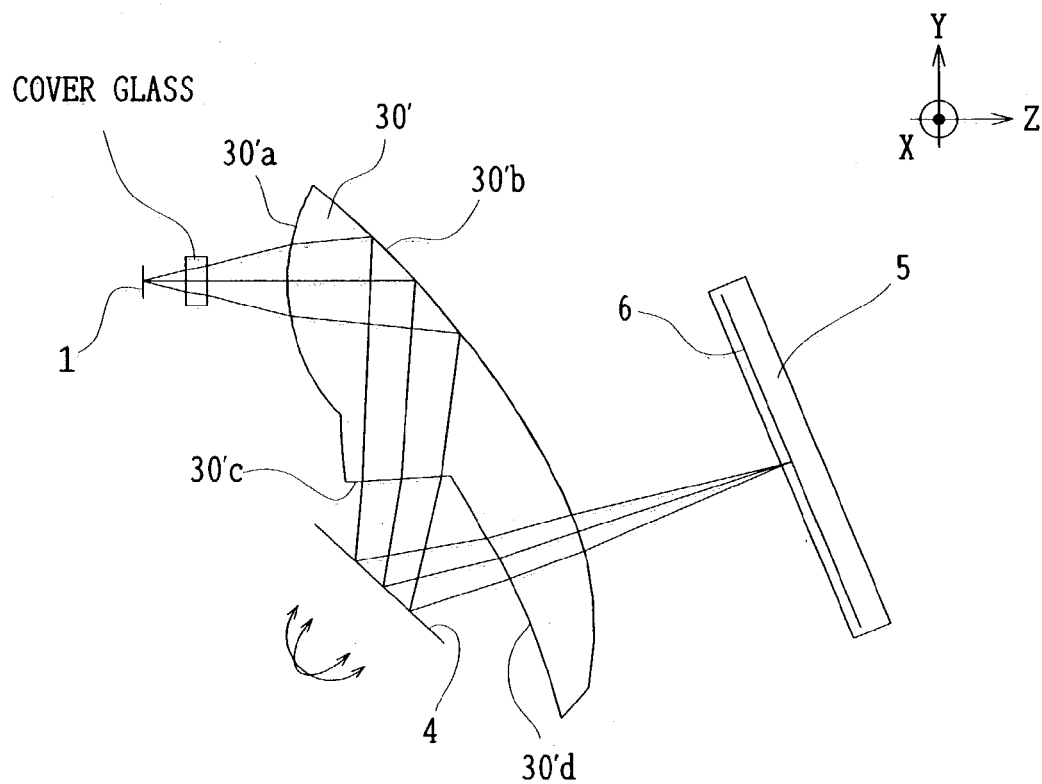
FIG. 33 is a view showing schematically the deflection angle detecting device in a twenty-fourth embodiment of the present invention.
Figures 34A, 34B:
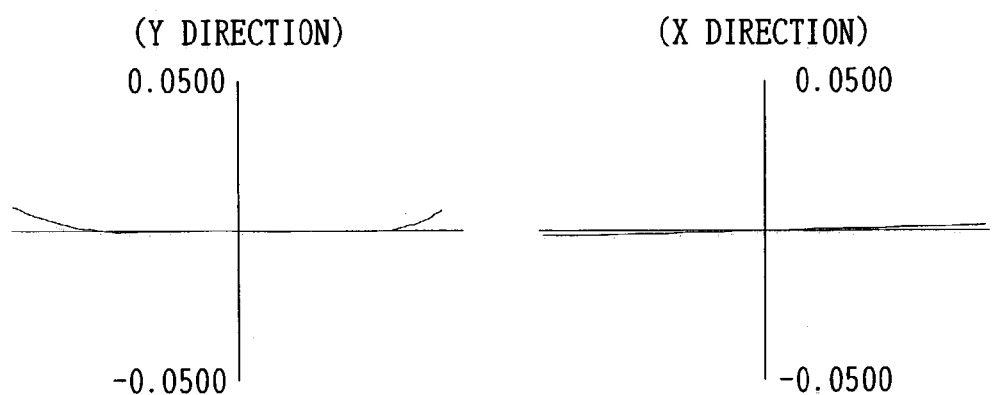
FIGS. 34A and 34B are diagrams showing transverse aberrations in the optical path of FIG. 27 where the rotation angle of the mirror is 0°.

FIG. 33 shows the deflection angle detecting device in the twenty-fourth embodiment of the present invention. The deflection angle detecting device of this embodiment has the light source, the cover glass, a prism 30', the detecting reflection surface 4, and the photodetector 5. The prism 30' by itself has the functions of the prism 30 and the decentered lens 40 in the twentieth to twenty-third embodiments.

The prism 30' is constructed to have four optical working surfaces: a first surface 30'$a$, a second surface 30'$b$, a third surface 30'$c$, and a fourth surface 30'$d$. The first surface 30'$a$ is configured as a curved surface with positive power. Each of the second to fourth surfaces 30'$b$–30'$d$ is configured as a free-formed surface with positive power. In the deflection angle detecting device of the twenty-fourth embodiment, no optical working surface of the prism 30' is coated with a polarization film. The quarter-wave plate is not provided. The structures of the light source 1, the cover glass, the detecting reflection surface 4, and the photodetector 5 are about the same as in the twentieth embodiment.

In the deflection angle detecting device of the twenty-fourth embodiment constructed as mentioned above, laser light emitted from the semiconductor laser 1 which is the light source is transmitted through the first surface 30'$a$ with positive power of the prism 30' through the cover glass and is incident on the second surface 30'$b$. Subsequently, the light is totally reflected by incidence on the second surface 30'$b$ at an angle larger than the critical angle, and after emerging from the third surface 30'$c$, is incident on, and is reflected by, the detecting reflection surface 4. The light reflected by the detecting reflection surface 4 is transmitted through the fourth surface 30'$d$ of the prism 30', enters again the prism 30', and is transmitted through the second surface 30'$b$ to thereby emerge from the prism 30'. The light leaving the prism 30' is incident on the photodetector 5 and forms a light spot.

According to the deflection angle detecting device of the twenty-fourth embodiment constructed as mentioned above, the following advantages are obtained.

In the deflection angle detecting device of the twenty-fourth embodiment, the first surface 30'$a$ of the prism 30' has positive power, and hence the height of a marginal ray of light emitted from the light source is lowered and the light beam becomes small. Consequently, the F-number is reduced and the production of aberration can be suppressed. In addition, the free-formed surfaces are provided in the optical paths before and behind the detecting reflection surface, and therefore, as in the twentieth embodiment, the detection of the deflection angle with a high degree of accuracy becomes possible.

In the deflection angle detecting device of the twenty-fourth embodiment, the reflection angle larger than the critical angle is obtained so that the light incident from the first surface 30'$a$ of the prism 30' on the interior is totally reflected by the second surface 30'$b$ of the prism 30', and hence a loss of the amount of light is kept to a minimum. Since the second surface 30'$b$ need not be coated with the reflection film, cost can be reduced accordingly.

Furthermore, the second surface 30'$b$ is a surface causing the light reflected by the detecting reflection surface 4 and incident on the prism 30' to emerge from the prism 30' toward the photodetector 5, so that it functions as a total reflection surface and a transmission surface by itself. Consequently, the optical working surfaces are effectively used and cost can be reduced accordingly.

In the deflection angle detecting device of the twenty-fourth embodiment, the second surface 30'$b$ and the fourth surface 30'$d$ of the prism 30', each with positive power, have the function equivalent to a single positive lens, and the light can be condensed by the powers of these surfaces on the light-receiving surface of the photodetector 5.

The detecting reflection surface has the field angle twice the rotation angle of the detecting reflection surface as the entrance pupil. Thus, a wide-angle optical system is obtained, and if the second surface 30'$b$ and the fourth surface 30'$d$ are configured to be spherical, it becomes difficult to correct aberration of the off-axis ray, such as curvature of field or distortion. In the twenty-fourth embodiment, since the second surface 30'$b$ and the fourth surface 30'$d$ are configured as free-formed surfaces, aberration of the off-axis ray, such as curvature of field or distortion, is corrected.

Also, although in the twentieth to twenty-third embodiments the third surface 30$c$ of the prism 30 is configured as the polarization beam splitter surface, it may be a half mirror surface. In this case, since transmission and reflection occur, once for each, and the amount of light is decreased by 50% on each of the transmission and the reflection, the amount of laser light from the light source finally reaching the photodetector 5 is reduced to about ¼.

The third surface 30$c$ of the prism 30 may be a diffraction optical element or an HOE (holographic optical element).

The PSD or the two- or four-divided PD is considered as the photodetector, and when a light spot of preset size is required in accordance with detection sensitivity, the photodetector is moved along the optical axis from a focal plane and thereby the size of the spot can be adjusted.

The characteristics of transverse aberration in the twentieth embodiment are shown in FIGS. 34A and 34B, FIGS. 35A and 35B, and FIGS. 36A and 36B.

Subsequently, the construction parameters of the optical system constituting the deflection angle detecting device in the fifth to twenty-fourth embodiments are shown below as numerical data.

In the numerical data, "FFS" represents the free-formed surface.

The aspherical surface used in each of the embodiments is a rotational symmetrical aspherical surface defined by the following equation:

$$Z=(y^2/R)/[1+\{1-(1+K)y^2/R^2\}^{1/2}]+ay^4+by^6+cy^8+dy^{10}+ \ldots$$

where Z is taken as the optical axis (axial chief ray) with positive in a traveling direction of light and y is taken as a direction normal to the optical axis. Here, R represents a paraxial radius of curvature, k represents a conic constant, and a, b, c, d, . . . represent fourth, sixth, eighth, and tenth order aspherical coefficients. The Z axis of the above equation constitutes the axis of the rotational symmetrical aspherical surface.

The free-formed surface in each embodiment is expressed by the following equation. Also, the Z axis of this equation constitutes the axis of the free-formed surface.

$$Z = cr^2 / [1 + \{1 - (1+k)c^2 r^2\}^{1/2}] + \sum_{j=2}^{66} C_j X^m Y^n$$

Here, the first term of this equation is a spherical surface term, and the second term is a free-formed surface term. In the spherical surface term, c denotes the curvature of the vertex, k denotes a conic constant, and $r = (X^2 + Y^2)^{1/2}$.

The free-formed surface term can be developed as the following equation. Here, $C_j$ (j is an integer of 2 or larger) is a coefficient.

$$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$

-continued
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 + \ldots$$

The term relative to the aspherical surface in which data are not described is zero. The refractive index is relative to the d line (wavelength 587.56 nm). Lengths are expressed in millimeters.

In the numerical data of each embodiment, in view of design convenience, it is assumed that a distance from the detecting reflection surface to the reflection surface of a rotating mirror 15 to be described later is zero and an axis of rotation is provided at the position of the optical axis of the detecting reflection surface.

Also, although actually a preset distance is kept between the detecting reflection surface and the reflection surface of the rotating mirror 15, the axis of rotation is provided on the detecting reflection surface and thereby the position of the reflection surface of the rotating mirror 15 is shifted by rotation. However, this can be compensated by electrically controlling the rotation angle, and thus even though the distance from the detecting reflection surface to the reflection surface of a rotating mirror 15 is assumed to be zero, the substance of the present invention is not affected.

| Numerical data 5 (the fifth embodiment) |||||| 
|---|---|---|---|---|---|
| Face No. | Radius of curvature | Face-to-face spacing | Decentration | Refractive index | Abbe's number |
| Object surface | ∞ | 0.00 | | | |
| 1 | ∞ | 0.78 | | | |
| 2 | ∞ | 0.50 | | 1.4900 | 0.0 |
| 3 | Stop surface | 2.00 | | | |
| 4 | FFS [1] | 0.00 | Decentration (1) | | |
| 5 | ∞ | 0.00 | Decentration (2) | | |
| Image plane | ∞ | 0.00 | | | |

| FFS [1] |||
|---|---|---|
| C4 = −1.4053 × 10$^{-1}$ | C6 = −1.2731 × 10$^{-1}$ | C8 = 1.0720 × 10$^{-1}$ |
| C10 = 8.1799 × 10$^{-3}$ | C11 = −1.9926 × 10$^{-2}$ | C13 = −1.3125 × 10$^{-1}$ |
| C17 = 1.2394 × 10$^{-2}$ | C19 = 4.4694 × 10$^{-2}$ | |

| Decentration [1] |||
|---|---|---|
| X = 0.00 | Y = −0.85 | Z = 0.00 |
| α = −38.00 | β = 0.00 | γ = 0.00 |

| Decentration [2] |||
|---|---|---|
| X = 0.00 | Y = 3.63 | Z = −2.50 |
| α = −54.30 | β = 0.00 | γ = 0.00 |

| Numerical data 6 (the sixth embodiment) |||||| 
|---|---|---|---|---|---|
| Face No. | Radius of curvature | Face-to-face spacing | Decentration | Refractive index | Abbe's number |
| Object surface | ∞ | 0.00 | | | |
| 1 | ∞ | 0.78 | | | |
| 2 | ∞ | 0.50 | | 1.4900 | 0.0 |
| 3 | Stop surface | 0.70 | | | |
| 4 | ∞ | 1.00 | | 1.5163 | 64.1 |
| 5 | −1.50 | 1.70 | | | |

-continued

Numerical data 6 (the sixth embodiment)

| | | | | |
|---|---|---|---|---|
| 6 | FFS [1] | 0.00 | Decentration (1) | |
| 7 | ∞ | 0.00 | Decentration (2) | |
| Image plane | ∞ | 0.00 | | |

FFS [1]

C4 = −4.9222 × 10⁻²  C6 = −6.0935 × 10⁻²  C8 = −1.6679 × 10⁻²
C10 = 5.5531 × 10⁻³  C17 = 1.5705 × 10⁻³  C19 = 6.4083 × 10⁻⁴

Decentration [1]

X = 0.00    Y = −0.70   Z = 0.00
α = −35.00  β = 0.00    γ = 0.00

Decentration [2]

X = 0.00    Y = 3.66    Z = −1.69
α = −63.74  β = 0.00    γ = 0.00

Numerical data 7 (the seventh embodiment)

| Face No. | Radius of curvature | Face-to-face spacing | Decentration | Refractive index | Abbe's number |
|---|---|---|---|---|---|
| Object surface | ∞ | 0.00 | | | |
| 1 | ∞ | 0.78 | | | |
| 2 | ∞ | 0.25 | | 1.4900 | 0.0 |
| 3 | Stop surface | 1.70 | | | |
| 4 | −4.71 | 0.00 | Decentration (1) | | |
| 5 | FFS [1] | 0.00 | Decentration (2) | 1.5254 | 56.2 |
| 6 | ∞ | 0.00 | Decentration (3) | | |
| 7 | ∞ | 0.00 | Decentration (4) | | |
| Image plane | ∞ | 0.00 | | | |

FFS [1]

C4 = −4.0913 × 10⁻¹  C6 = −2.4492 × 10⁻¹  C8 = −3.6243 × 10⁻²
C10 = 5.0081 × 10⁻²

Decentration [1]

X = 0.00    Y = 0.00    Z = 0.00
α = −37.00  β = 0.00    γ = 0.00

Decentration [2]

X = 0.00    Y = 1.50    Z = −0.90
α = −78.98  β = 0.00    γ = 0.00

Decentration [3]

X = 0.00    Y = 2.08    Z = −0.60
α = −69.56  β = 0.00    γ = 0.00

Decentration [4]

X = 0.00    Y = 3.00    Z = −0.89
α = −82.00  β = 0.00    γ = 0.00

Numerical data 8 (the eighth embodiment)

| Face No. | Radius of curvature | Face-to-face spacing | Decentration | Refractive index | Abbe's number |
|---|---|---|---|---|---|
| Object surface | ∞ | 0.00 | | | |
| 1 | ∞ | 0.78 | | | |
| 2 | ∞ | 0.25 | | 1.4900 | 0.0 |
| 3 | Stop surface | 2.20 | | | |
| 4 | ∞ | 0.00 | | | |
| 5 | −5.00 | 0.00 | Decentration (1) | | |
| 6 | ∞ | 0.00 | Decentration (2) | 1.5254 | 56.2 |
| 7 | FFS [1] | 0.00 | Decentration (3) | 1.5254 | 56.2 |

-continued

Numerical data 8 (the eighth embodiment)

| 8 | ∞ | 0.00 | Decentration (4) |
| 9 | ∞ | 0.00 | Decentration (5) |
| Image plane | ∞ | 0.00 | |

FFS [1]

$C4 = 8.3714 \times 10^{-2}$    $C6 = 1.2429 \times 10^{-2}$    $C8 = 3.3985 \times 10^{-3}$
$C10 = -4.8240 \times 10^{-3}$ Decentration [1]

X = 0.00        Y = 0.00        Z = 0.00
α = −25.00      β = 0.00        γ = 0.00

Decentration [2]

X = 0.00        Y = 0.50        Z = 0.00
α = 90.00       β = 0.00        γ = 0.00

Decentration [3]

X = 0.00        Y = 3.51        Z = 0.64
α = −42.41      β = 0.00        γ = 0.00

Decentration [4]

X = 0.00        Y = 1.78        Z = 0.19
α = 0.00        β = 0.00        γ = 0.00

Decentration [5]

X = 0.00        Y = 1.28        Z = 1.20
α = 0.00        β = 0.00        γ = 0.00

Numerical data 9 (the ninth embodiment)

| Face No. | Radius of curvature | Face-to-face spacing | Decentration | Refractive index | Abbe's number |
|---|---|---|---|---|---|
| Object surface | ∞ | 0.00 | | | |
| 1 | ∞ | 0.78 | | | |
| 2 | ∞ | 0.25 | | 1.4900 | 0.0 |
| 3 | Stop surface | 0.60 | | | |
| 4 | ∞ | | | | |
| 5 | ∞ | 0.00 | Decentration (1) | 1.5254 | 56.2 |
| 6 | FFS [1] | 0.00 | Decentration (2) | | |
| 7 | −2.70 | 0.00 | Decentration (3) | | |
| 8 | FFS [1] | 0.00 | Decentration (2) | 1.5254 | 56.2 |
| 9 | ∞ | 0.00 | Decentration (4) | 1.5254 | 56.2 |
| 10 | ∞ | 0.00 | Decentration (5) | | |
| 11 | ∞ | 0.00 | Decentration (6) | | |
| Image plane | ∞ | 0.00 | | | |

FFS [1]

$C4 = -1.5336 \times 10^{-1}$    $C6 = -6.4800 \times 10^{-2}$    $C8 = 3.0387 \times 10^{-2}$ Decentration [1]

X = 0.00        Y = 0.35        Z = 0.03
α = 15.99       β = 0.00        γ = 0.00

Decentration [2]

X = 0.00        Y = −0.55       Z = 0.34
α = −20.49      β = 0.00        γ = 0.00

Decentration [3]

X = 0.00        Y = 0.14        Z = 0.73
α = −7.00       β = 0.00        γ = 0.00

Decentration [4]

X = 0.00        Y = 0.35        Z = 0.03
α = 15.99       β = 0.00        γ = 0.00

Decentration [5]

X = 0.00        Y = 1.84        Z = 0.24
α = 77.04       β = 0.00        γ = 0.00

-continued

Numerical data 9 (the ninth embodiment)

Decentration [6]

| X = 0.00 | Y = 2.20 | Z = 0.30 |
|---|---|---|
| α = 57.15 | β = 0.00 | γ = 0.00 |

Numerical data 10 (the tenth embodiment)

| Face No. | Radius of curvature | Face-to-face spacing | Decentration | Refractive index | Abbe's number |
|---|---|---|---|---|---|
| Object surface | ∞ | 0.50 | | | |
| 1 | ∞ | 0.25 | | 1.5163 | 64.1 |
| 2 | ∞ | 0.00 | | | |
| 3 | Aspherical surface[1] | 0.00 | Decentration (1) | 1.5254 | 56.2 |
| 4 | ∞ | 0.00 | Decentration (2) | | |
| 5 | ∞ | 0.00 | Decentration (3) | | |
| 6 | FFS [1] | 0.00 | Decentration (4) | 1.5254 | 56.2 |
| 7 | Stop surface | 0.00 | Decentration (5) | 1.5254 | 56.2 |
| 8 | FFS [3] | 0.00 | Decentration (6) | | |
| 9 | ∞ | 0.00 | | | |
| Image plane | ∞ | 0.00 | Decentration (7) | | |

Aspherical surface [1]

Radius of curvature     2.99
$k = 0.0000 \times 10^{+0}$
$a = -7.3030 \times 10^{-2}$     $b = 2.3234 \times 10^{-4}$

FFS [1]

$C_4 = 2.7107 \times 10^{-1}$    $C_6 = 2.2483 \times 10^{-2}$    $C_8 = -7.2425 \times 10^{-2}$
$C_{10} = -2.2648 \times 10^{-3}$    $C_{11} = 3.2639 \times 10^{-2}$    $C_{13} = -4.7651 \times 10^{-2}$
$C_{15} = -2.1679 \times 10^{-2}$

FFS [2]

$C_4 = -5.7305 \times 10^{-3}$    $C_6 = -6.7871 \times 10^{-2}$    $C_8 = -1.0777 \times 10^{-3}$
$C_{10} = -6.3674 \times 10^{-3}$    $C_{11} = 2.9412 \times 10^{-2}$    $C_{13} = -1.2389 \times 10^{-2}$
$C_{15} = -3.1262 \times 10^{-3}$    $C_{17} = -6.3991 \times 10^{-3}$    $C_{19} = -4.7665 \times 10^{-3}$
$C_{21} = -3.0414 \times 10^{-4}$

FFS [3]

$C_4 = 2.8557 \times 10^{-1}$    $C_6 = -2.1758 \times 10^{-1}$    $C_8 = -7.1859 \times 10^{-3}$
$C_{10} = -2.3344 \times 10^{-1}$    $C_{11} = 5.3672 \times 10^{-2}$    $C_{13} = -3.6677 \times 10^{-2}$
$C_{15} = -1.2160 \times 10^{-1}$    $C_{17} = -1.5784 \times 10^{-2}$    $C_{19} = -1.1364 \times 10^{-1}$

Decentration [1]

| X = 0.00 | Y = 0.00 | Z = 0.70 |
|---|---|---|
| α = 0.00 | β = 0.00 | γ = 0.00 |

Decentration [2]

| X = 0.00 | Y = 0.00 | Z = 1.50 |
|---|---|---|
| α = 0.00 | β = 0.00 | γ = 0.00 |

Decentration [3]

| X = 0.00 | Y = 0.00 | Z = 5.01 |
|---|---|---|
| α = 0.00 | β = 0.00 | γ = 0.00 |

Decentration [4]

| X = 0.00 | Y = 0.32 | Z = −1.98 |
|---|---|---|
| α = 0.15 | β = 0.00 | γ = 0.00 |

Decentration [5]

| X = 0.00 | Y = 0.00 | Z = 0.00 |
|---|---|---|
| α = −43.00 | β = 0.00 | γ = 0.00 |

Decentration [6]

| X = 0.00 | Y = 1.27 | Z = −0.02 |
|---|---|---|
| α = −91.26 | β = 0.00 | γ = 0.00 |

-continued

| Numerical data 10 (the tenth embodiment) |
| --- |

| Decentration [7] | | |
| --- | --- | --- |
| X = 0.00 | Y = 3.00 | Z = 4.58 |
| α = −83.00 | β = 0.00 | γ = 0.00 |

| Numerical data 11 (the eleventh embodiment) | | | | |
| --- | --- | --- | --- | --- |
| Face No. | Radius of curvature | Face-to-face spacing | Decentration | Refractive index | Abbe's number |
| Object surface | ∞ | 0.50 | | | |
| 1 | ∞ | 0.25 | | 1.5163 | 64.1 |
| 2 | ∞ | 0.00 | | | |
| 3 | Aspherical surface [1] | 0.00 | Decentration (1) | 1.5254 | 56.2 |
| 4 | ∞ | 0.00 | Decentration (2) | 1.5254 | 56.2 |
| 5 | ∞ | 0.00 | Decentration (3) | 1.5254 | 56.2 |
| 6 | ∞ | 0.00 | Decentration (2) | | |
| 7 | Stop surface | 0.00 | Decentration (4) | | |
| 8 | ∞ | 0.00 | Decentration (2) | 1.5254 | 56.2 |
| 9 | 3.96 | 0.00 | Decentration (5) | | |
| 10 | ∞ | 0.00 | Decentration (6) | | |
| Image plane | ∞ | 0.00 | | | |

| Aspherical surface [1] | |
| --- | --- |
| Radius of curvature | 2.92 |
| $k = 0.0000 \times 10^{+0}$ | |
| $a = -1.1738 \times 10^{-2}$ | |

| Decentration [1] | | |
| --- | --- | --- |
| X = 0.00 | Y = −0.19 | Z = 1.28 |
| α = −0.40 | β = 0.00 | γ = 0.00 |
| Decentration [2] | | |
| X = 0.00 | Y = 1.22 | Z = 4.48 |
| α = −46.89 | β = 0.00 | γ = 0.00 |
| Decentration [3] | | |
| X = 0.00 | Y = 1.21 | Z = 2.76 |
| α = 111.90 | β = 0.00 | γ = 0.00 |
| Decentration [4] | | |
| X = 0.00 | Y = −0.85 | Z = 4.69 |
| α = −46.89 | β = 0.00 | γ = 0.00 |
| Decentration [5] | | |
| X = 0.00 | Y = 1.78 | Z = 2.18 |
| α = −46.89 | β = 0.00 | γ = 0.00 |
| Decentration [6] | | |
| X = 0.00 | Y = 3.44 | Z = 0.65 |
| α = −46.89 | β = 0.00 | γ = 0.00 |

| Numerical data 12 (the twelfth embodiment) | | | | |
| --- | --- | --- | --- | --- |
| Face No. | Radius of curvature | Face-to-face spacing | Decentration | Refractive index | Abbe's number |
| Object surface | ∞ | 0.00 | | | |
| 1 | ∞ | 0.78 | | | |
| 2 | ∞ | 0.25 | | 1.4900 | 0.0 |
| 3 | Stop surface | 0.80 | | | |
| 4 | ∞ | 0.00 | | | |
| 5 | ∞ | 0.00 | Decentration (1) | 1.5163 | 64.1 |
| 6 | ∞ | 0.00 | Decentration (2) | | |
| 7 | −3.24 | 0.00 | Decentration (3) | | |

| -continued |
| --- |
| Numerical data 12 (the twelfth embodiment) |

| | | | |
| --- | --- | --- | --- |
| 8 | ∞ | 0.00 | Decentration (2) |
| 9 | ∞ | 0.00 | Decentration (4) |
| Image plane | ∞ | 0.00 | |

| Decentration [1] | | |
| --- | --- | --- |
| X = 0.00 | Y = 0.00 | Z = 0.10 |
| α = 45.00 | β = 0.00 | γ = 0.00 |
| Decentration [2] | | |
| X = 0.00 | Y = 0.00 | Z = 0.25 |
| α = 45.00 | β = 0.00 | γ = 0.00 |
| Decentration [3] | | |
| X = 0.00 | Y = 0.00 | Z = 1.30 |
| α = 0.00 | β = 0.00 | γ = 0.00 |
| Decentration [4] | | |
| X = 0.00 | Y = 1.50 | Z = 0.25 |
| α = −90.00 | β = 0.00 | γ = 0.00 |

| Numerical data 13 (the thirteenth embodiment) | | | | | |
| --- | --- | --- | --- | --- | --- |
| Face No. | Radius of curvature | Face-to-face spacing | Decentration | Refractive index | Abbe's number |
| Object surface | ∞ | 0.00 | | | |
| 1 | ∞ | 0.78 | | | |
| 2 | ∞ | 0.25 | | 1.4900 | 0.0 |
| 3 | Stop surface | 0.50 | | | |
| 4 | ∞ | 0.00 | | | |
| 5 | 2.50 | 0.40 | | 1.5163 | 64.1 |
| 6 | −2.50 | 1.50 | | | |
| 7 | ∞ | 0.00 | Decentration (1) | | |
| 8 | ∞ | 0.00 | Decentration (2) | | |
| 9 | ∞ | 0.00 | Decentration (3) | 1.5163 | 64.1 |
| 10 | −8.99 | 0.00 | Decentration (4) | 1.5163 | 64.1 |
| 11 | ∞ | 0.00 | Decentration (3) | | |
| 12 | ∞ | 0.00 | | | |
| 13 | ∞ | 0.00 | Decentration (5) | 1.5163 | 64.1 |
| 14 | ∞ | 0.00 | Decentration (6) | | |
| 15 | ∞ | 0.00 | Decentration (7) | | |
| Image plane | ∞ | 0.00 | | | |

| Decentration [1] | | |
| --- | --- | --- |
| X = 0.00 | Y = 0.00 | Z = 0.00 |
| α = 45.00 | β = 0.00 | γ = 0.00 |
| Decentration [2] | | |
| X = 0.00 | Y = −1.50 | Z = 0.00 |
| α = −90.00 | β = 0.00 | γ = 0.00 |
| Decentration [3] | | |
| X = 0.00 | Y = 0.00 | Z = −0.50 |
| α = 0.00 | β = 0.00 | γ = 0.00 |
| Decentration [4] | | |
| X = 0.00 | Y = 0.00 | Z = 0.00 |
| α = 0.00 | β = 0.00 | γ = 0.00 |
| Decentration [5] | | |
| X = 0.00 | Y = 0.00 | Z = 1.50 |
| α = 45.00 | β = 0.00 | γ = 0.00 |
| Decentration [6] | | |
| X = 0.00 | Y = 0.20 | Z = 1.50 |
| α = 45.00 | β = 0.00 | γ = 0.00 |
| Decentration [7] | | |
| X = 0.00 | Y = 1.75 | Z = 1.50 |
| α = 90.00 | β = 0.00 | γ = 0.00 |

| | Numerical data 14 (the fourteenth embodiment) | | | | |
|---|---|---|---|---|---|
| Face No. | Radius of curvature | Face-to-face spacing | Decentration | Refractive index | Abbe's number |
| Object surface | ∞ | 0.00 | | | |
| 1 | ∞ | 0.78 | | | |
| 2 | ∞ | 0.25 | | 1.4900 | 0.0 |
| 3 | Stop surface | 0.40 | | | |
| 4 | ∞ | 0.00 | | | |
| 5 | ∞ | 0.00 | | 1.5163 | 64.1 |
| 6 | ∞ | 0.00 | Decentration (1) | 1.5163 | 64.1 |
| 7 | ∞ | 0.00 | Decentration (2) | | |
| 8 | −3.15 | 0.00 | Decentration (3) | | |
| 9 | ∞ | 0.00 | Decentration (2) | 1.5163 | 64.1 |
| 10 | ∞ | 0.00 | Decentration (4) | | |
| 11 | ∞ | 0.00 | Decentration (5) | | |
| Image plane | ∞ | 0.00 | | | |

Decentration [1]

| $X = 0.00$ | $Y = 0.00$ | $Z = 1.10$ |
|---|---|---|
| $\alpha = 45.00$ | $\beta = 0.00$ | $\gamma = 0.00$ |

Decentration [2]

| $X = 0.00$ | $Y = -1.10$ | $Z = 1.10$ |
|---|---|---|
| $\alpha = -90.00$ | $\beta = 0.00$ | $\gamma = 0.00$ |

Decentration [3]

| $X = 0.00$ | $Y = -1.50$ | $Z = 1.10$ |
|---|---|---|
| $\alpha = -78.00$ | $\beta = 0.00$ | $\gamma = 0.00$ |

Decentration [4]

| $X = 0.00$ | $Y = 1.25$ | $Z = 1.10$ |
|---|---|---|
| $\alpha = -90.00$ | $\beta = 0.00$ | $\gamma = 0.00$ |

Decentration [5]

| $X = 0.00$ | $Y = 1.50$ | $Z = 1.10$ |
|---|---|---|
| $\alpha = -90.00$ | $\beta = 0.00$ | $\gamma = 0.00$ |

In the above embodiments, the detecting reflection surface 4 may be configured with respect to either the front surface mirror or the back surface mirror. When the detecting reflection surface 4 is configured to have positive power, it may be configured to have either rotational symmetrical power or irrotational symmetrical power.

When each of the optical elements 9 and 10 is constructed to have positive power, it may be constructed to have either a rotational symmetrical surface or an irrotational symmetrical surface. Alternatively, each of the optical elements 9 and 10 may be constructed to have a Fresnel lens surface or an aspherical surface.

The stop surface described in the numerical data is a virtual stop surface, and a stop does not actually exist there. A flare stop for eliminating detrimental light can be placed in the face-to-face spacing as occasion demands.

| | Numerical data 15 (the fifteenth embodiment) | | | | |
|---|---|---|---|---|---|
| Face No. | Radius of curvature | Face-to-face spacing | Decentration | Refractive index | Abbe's number |
| Object surface | ∞ | 0.50 | | | |
| 1 | ∞ | 0.50 | | 1.5163 | 64.1 |
| 2 | ∞ | 0.50 | | | |
| 3 | 5.10 | 1.00 | | 1.5163 | 64.1 |
| 4 | −5.10 | 0.00 | | | |
| 5 | Stop surface (Reflection surface) | 0.00 | Decentration (1) | | |
| 6 | ∞ | 0.00 | Decentration (2) | 1.5254 | 56.2 |
| 7 | FFS [1] | 0.00 | Decentration (3) | 1.5254 | 56.2 |
| 8 | ∞ | 0.00 | Decentration (2) | 1.5254 | 56.2 |
| 9 | ∞ | 0.00 | Decentration (4) | | |
| 10 | ∞ | 0.00 | Decentration (5) | | |
| Image plane | ∞ | 0.00 | | | |

FFS [1]

| $C4 = 1.3945 \times 10^{-2}$ | $C6 = -3.5030 \times 10^{-3}$ | $C8 = -2.7660 \times 10^{-3}$ |
|---|---|---|
| $C10 = -2.3003 \times 10^{-4}$ | | |

-continued

Numerical data 15 (the fifteenth embodiment)

Decentration [1]

| | | |
|---|---|---|
| X = 0.00 | Y = 0.00 | Z = 2.00 |
| α = −45.00 | β = 0.00 | γ = 0.00 |

Decentration [2]

| | | |
|---|---|---|
| X = 0.00 | Y = 2.00 | Z = 0.00 |
| α = 90.00 | β = 0.00 | γ = 0.00 |

Decentration [3]

| | | |
|---|---|---|
| X = 0.00 | Y = 3.10 | Z = 2.00 |
| α = −118.00 | β = 0.00 | γ = 0.00 |

Decentration [4]

| | | |
|---|---|---|
| X = 0.00 | Y = 3.00 | Z = −0.90 |
| α = −40.00 | β = 0.00 | γ = 0.00 |

Decentration [5]

| | | |
|---|---|---|
| X = 0.00 | Y = 3.03 | Z = −1.36 |
| α = −42.00 | β = 0.00 | γ = 0.00 |

Numerical data 16 (the sixteenth embodiment)

| Face No. | Radius of curvature | Face-to-face spacing | Decentration | Refractive index | Abbe's number |
|---|---|---|---|---|---|
| Object surface | ∞ | 0.50 | | | |
| 1 | ∞ | 0.50 | | 1.5163 | 64.1 |
| 2 | ∞ | 0.50 | | | |
| 3 | 2.50 | 1.00 | | 1.5163 | 64.1 |
| 4 | −2.50 | 0.00 | | | |
| 5 | Stop surface (Reflection surface) | 0.00 | Decentration (1) | | |
| 6 | ∞ | 0.00 | Decentration (2) | 1.5254 | 56.2 |
| 7 | FFS [1] | 0.00 | Decentration (3) | 1.5254 | 56.2 |
| 8 | ∞ | 0.00 | Decentration (2) | 1.5254 | 56.2 |
| 9 | FFS [2] | 0.00 | Decentration (4) | 1.5254 | 56.2 |
| 10 | ∞ | 0.00 | Decentration (5) | | |
| 11 | ∞ | 0.00 | Decentration (6) | | |
| Image plane | ∞ | 0.00 | | | |

FFS [1]

C4 = 3.1086 × 10$^{-2}$    C6 = 3.3754 × 10$^{-2}$    C8 = −7.8849 × 10$^{-3}$
C10 = −5.0685 × 10$^{-5}$    C11 = −2.5623 × 10$^{-4}$    C13 = −1.0088 × 10$^{-3}$
C15 = 2.1727 × 10$^{-5}$    C17 = −8.7558 × 10$^{-6}$

FFS [2]

C4 = −3.9879 × 10$^{-3}$    C6 = 1.3224 × 10$^{-2}$    C8 = 1.0032 × 10$^{-2}$
C10 = −1.8119 × 10$^{-3}$

Decentration [1]

| | | |
|---|---|---|
| X = 0.00 | Y = 0.00 | Z = 1.50 |
| α = −57.00 | β = 0.00 | γ = 0.00 |

Decentration [2]

| | | |
|---|---|---|
| X = 0.00 | Y = 1.40 | Z = 1.00 |
| α = 90.00 | β = 0.00 | γ = 0.00 |

Decentration [3]

| | | |
|---|---|---|
| X = 0.00 | Y = 1.85 | Z = 4.67 |
| α = −128.50 | β = 0.00 | γ = 0.00 |

Decentration [4]

| | | |
|---|---|---|
| X = 0.00 | Y = 4.14 | Z = −0.86 |
| α = −95.97 | β = 0.00 | γ = 0.00 |

Decentration [5]

| | | |
|---|---|---|
| X = 0.00 | Y = 4.34 | Z = −4.78 |
| α = −135.00 | β = 0.00 | γ = 0.00 |

|  | Numerical data 16 (the sixteenth embodiment) | | |
|---|---|---|---|
|  | Decentration [6] | | |
| X = 0.00 | Y = 2.73 | Z = −3.68 | |
| α = 45.00 | β = 0.00 | γ = 0.00 | |

Numerical data 17 (the seventeenth embodiment)

| Face No. | Radius of curvature | Face-to-face spacing | Decentration | Refractive index | Abbe's number |
|---|---|---|---|---|---|
| Object surface | ∞ | 0.50 | | | |
| 1 | ∞ | 0.50 | | 1.5163 | 64.1 |
| 2 | ∞ | 0.50 | | | |
| 3 | 5.00 | 1.00 | | 1.5163 | 64.1 |
| 4 | −5.00 | 0.00 | | | |
| 5 | Stop surface (Reflection surface) | 0.00 | Decentration (1) | | |
| 6 | ∞ | 0.00 | Decentration (2) | 1.5254 | 56.2 |
| 7 | FFS [1] | 0.00 | Decentration (3) | 1.5254 | 56.2 |
| 8 | ∞ | 0.00 | Decentration (4) | | |
| 9 | ∞ | 0.00 | Decentration (5) | | |
| Image plane | ∞ | 0.00 | | | |

FFS [1]

$C4 = 1.2977 \times 10^{-1}$    $C6 = 7.6378 \times 10^{-2}$    $C8 = -9.0586 \times 10^{-3}$
$C10 = -1.3524 \times 10^{-3}$    $C11 = 5.5531 \times 10^{-3}$ Decentration [1]

| X = 0.00 | Y = 0.00 | Z = 1.30 |
| α = −47.00 | β = 0.00 | γ = 0.00 |

Decentration [2]

| X = 0.00 | Y = 1.20 | Z = 1.10 |
| α = 90.00 | β = 0.00 | γ = 0.00 |

Decentration [3]

| X = 0.00 | Y = 2.70 | Z = 1.30 |
| α = −133.00 | β = 0.00 | γ = 0.00 |

Decentration [4]

| X = 0.00 | Y = 2.70 | Z = −0.10 |
| α = 0.00 | β = 0.00 | γ = 0.00 |

Decentration [5]

| X = 0.00 | Y = 2.44 | Z = −0.60 |
| α = 4.75 | β = 0.00 | γ = 0.00 |

Numerical data 18 (the eighteenth embodiment)

| Face No. | Radius of curvature | Face-to-face spacing | Decentration | Refractive index | Abbe's number |
|---|---|---|---|---|---|
| Object surface | ∞ | 0.00 | | | |
| 1 | ∞ | 0.78 | | | |
| 2 | ∞ | 0.50 | | 1.4900 | 0.0 |
| 3 | Stop surface | 0.80 | | | |
| 4 | FFS [1] | 0.00 | Decentration (1) | 1.5254 | 56.2 |
| 5 | FFS [2] | 0.00 | Decentration (2) | | |
| 6 | ∞ (Reflection surface) | 0.00 | Decentration (3) | | |
| 7 | FFS [2] | 0.00 | Decentration (2) | 1.5254 | 56.2 |
| 8 | FFS [1] | 0.00 | Decentration (1) | | |
| 9 | ∞ | 0.00 | | | |
| 10 | ∞ | 0.00 | Decentration (4) | | |
| Image plane | ∞ | 0.00 | Decentration (5) | | |

-continued

Numerical data 18 (the eighteenth embodiment)

FFS [1]

| | | |
|---|---|---|
| C4 = 3.9974 × 10$^{-1}$ | C6 = 3.6720 × 10$^{-1}$ | C8 = −7.4166 × 10$^{-2}$ |
| C10 = −4.4393 × 10$^{-2}$ | C11 = 2.8695 × 10$^{-5}$ | C13 = 9.3611 × 10$^{-6}$ |

FFS [2]

| | | |
|---|---|---|
| C4 = −3.8411 × 10$^{-2}$ | C6 = −5.6789 × 10$^{-2}$ | C8 = −5.8595 × 10$^{-2}$ |
| C10 = −4.8126 × 10$^{-6}$ | C11 = −1.0367 × 10$^{-6}$ | C13 = −4.3943 × 10$^{-7}$ |

Decentration [1]

| | | |
|---|---|---|
| X = 0.00 | Y = 0.00 | Z = 0.10 |
| α = −14.89 | β = 0.00 | γ = 0.00 |

Decentration [2]

| | | |
|---|---|---|
| X = 0.00 | Y = 0.00 | Z = 0.68 |
| α = −36.24 | β = 0.00 | γ = 0.00 |

Decentration [3]

| | | |
|---|---|---|
| X = 0.00 | Y = 0.00 | Z = 1.10 |
| α = −27.00 | β = 0.00 | γ = 0.00 |

Decentration [4]

| | | |
|---|---|---|
| X = 0.00 | Y = 2.50 | Z = 0.60 |
| α = −55.00 | β = 0.00 | γ = 0.00 |

Decentration [5]

| | | |
|---|---|---|
| X = 0.00 | Y = 0.00 | Z = 0.00 |
| α = 0.00 | β = 0.00 | γ = 0.00 |

Numerical data 19 (the nineteenth embodiment)

| Face No. | Radius of curvature | Face-to-face spacing | Decentration | Refractive index | Abbe's number |
|---|---|---|---|---|---|
| Object surface | ∞ | 0.00 | | | |
| 1 | ∞ | 0.78 | | | |
| 2 | ∞ | 0.50 | | 1.4900 | 0.0 |
| 3 | Stop surface | 0.50 | | | |
| 4 | ∞ | 0.00 | | | |
| 5 | FFS [1] | 0.00 | Decentration (1) | 1.5254 | 56.2 |
| 6 | FFS [2] | 0.00 | Decentration (2) | | |
| 7 | ∞ (Reflection surface) | 0.00 | Decentration (3) | | |
| 8 | FFS [2] | 0.00 | Decentration (2) | 1.5254 | 56.2 |
| 9 | FFS [1] | 0.00 | Decentration (1) | 1.5254 | 56.2 |
| 10 | FFS [3] | 0.00 | Decentration (4) | | |
| 11 | ∞ | 0.00 | Decentration (5) | | |
| Image plane | ∞ | 0.00 | | | |

FFS [1]

| | | |
|---|---|---|
| C4 = 5.7992 × 10$^{-2}$ | C6 = 7.5186 × 10$^{-2}$ | C8 = 3.8883 × 10$^{-3}$ |
| C10 = −1.6131 × 10$^{-2}$ | C11 = −2.3849 × 10$^{-2}$ | C13 = −1.0484 × 10$^{-2}$ |

FFS [2]

| | | |
|---|---|---|
| C4 = −1.7419 × 10$^{-1}$ | C6 = −1.4553 × 10$^{-1}$ | C8 = −6.1974 × 10$^{-3}$ |
| C10 = −1.7542 × 10$^{-2}$ | | |

FFS [3]

| | |
|---|---|
| C4 = −4.4133 × 10$^{-1}$ | C6 = −2.6473 × 10$^{-1}$ |

Decentration [1]

| | | |
|---|---|---|
| X = 0.00 | Y = 0.19 | Z = −0.03 |
| α = −3.14 | β = 0.00 | γ = 0.00 |

Decentration [2]

| | | |
|---|---|---|
| X = 0.00 | Y = −0.18 | Z = 0.63 |
| α = −42.33 | β = 0.00 | γ = 0.00 |

-continued

Numerical data 19 (the nineteenth embodiment)

Decentration [3]

| X = 0.00 | Y = 0.32 | Z = 1.07 |
|---|---|---|
| α = −13.00 | β = 0.00 | γ = 0.00 |

Decentration [4]

| X = 0.00 | Y = 1.58 | Z = 0.72 |
|---|---|---|
| α = 35.18 | β = 0.00 | γ = 0.00 |

Decentration [5]

| X = 0.00 | Y = 1.90 | Z = 1.34 |
|---|---|---|
| α = 20.64 | β = 0.00 | γ = 0.00 |

| | 15th embodiment | 16th embodiment | 17th embodiment | 18th embodiment | 19th embodiment |
|---|---|---|---|---|---|
| θ | 45.0° | 57.0° | 47.0° | 42.6° | 43.4° |
| α | 56.0° | 26.9° | 84.3° | — | 78.1° |
| α2 | — | 94.2° | — | — | — |

Again, θ is an angle of incidence of a ray traveling along the optical axis of light emitted from the light source on the detecting reflection surface 4 in each embodiment, α is an angle made by an axial chief ray incident on the reflection surface 20b with the axial chief ray reflected by the reflection surface 20b in each of the fifteenth to seventeenth embodiments, or an angle made by an axial chief ray incident on the reflection surface 20″a with the axial chief ray reflected by the reflection surface 20″a in the nineteenth embodiment, and α2 is an angle made by an axial chief ray incident on the reflection surface 20d with the axial chief ray reflected by the reflection surface 20d in the sixteenth embodiment.

| Numerical data 20 (the twentieth embodiment) | | | | | |
|---|---|---|---|---|---|
| Face No. | Radius of curvature | Face-to-face spacing | Decentration | Refractive index | Abbe's number |
| Object surface | ∞ | 0.50 | | | |
| 1 | ∞ | 0.25 | | 1.5168 | 64.1 |
| 2 | ∞ | 0.00 | | | |
| 3 | 11.62 | 0.00 | Decentration (1) | 1.5254 | 56.2 |
| 4 | Aspherical surface [1] | 0.00 | Decentration (2) | 1.5254 | 56.2 |
| 5 | FFS [1] | 0.00 | Decentration (3) | 1.5254 | 56.2 |
| 6 | Aspherical surface [1] | 0.00 | Decentration (2) | | |
| 7 | Stop surface (Reflection surface) | 0.00 | Decentration (4) | | |
| 8 | Aspherical surface [1] | 0.00 | Decentration (2) | 1.5254 | 56.2 |
| 9 | FFS [1] | 0.00 | Decentration (3) | 1.5254 | 56.2 |
| 10 | FFS [2] | 0.00 | Decentration (5) | | |
| Image plane | ∞ | 0.00 | Decentration (6) | | |

Aspherical surface [1]

Radius of curvature 377.28
k = 0.0000 × 10^{+0}
a = 6.3173 × 10^{−4}   b = −2.4131 × 10^{−4}   c = 1.7824 × 10^{−5}

FFS [1]

| $C_4 = 5.0295 \times 10^{-2}$ | $C_6 = 4.5197 \times 10^{-2}$ | $C_8 = 3.6238 \times 10^{-3}$ |
| $C_{10} = 6.7908 \times 10^{-4}$ | $C_{11} = -9.8771 \times 10^{-4}$ | $C_{13} = -5.0283 \times 10^{-4}$ |
| $C_{15} = 1.7316 \times 10^{-4}$ | $C_{17} = 4.5763 \times 10^{-4}$ | $C_{19} = -9.5861 \times 10^{-5}$ |
| $C_{21} = -9.4717 \times 10^{-5}$ | | |

FFS [2]

| $C_4 = 1.0756 \times 10^{-1}$ | $C_6 = 9.5824 \times 10^{-2}$ | $C_8 = 4.2605 \times 10^{-2}$ |
| $C_{10} = 3.1471 \times 10^{-2}$ | $C_{11} = 6.7628 \times 10^{-4}$ | $C_{13} = 8.5706 \times 10^{-3}$ |
| $C_{15} = -9.8595 \times 10^{-3}$ | $C_{17} = -2.1950 \times 10^{-3}$ | $C_{19} = -4.1385 \times 10^{-3}$ |
| $C_{21} = 2.1383 \times 10^{-3}$ | | |

Numerical data 20 (the twentieth embodiment)

Decentration [1]

| | | |
|---|---|---|
| X = 0.00 | Y = 1.30 | Z = 1.35 |
| α = −9.84 | β = 0.00 | γ = 0.00 |

Decentration [2]

| | | |
|---|---|---|
| X = 0.00 | Y = −1.02 | Z = 4.04 |
| α = 45.52 | β = 0.00 | γ = 0.00 |

Decentration [3]

| | | |
|---|---|---|
| X = 0.00 | Y = −2.54 | Z = 4.89 |
| α = 78.49 | β = 0.00 | γ = 0.00 |

Decentration [4]

| | | |
|---|---|---|
| X = 0.00 | Y = 1.06 | Z = 6.07 |
| α = 46.19 | β = 0.00 | γ = 0.00 |

Decentration [5]

| | | |
|---|---|---|
| X = 0.00 | Y = −3.90 | Z = 3.27 |
| α = 71.86 | β = 0.00 | γ = 0.00 |

Decentration [6]

| | | |
|---|---|---|
| X = 0.00 | Y = −4.97 | Z = 0.22 |
| α = 44.12 | β = 0.00 | γ = 0.00 |

Numerical data 21 (the twenty-first embodiment)

| Face No. | Radius of curvature | Face-to-face spacing | Decentration | Refractive index | Abbe's number |
|---|---|---|---|---|---|
| Object surface | ∞ | 0.50 | | | |
| 1 | ∞ | 0.25 | | 1.5168 | 64.1 |
| 2 | ∞ | 0.00 | | | |
| 3 | 11.59 | 0.00 | Decentration (1) | 1.5254 | 56.2 |
| 4 | Aspherical surface [1] | 0.00 | Decentration (2) | 1.5254 | 56.2 |
| 5 | FFS [1] | 0.00 | Decentration (3) | 1.5254 | 56.2 |
| 6 | Aspherical surface [1] | 0.00 | Decentration (2) | | |
| 7 | Stop surface (Reflection surface) | 0.00 | Decentration (4) | | |
| 8 | Aspherical surface [1] | 0.00 | Decentration (2) | 1.5254 | 56.2 |
| 9 | FFS [1] | 0.00 | Decentration (3) | 1.5254 | 56.2 |
| 10 | Fresnel surface [1] | 0.00 | Decentration (5) | | |
| Image plane | ∞ | 0.00 | Decentration (6) | | |

Aspherical surface [1]

Radius of curvature 226.01
$k = 0.0000 \times 10^{+0}$
$a = 1.2511 \times 10^{-3}$  $b = -1.5777 \times 10^{-4}$  $c = 8.8146 \times 10^{-6}$

Fresnel surface [1]

Radius of curvature 4.41
$k = 0.0000 \times 10^{+0}$
$a = -4.8870 \times 10^{-4}$  $b = -1.0595 \times 10^{-5}$

FFS [1]

$C4 = 5.1711 \times 10^{-2}$  $C6 = 4.5394 \times 10^{-2}$  $C8 = 2.5512 \times 10^{-3}$
$C10 = 8.9516 \times 10^{-4}$  $C11 = 6.8695 \times 10^{-5}$  $C13 = -2.0004 \times 10^{4}$
$C15 = 2.7112 \times 10^{-4}$  $C17 = 3.1459 \times 10^{-5}$  $C19 \times 1.2906 \times 10^{-5}$
$C21 = -4.0753 \times 10^{-5}$

Decentration [1]

| | | |
|---|---|---|
| X = 0.00 | Y = 1.82 | Z = 1.84 |
| α = −15.84 | β = 0.00 | γ = 0.00 |

-continued

Numerical data 21 (the twenty-first embodiment)

Decentration [2]

| | | |
|---|---|---|
| X = 0.00 | Y = −1.16 | Z = 4.03 |
| α = 45.35 | β = 0.00 | γ = 0.00 |

Decentration [3]

| | | |
|---|---|---|
| X = 0.00 | Y = −2.78 | Z = 4.81 |
| α = 78.81 | β = 0.00 | γ = 0.00 |

Decentration [4]

| | | |
|---|---|---|
| X = 0.00 | Y = 0.64 | Z = 5.81 |
| α = 45.63 | β = 0.00 | γ = 0.00 |

Decentration [5]

| | | |
|---|---|---|
| X = 0.00 | Y = −3.51 | Z = 2.78 |
| α = 51.70 | β = 0.00 | γ = 0.00 |

Decentration [6]

| | | |
|---|---|---|
| X = 0.00 | Y = −5.09 | Z = 0.34 |
| α = 47.61 | β = 0.00 | γ = 0.00 |

Numerical data 22 (the twenty-second embodiment)

| Face No. | Radius of curvature | Face-to-face spacing | Decentration | Refractive index | Abbe's number |
|---|---|---|---|---|---|
| Object surface | ∞ | 0.50 | | | |
| 1 | ∞ | 0.25 | | 1.5163 | 64.1 |
| 2 | ∞ | 0.00 | | | |
| 3 | Fresnel surface [1] | 0.00 | Decentration (1) | 1.5254 | 56.2 |
| 4 | ∞ | 0.00 | Decentration (2) | 1.5254 | 56.2 |
| 5 | ∞ | 0.00 | Decentration (3) | 1.5254 | 56.2 |
| 6 | ∞ | 0.00 | Decentration (2) | | |
| 7 | Stop surface (Reflection surface)−8.14 | 0.00 | Decentration (4) | | |
| 8 | ∞ | 0.00 | Decentration (2) | 1.5254 | 56.2 |
| 9 | ∞ | 0.00 | Decentration (3) | 1.5254 | 56.2 |
| 10 | 3.83 | 0.00 | Decentration (5) | | |
| Image surface | ∞ | 0.00 | Decentration (6) | | |

Fresnel surface [1]

Radius of curvature  2.61
$k = 0.0000 \times 10^{+0}$
$a = -1.5294 \times 10^{-2}$ Decentration [1]

| | | |
|---|---|---|
| X = 0.00 | Y = −0.26 | Z = 1.17 |
| α = −4.33 | β = 0.00 | γ = 0.00 |

Decentration [2]

| | | |
|---|---|---|
| X = 0.00 | Y = 1.42 | Z = 4.31 |
| α = −46.84 | β = 0.00 | γ = 0.00 |

Decentration [3]

| | | |
|---|---|---|
| X = 0.00 | Y = 1.52 | Z = 2.69 |
| α = 111.46 | β = 0.00 | γ = 0.00 |

Decentration [4]

| | | |
|---|---|---|
| X = 0.00 | Y = −0.74 | Z = 4.80 |
| α = −46.84 | β = 0.00 | γ = 0.00 |

Decentration [5]

| | | |
|---|---|---|
| X = 0.00 | Y = 1.85 | Z = 2.05 |
| α = −46.84 | β = 0.00 | γ = 0.00 |

Decentration [6]

| | | |
|---|---|---|
| X = 0.00 | Y = 4.21 | Z = 0.00 |
| α = −46.84 | β = 0.00 | γ = 0.00 |

| Numerical data 23 (the twenty-third embodiment) | | | | |
|---|---|---|---|---|
| Face No. | Radius of curvature | Face-to-face spacing | Decentration | Refractive index | Abbe's number |
| Object surface | ∞ | 0.50 | | | |
| 1 | ∞ | 0.25 | | 1.5163 | 64.1 |
| 2 | ∞ | 0.00 | | | |
| 3 | Fresnel surface [1] | 0.00 | Decentration (1) | 1.5254 | 56.2 |
| 4 | ∞ | 0.00 | Decentration (2) | 1.5254 | 56.2 |
| 5 | ∞ | 0.00 | Decentration (3) | 1.5254 | 56.2 |
| 6 | ∞ | 0.00 | Decentration (2) | | |
| 7 | Fresnel surface [2] Stop surface (Reflection surface) | 0.00 | Decentration (4) | | |
| 8 | ∞ | 0.00 | Decentration (2) | 1.5254 | 56.2 |
| 9 | ∞ | 0.00 | Decentration (3) | 1.5254 | 56.2 |
| 10 | FFS [1] | 0.00 | Decentration (5) | | |
| Image plane | ∞ | 0.00 | Decentration (6) | | |

Fresnel surface [1]

Radius of curvature 3.06
$k = 0.0000 \times 10^{+0}$
$a = -7.5207 \times 10^{-3}$ Fresnel surface [2]

Radius of curvature −6.21
$k = 0.0000 \times 10^{+0}$

FFS [1]

$C4 = 2.2528 \times 10^{-1}$  $C6 = 2.2096 \times 10^{-1}$  $C8 = 1.2345 \times 10^{-2}$
$C10 = 4.2661 \times 10^{-3}$  $C11 = -2.1667 \times 10^{-2}$  $C13 = -1.1707 \times 10^{-2}$
$C15 = -1.7401 \times 10^{-2}$ Decentration [1]

$X = 0.00$  $Y = -0.36$  $Z = 1.22$
$\alpha = -2.73$  $\beta = 0.00$  $\gamma = 0.00$ Decentration [2]

$X = 0.00$  $Y = 1.42$  $Z = 4.27$
$\alpha = -46.80$  $\beta = 0.00$  $\gamma = 0.00$ Decentration [3]

$X = 0.00$  $Y = 1.54$  $Z = 2.67$
$\alpha = 111.11$  $\beta = 0.00$  $\gamma = 0.00$ Decentration [4]

$X = 0.00$  $Y = -0.77$  $Z = 4.78$
$\alpha = -46.80$  $\beta = 0.00$  $\gamma = 0.00$ Decentration [5]

$X = 0.00$  $Y = 2.06$  $Z = 2.24$
$\alpha = -46.80$  $\beta = 0.00$  $\gamma = 0.00$ Decentration [6]

$X = 0.00$  $Y = 3.01$  $Z = 1.19$
$\alpha = -46.51$  $\beta = 0.00$  $\gamma = 0.00$

| Numerical data 24 (the twenty-fourth embodiment) | | | | |
|---|---|---|---|---|
| Face No. | Radius of curvature | Face-to-face spacing | Decentration | Refractive index | Abbe's number |
| Object surface | ∞ | 0.50 | | | |
| 1 | ∞ | 0.00 | Decentration (1) | 1.5168 | 64.1 |
| 2 | ∞ | 0.00 | Decentration (2) | | |
| 3 | 2.27 | 0.00 | Decentration (3) | 1.5254 | 56.2 |
| 4 | FFS [1] | 0.00 | Decentration (4) | 1.5254 | 56.2 |
| 5 | FFS [2] | 0.00 | Decentration (5) | | |
| 6 | Stop surface (Reflection surface) | 0.00 | Decentration (6) | | |

-continued

Numerical data 24 (the twenty-fourth embodiment)

| 7 | FFS [3] | 0.00 | Decentration (7) | 1.5254 | 56.2 |
| 8 | FFS [1] | 0.00 | Decentration (4) | | |
| Image plane | ∞ | 0.00 | Decentration (8) | | |

FFS [1]

C4 = −7.5769 × 10$^{-2}$       C6 = −4.3615 × 10$^{-2}$       C8 = −1.9001 × 10$^{-2}$
C10 = −1.1509 × 10$^{-3}$      C11 = 2.5916 × 10$^{-2}$       C13 = −4.6480 × 10$^{-3}$
C15 = −9.2635 × 10$^{-4}$      C17 = −8.7012 × 10$^{-3}$      C13 = 4.4100 × 10$^{-3}$
C21 = 4.6186 × 10$^{-4}$

FFS [2]

C4 = −3.2743 × 10$^{-2}$       C6 = 5.2563 × 10$^{-2}$        C8 = −1.3678 × 10$^{-1}$
C10 = 2.3934 × 10$^{-2}$       C11 = 1.1807 × 10$^{-1}$       C13 = −2.2205 × 10$^{-2}$
C15 = −1.6704 × 10$^{-2}$

FFS [3]

C4 = −2.7159 × 10$^{-1}$       C6 = 1.3942 × 10$^{-2}$        C8 = −1.8572 × 10$^{-1}$
C10 = 7.6015 × 10$^{-3}$       C11 = 5.1628 × 10$^{-2}$       C13 = −7.0739 × 10$^{-2}$
C15 = −2.9537 × 10$^{-4}$

Decentration [1]

X = 0.00        Y = −0.59        Z = −1.14
α = 10.23       β = 0.00         γ = 0.00

Decentration [2]

X = 0.00        Y = −0.55        Z = −0.90
α = 10.23       β = 0.00         γ = 0.00

Decentration [3]

X = 0.00        Y = 0.00         Z = 0.00
α = 0.00        β = 0.00         γ = 0.00

Decentration [4]

X = 0.00        Y = −0.80        Z = 2.34
α = 47.22       β = 0.00         γ = 0.00

Decentration [5]

X = 0.00        Y = −2.54        Z = 1.44
α = 102.85      β = 0.00         γ = 0.00

Decentration [6]

X = 0.00        Y = −3.75        Z = 1.78
α = 57.41       β = 0.00         γ = 0.00

Decentration [7]

X = 0.00        Y = −1.66        Z = 1.77
α = 40.58       β = 0.00         γ = 0.00

Decentration [8]

X = 0.00        Y = −1.44        Z = 6.25
α = 32.58       β = 0.00         γ = 0.00

Subsequently, reference is made to an example of a system using the deflection angle detecting device of the present invention which has been explained with regard to the above embodiments.

Figure 37:
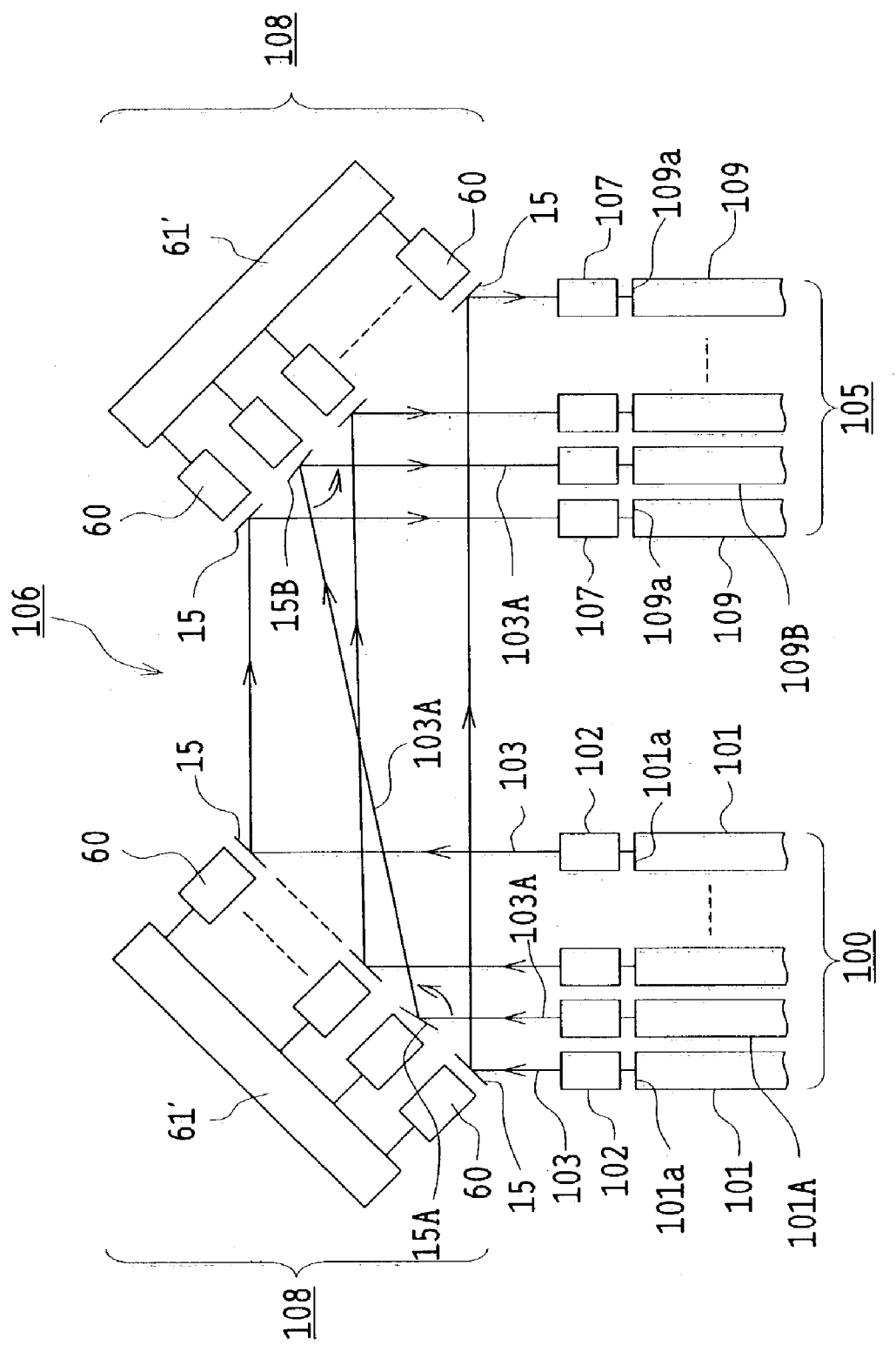
FIG. 37 is an explanatory view showing schematically an example of an optical signal switch system using the deflection angle detecting device of the present invention.

FIG. 37 shows an example of an optical signal switch system 106 using the deflection angle detecting device of the present invention.

This system includes an input cable unit 100 which bundles light-transmitting cables, such as optical fiber cables, transmitting laser beams 103 (optical signals) whose intensities, pulse widths, and frequencies, for instance, are modulated in accordance with information signals; an output cable unit 105 which bundles light-transmitting cables, such as the optical fiber cables, to transmit the laser beams 103; and optical switching devices 108 for selectively deflecting the laser beams 103, interposed between these units.

The input cable unit 100 is designed to bundle a plurality of input cables 101 provided with exit ports 101*a* from which the laser beams 103 having been transmitted emerge toward the exterior at the ends of the light-transmitting cables, for example, comprised of optical fiber cables in which spun glass fibers are protectively coated with plastic. Collimator units 102 which function so as to collimate the laser beams 103 are arranged on the optical axes of the individual exit ports 101*a*. The input cables 101 are such that their exit ports 101*a* take the same direction of emergence of light, and are regularly arrayed with preset spacings. The exit ports 101*a* are arrayed in a lattice matrix manner, for example, of 2×2 or 64×64, in accordance with their number.

The output cable unit 105 is likewise designed to bundle a plurality of output cables 109 provided with entrance ports 109*a* on which the laser beams 103 are incident at the ends of the light-transmitting cables. Imaging units 107 which function so as to image the laser beams 103 are arranged on the optical axes of the individual entrance ports 109a. The output cables 109 are such that their entrance ports 109a take the same direction of incidence of light, and are regularly arrayed with preset spacings. The entrance ports 109a are arrayed in a lattice matrix manner, for example, of 2×2 or 64×64, in accordance with their number.

Optical switching devices 108 are arranged in the directions of emergence and incidence of the laser beams 103 in the input cable unit 100 and the output cable unit 105. Each of the optical switching devices 108 includes rotating mirrors 15 (light-deflecting elements) which can be independently inclined one- or two-dimensionally, deflection angle detecting devices 60 of the present invention detecting inclination angles from their compromise positions, and deflection angle control means 61' controlling the deflection angles of the rotating mirrors 15 in accordance with outputs from the deflection angle detecting devices 60.

The optical switching devices 108 are arranged so that the rotating mirrors 15 accommodate the exit ports 101a and the entrance ports 109a, and are also arranged in a positional relationship such that the laser beams 103 emerging from the preset exit ports 101a in a state where the rotating mirrors 15 are inclined at the compromise positions are reflected by the individual rotating mirrors 15 and is incident on the preset entrance ports 109a.

Figure 38:
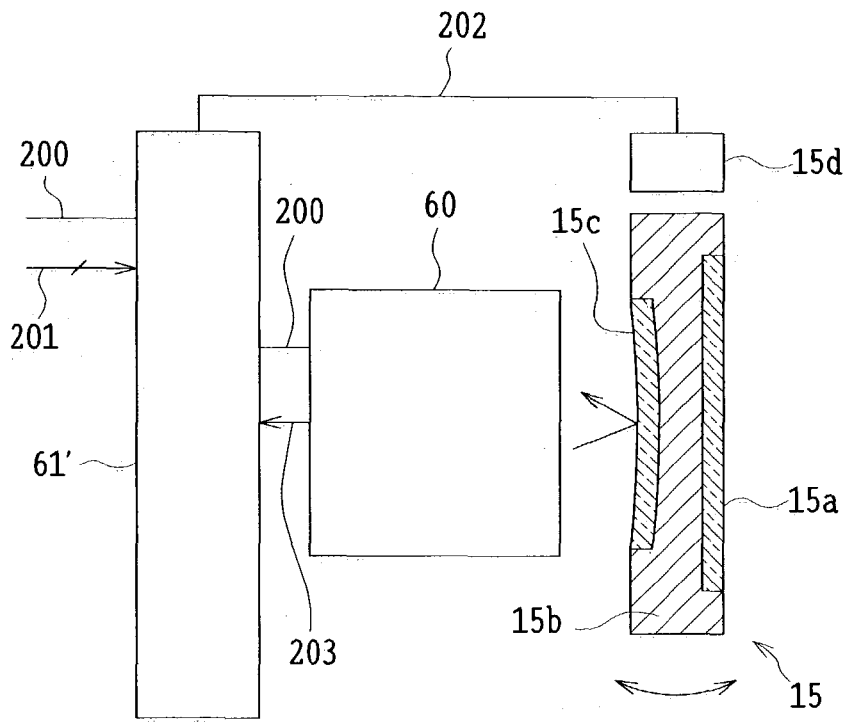
FIG. 38 is an explanatory view showing a cross section perpendicular to the reflection surface of a rotating mirror and its surrounding construction.

FIG. 38 shows a cross section perpendicular to the reflection surface of each rotating mirror 15 and its surrounding construction.

The rotating mirror 15 of FIG. 38 is an example where a galvano mirror is adopted. For example, surface reflection mirrors are provided on the front and back surfaces of a supporting member 15b supported so that the inclination angle can be arbitrarily adjusted by a well-known actuator 15d such as an electromagnetic coil, and thereby a deflection mirror surface 15a for reflecting the laser beam 103 is configured on the front surface side of the supporting member 15b, while a detecting reflection surface 15c is configured on the back surface side.

Also, in the present invention, the axis of rotation may be provided on the detecting reflection surface 15c with positive power, as mentioned above, to electrically compensate an error caused by the positional shift of the deflection mirror surface 15a. Alternatively, the axes of rotation can be provided on the two surfaces (15a and 15c) to rotate the two surfaces at the same rotation angle through a link mechanism.

Although the deflection mirror surface 15a need not necessarily be parallel with the detecting reflection surface 15c, both are connected so that the detecting reflection surface 15c is inclined in accordance with the deflection angle of the deflection mirror surface 15a. In the figure, the deflection mirror surface 15a and the detecting reflection surface 15c are fixed to the supporting member 15b. Thus, the deflection mirror surface 15a and the detecting reflection surface 15c have the center of rotation in common. The surface accuracies and reflectances of these surfaces are separately set so as to be appropriate with respect to the detection light and the laser beam 103 to be reflected.

The rotating mirror 15 is provided so that the deflection mirror surface 15a is placed in the direction of incidence of the laser beam 103, and the deflection angle detecting device 60 for detecting the deflection angle is opposite to the detecting reflection surface 15c on the back surface side.

The deflection angle control means 61' is constructed so that a deflection angle control signal 201 specifying the rotating mirror 15 and its deflection angle and a power voltage 200 are received from the exterior, the actuator 15d and the deflection angle detecting device 60 are electrically connected to output a driving signal 202 driving the actuator 15d, and a detection level signal 203 is input from the deflection angle detecting device 60 detecting the deflection angle.

In the optical signal switch system 106 constructed as mentioned above, under a relay state of an ordinary transmission path, the laser beam 103 transmitted in one input cable 101 reaches one of the exit ports 101a which are regularly arrayed in the lattice matrix manner and is radiated therefrom toward the exterior of the input cable 101. The radiated light, which is condensed by the collimator unit 102, is changed to a parallel beam of proper size so that eclipse is not caused by dust, and emerges therefrom toward the optical switching device 108.

Here, the rotating mirror 15 at the compromise position, provided at the rear stage of each collimator unit 102 reflects the particular laser beam 103 toward the particular rotating mirror 15 at the compromise position in the other optical switching device 108 to render the laser beam 103 incident on one of the imaging units 107 corresponding to the entrance ports 109a of the output cable units 109 which are regularly arrayed. After being transmitted through the imaging unit 107 and imaged at the entrance port 109a of the preset optical cable 109 of the output cable unit 105, the laser beam 103 is incident thereon and is transmitted.

In the optical signal switch system 106 of this example, each rotating mirror 15 is inclined by a preset deflection angle from the compromise position, and the position of the laser beam 103 to be reached is changed. For example, in FIG. 37, when a laser beam 103A leaving a particular input cable 101A is switched from an ordinary relay state to enter an output cable 109B, the deflection angle of a rotating mirror 15A is first changed and the laser beam 103A is deflected toward a rotating mirror 15B. The rotating mirror 15B in the ordinary relay state causes another laser beam 103 to enter the output cable 109B at the compromise position, but in this case, the deflection angle of the rotating mirror 15B is changed so that the laser beam 103A is incident on the output cable 109B in accordance with the angle of incidence of the laser beam 103A.

Since the entrance ports 109a, as well as the exit ports 101a, are regularly arrayed, the deflection angles of the rotating mirrors 15 causing the exit ports 101a to correspond to the entrance ports 109a are predetermined by the positional relationship of the optical switching devices 108. The particular rotating mirrors 15 are thus inclined at preset deflection angles and thereby optical signal switching can be performed.

Figure 39:
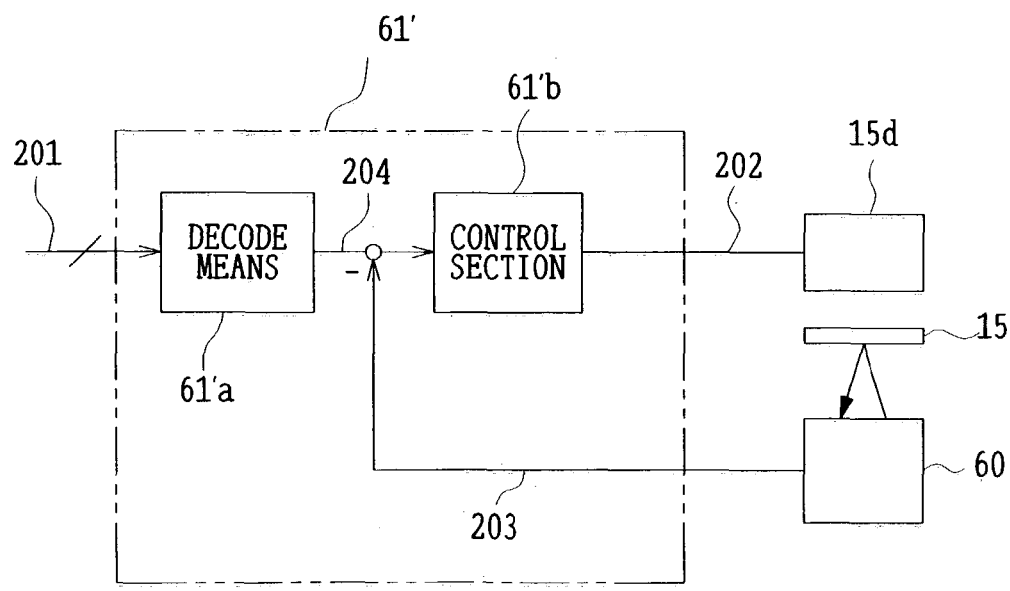
FIG. 39 is a control block diagram showing another example of an apparatus using the deflection angle detecting device according to the present invention.

The result is that the deflection angle of each rotating mirror 15 is detected by the deflection angle detecting device 60, and the actuator 15d is feedback-controlled through the deflection angle control means 61' shown in FIG. 39.

With reference to FIG. 39, a description is given of the deflection angle control means 61' for making the optical signal switching control by inclining the rotating mirror 15 as another example of an apparatus using the deflection angle detecting device according to the present invention.

Specifically, the deflection angle control means 61' includes a decode means 61'a which decodes the deflection angle control signal 201 specifying the deflection angle to generate a target level signal 204 corresponding to a target deflection angle of the rotating mirror 15 and a control section 61'b which receives the deviation between a detection level signal 203 from the deflection angle detecting device 60 and the target level signal 204 to generate the driving signal 202 of the actuator 15d.

Subsequently, an optical signal switching technique is explained with reference to FIGS. 37 and 39. The input cable 101A and the output cable 109B of the laser beam 103A are first specified for switching. Information is input into the deflection angle control means 61' of each optical switching device 108 from the exterior by the deflection angle control signal 201 and further into the decode means 61'a.

The target level signal 204 corresponding to the target deflection angle of the rotating mirror 15 is generated by the decode means 61'a. The target level signal 204 is input into the control section 61'b after the deviation with the detection level signal 203 according to the detected deflection angle is taken. In the control section 61'b, this deviation is processed, for example, by amplification, differentiation, or integration, and the driving signal 202 is adjusted so that the deflection angle of the rotating mirror 15 approaches the target deflection angle, and is feedback-output to the actuator 15d.

In this way, the feedback control is made by using the deflection angle detecting device 60 as the detection means, an hence the deflection angle of the rotating mirror 15 is change to the target deflection angle. Therefore, even though disturbance is caused and the deflection angle deviates from the target deflection angle, the deflection angle is changed immediately to the target deflection angle in accordance with the amount of deviation. That is, by the optical switching devices 108 provided with the deflection angle control means 61' and the deflection angle detecting devices 60, the feedback control of real time is achieved.

Moreover, the deflection angle detecting device 60 of the present invention is constructed to be compact, and thus the optical switching device 108 can be designed to provide compactness and space-saving. Since the deflection angle detecting devices 60 arranged on the rear side of the rotating mirrors 15 are compact, the rotating mirrors 15 can be spaced at short intervals, and the optical cables 101 and 109 of the input and output cable units 100 and 105 can also be spaced at short intervals and becomes compact. Consequently, the advantage is offered that the number of switchable transmission paths can be increased without enlarging the deflection angle of each rotating mirror 15.

Such effects can be brought about by the feature of the present invention that compactly bends the optical path while condensing light by using a concave reflection surface that has been not adopted in a conventional optical signal switch system.

The above description has cited an example where the rotating mirrors 15 are provided with respect to the exit ports 101a of the input cable unit 100, one for each port. However, to switch the transmission path, there is an application excepting the case where the laser beams 103 are switched individually. This is, for example, the case where the transmission path is switched to a backup circuit in the maintenance of the transmission path. In this case, the whole of the preset input cable unit 100 is switched from one output cable unit 105 to another output cable unit 105. In such a case, since the changeover is performed while keeping the arrangement of the input cable unit 100 as it is, the single rotating mirror 15 may be provided with respect to the input cable unit 100.

Figure 40:
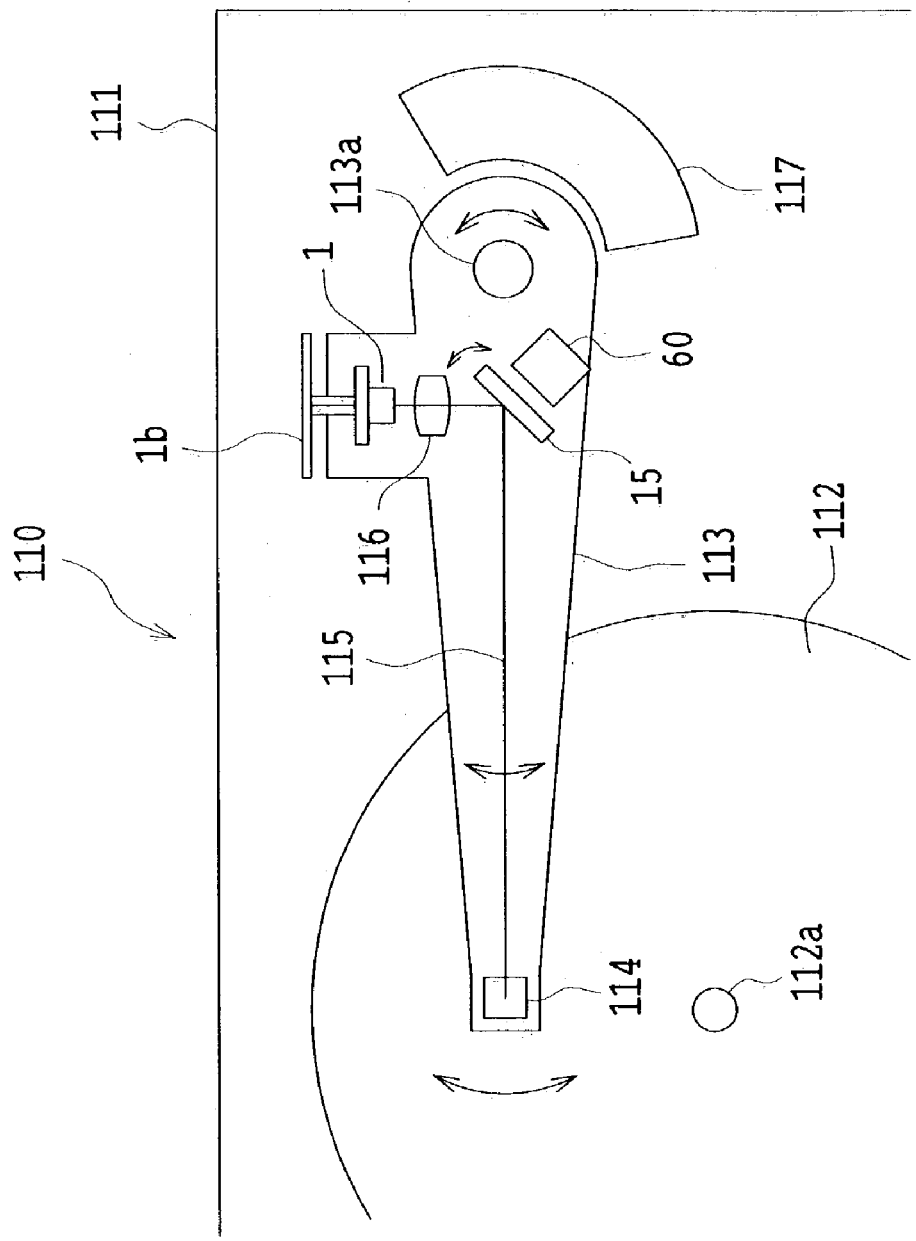
FIG. 40 is a plan view showing schematically an information record reproducing system using the deflection angle detecting device according to the present invention.

Subsequently, reference is made to an example of an information record reproducing system, such as a pickup apparatus, having the deflection angle detecting device of the present invention. FIG. 40 shows an information record reproducing system 110 using the deflection angle detecting device of the present invention.

This system has an optical system including a recording disc 112 (a recording medium), such as an optical disc or a photomagnetic disc, for recording and reproducing an information signal; the semiconductor laser 1 (the light source) radiating a laser beam 115 (a light beam), for example, the intensity or pulse of which is modulated in accordance with the information signal; an imaging lens 116 and an imaging lens unit 114 for imaging the laser beam 115; the rotating mirror 15 deflecting the laser beam 115 to change the position of incidence on the imaging lens unit 114, deflected and driven by the actuator (not shown) in order to perform fine tracking control; and the deflection angle detecting device 60; and an arm 113 which is provided with the optical system and can be moved parallel and perpendicular to the recording surface of the recording disc 112.

The semiconductor laser 1 is connected to a laser driving means 1b for modulating the semiconductor laser 1 by the information signal.

The rotating mirror 15 is capable of adopting the construction of FIG. 38. The deflection angle detecting device 60 can be used in any embodiment mentioned above.

Reference numeral 111 represents a case, in which the recording disc 112 is placed on a driving shaft 112a rotated and driven, for example, by a DC control motor. The recording disc 112 is held to be rotatable around the driving shaft 112a.

The recording disc 112 has a recording surface allowing the record or reproduction of the optical signal, or both, on either surface. The format recording disc 112 is such that a signal track is formed along a circumferential direction of the recording surface, and the recording position of the information signal is logically divided in a radial direction.

The arm 113 is placed above the recording surface and is supported elastically in a vertical direction of the recording disc 112. The arm 113 is also supported to be rotatable, by a rotating shaft 113a, in a direction parallel to the recording surface of the recording disc 112, and can be rotated around the rotating shaft 113a and driven by a driving coil 117 such as an electromagnetic coil.

The imaging lens 116 is constructed to properly re-form the laser beam 115 emitted from the semiconductor laser 1 into a parallel beam, for instance. The imaging lens unit 114 is constructed to receive and image the laser beam 115 on the recording surface and to receive reflected light from the recording surface so that signal light corresponding to the information signal, focus detection light for performing focus control, and tracking detection light for performing tracking control enter individual light-receiving elements. Between the imaging lens 116 and the imaging lens unit 114, the rotating mirror 15 for changing the position of incidence of the laser beam 115 on the imaging lens unit 114 to perform the fine tracking control is placed together with the deflection angle detecting device 60. For the construction of the rotating mirror 15, that of FIG. 38 can be adopted. The deflection angle detecting device 60 can also be adopted in any embodiment mentioned above.

In the system constructed as described above, the recording surface of the recording disc 112 is first irradiated with the laser beam 115, and after the reflected light is received by the imaging lens unit 114 to obtain the tracking signal, information, such the position of the track and the amount of shift from the track, is accumulated. In accordance with such information, the position of rotation of the arm 113 is coarse-controlled by the driving coil 117 to perform track-to-track movement and track follow-up.

For severer tracking, the rotating mirror is inclined to deflect the laser beam 115 and the position of incidence of the beam on the imaging lens unit 114 is shifted so that the imaging position on the recording surface is fine-adjusted in the radial direction. In this case, the deflection angle of the rotating mirror 15 is detected by the deflection angle detecting device 60 for feedback control. The feedback control can be performed by the same way as the optical signal switching technique described with reference to FIG. 39.

As mentioned above, when the deflection angle detecting device 60 is used to construct the information record reproducing system, the deflection angle detecting device 60 can first be compactly designed, and thus the arm 113 can be made small in size and light in weight. This brings about the advantage that a mechanical response characteristic can be improved. Second, since the detection range of the deflection angle detecting device 60 can be increase, a larger deflection angle can be provided and even though a distance from the rotating mirror 15 to the imaging lens unit 114 is short, a preset position of incidence can be obtained. Consequently, the optical path length of the optical system of the arm 113 can be reduced. By doing so, the arm 13 can be downsized and the information record reproducing system which is compacter and excels in mechanical response characteristic can be obtained.

What is claimed is:

1. A deflection angle detecting device for detecting a deflection angle of a reflection surface for detection disposed in a path of rays, the deflection angle detecting device comprising:
    a light source for irradiating the reflection surface for detection with a beam of rays;
    an optical element comprising a curved reflection surface with positive power arranged to be decentered from a center axis of the beam of rays as reflected from the reflection surface for detection; and
    a photodetector having a light-receiving surface, for detecting the deflection angle of the reflection surface for detection in accordance with a position where the beam of rays reflected from the optical element is received on the light-receiving surface.

2. A deflection angle detecting device according to claim 1, wherein the detecting reflection surface is decentered with respect to the optical axis of the light radiated form the light source.

3. A deflection angle detecting device according to claim 1, wherein a path switching element switching at least one part of the light radiated from the light source is placed on the optical axis.

4. A deflection angle detecting device according to claim 1, wherein an optical element with positive power is interposed between the light source and the detecting reflection surface.

5. A deflection angle detecting device according to claim 1, wherein an optical element with positive power is interposed between the detecting reflection surface and the photodetector.

6. A deflection angle detecting device according to claim 4 or 5, wherein the optical element with positive power is provided with a rotational symmetrical surface.

7. A deflection angle detecting device according to claim 4 or 5, wherein the optical element with positive power includes a Fresnel lens surface.

8. A deflection angle detecting device according to claim 1, wherein the detecting reflection surface is a front surface mirror reflection surface.

9. A deflection angle detecting device according to claim 1, wherein the detecting reflection surface is a back surface mirror reflection surface configured of a medium with a refractive index of 1 or more.

10. A deflection angle detecting device according to claim 1, wherein the detecting reflection surface has rotational symmetrical optical power.

11. A deflection angle detecting device according to claim 1, wherein the detecting reflection surface has irrotational symmetrical optical power.

12. A deflection angle detecting device according to claim 1, wherein optical elements with positive powers are interposed in optical paths between the light source and the detecting reflection surface and between the detecting reflection surface and the photodetector, at least one for each optical path.

13. A deflection angle detecting device according to claim 1, wherein an optical element with positive power including a common member is interposed between the light source and the detecting reflection surface and between the detecting reflection surface and the photodetector.

14. A deflection angle detecting device according to claim 13, wherein the detecting reflection surface is provided on a back surface of the optical element with positive power including the common member.

15. A deflection angle detecting device according to claim 12, wherein at least one optical surface of one of the optical elements is configured into an irrotational symmetrical profile.

16. A deflection angle detecting device according to claim 12, wherein at least one optical surface of one of the optical elements has a function of reflecting light.

17. A deflection angle detecting device according to claim 16, wherein the optical surface having the function of reflecting light of one of the optical elements combines a function of reflecting light with a function transmitting light.

18. A deflection angle detecting device according to claim 1, wherein two sets of light-deflecting elements and detecting reflection surfaces are provided and a light beam radiated from the light source is split so that reflection angles of a plurality of light-deflecting elements provided with the detecting reflection surfaces are detected.

19. A deflection angle detecting device according to claim 1, wherein the detecting reflection surface has a reflection surface position detecting means outside an effective diameter.

20. A deflection angle detecting device for detecting a deflection angle of a reflection surface for detection, the deflection angle detecting device comprising:
    a light source for radiating a beam of rays;
    a light-deflecting element having the reflection surface for detection, inclined by a preset angle with respect to a center axis of the beam of rays radiated from the light source;
    an optical element comprising a curved reflection surface with positive power arranged to be decentered from a center axis of the beam of rays as reflected from the reflection surface for detection; and
    a photodetector having a light-receiving surface, for detecting the deflection angle of the reflection surface for detection in accordance with a position where the beam of rays reflected from the optical element is received on the light-receiving surface.

21. A deflection angle detecting device according to claim 20, satisfying the following condition:

$$100° < \theta < 70°$$

where θ is an angle of incidence of a ray traveling along the center axis of the beam of rays radiated from the light source on the reflection surface for detection.

22. A deflection angle detecting device according to claim 21, wherein at least one of optical working surfaces of the optical element has a rotationally asymmetric surface.

23. A deflection angle detecting device according to claim 20, wherein when a ray passing through a center of a position of the photodetector where the light is received, from a center of the light source, is called an axial chief ray, the reflection surface with positive power of the reflected-light condensing optical element is inclined and placed so that the axial chief ray reflected by the detecting reflection surface is reflected back toward the light source.

24. A deflection angle detecting device according to claim 22, wherein the curved reflection surface with positive power of the optical element is configured as a rotationally asymmetric surface.

25. A deflection angle detecting device according to claim 22, satisfying the following condition:

$$20°<\alpha<110°$$

where α is an angle made by an axial chief ray incident on the curved reflection surface with positive power of the optical element with an axial chief ray reflected by the curved reflection surface with positive power.

26. A deflection angle detecting device according to claim 20, wherein the photodetector is placed close to the light source, with a light-receiving surface directed toward an exit side of the light source.

27. A deflection angle detecting device according to claim 20, wherein each of two of optical working surfaces of the reflected-light condensing optical element is configured as a reflection surface.

28. A deflection angle detecting device according to claim 20, wherein each of at least three of optical working surfaces of the reflected-light condensing optical element is configured as a reflection surface.

29. A deflection angle detecting device according to claim 20, wherein an entrance surface and a reflection surface of the reflected-light condensing optical element are configured as a common surface.

30. A deflection angle detecting device according to claim 1 or 20, wherein an incident-light condensing optical element with positive power is interposed between the light source and the reflection surface for detection.

31. A deflection angle detecting device according to claim 30, wherein each of optical working surfaces of the incident-light condensing optical element is configured as a rotational symmetrical surface.

32. A deflection angle detecting device according to claim 30, wherein the incident-light condensing optical element is constructed integrally with the reflected-light condensing optical element.

33. A deflection angle detecting device according to claim 1 or 20, wherein the photodetector comprises a one-dimensional position sensor detector.

34. A deflection angle detecting device according to claim 1 or 20, wherein the photodetector comprises a two-dimensional position sensor detector.

35. A deflection angle detecting device according to claim 1 or 20, wherein the photodetector has a four-segmented light-receiving surface.

36. An optical signal switching system for performing switching among a plurality of light-transmitting paths so that a path of an optical signal, which is conveyed through one of the light-transmitting paths, is switched to another path, the optical signal switching system comprising:
at least one light-deflecting element for switching the path of the optical signal;
a reflection surface for detection provided integrally with the light-deflecting element for detecting a deflection angle of the light-deflecting element;
a deflection angle detecting device comprising:
a light source for irradiating the reflection surface for detection with a beam of rays;
an optical element comprising a curved reflection surface with positive power arranged to be decentered from a center axis of the beam of rays as reflected from the reflection surface for detection; and
a photodetector having a light-receiving surface, for detecting a deflection angle of the reflection surface for detection in accordance with a position where the beam of rays reflected from the optical element is received on the light-receiving surface; and
a deflection angle control unit for controlling the deflection angle of the light-deflecting element through the deflection angle of the reflection surface for detection detected by the deflection angle detecting device.

37. An information recording and presenting system for recording, presenting or both recording and presenting information signals by irradiating a recording surface of a recording medium with light, the information recording and presenting system comprising:
a light source for radiating a beam of rays;
an optical system that images the beam of rays on the recording medium;
a light-deflecting element arranged in the optical system and having a reflection surface for detection constructed and arranged to change an inclination angle thereof in accordance with a deflection angle where the beam of rays is deflected in a plane parallel with the recording surface; and
a deflection angle detecting device comprising:
another light source for irradiating the reflection surface for detection with a beam of rays;
an optical element comprising a curved reflection surface with positive power arranged to be decentered from a center axis of the beam of rays radiated from the another light source as reflected from the reflection surface for detection; and
a photodetector having a light-receiving surface, for detecting a deflection angle of the reflection surface for detection in accordance with a position where the beam of rays reflected from the optical element is received on the light-receiving surface.

38. A light-deflecting system using light an angle of which is detected, the light-deflecting system comprising:
a light-deflecting element having a reflection surface for detection; and
a deflection angle detecting device comprising:
a light source for irradiating the reflection surface for detection with a beam of rays;
an optical element comprising a curved reflection surface with positive power arranged to be decentered from a center axis of the beam of rays radiated from the light source as reflected from the reflection surface for detection; and
a photodetector having a light-receiving surface, for detecting a deflection angle of the reflection surface for detection in accordance with a position where the beam of rays reflected from the optical element is received on the light-receiving surface.

* * * * *

UNITED STATES PATENT AND TRADEMARK OFFICE
CERTIFICATE OF CORRECTION

| | | |
|---|---|---|
| PATENT NO. | : 7,151,596 B2 | Page 1 of 1 |
| APPLICATION NO. | : 10/609635 | |
| DATED | : December 19, 2006 | |
| INVENTOR(S) | : Koichi Takahashi | |

It is certified that error appears in the above-identified patent and that said Letters Patent is hereby corrected as shown below:

Column 76, line 66, change "$100° < \theta < 70°$" to -- $10° < \theta < 70°$ --.

Signed and Sealed this

Seventeenth Day of June, 2008

JON W. DUDAS
*Director of the United States Patent and Trademark Office*